(12) United States Patent
Micros

(10) Patent No.: US 10,526,086 B2
(45) Date of Patent: Jan. 7, 2020

(54) DRONE WITH FOUR WINGS MANEUVERABLE BY FLAPPING ACTION

(71) Applicant: Ioannis Micros, Athens (GR)

(72) Inventor: Ioannis Micros, Athens (GR)

(*) Notice: Subject to any disclaimer, the term of this patent is extended or adjusted under 35 U.S.C. 154(b) by 0 days.

(21) Appl. No.: 14/525,010

(22) Filed: Oct. 27, 2014

(65) Prior Publication Data

US 2019/0023392 A1    Jan. 24, 2019

(30) Foreign Application Priority Data

Oct. 25, 2013  (GR) .............................. 20130100619

(51) Int. Cl.
    *B64C 33/02*    (2006.01)
    *B64C 39/02*    (2006.01)
    *B64C 39/08*    (2006.01)

(52) U.S. Cl.
    CPC .......... *B64C 33/025* (2013.01); *B64C 39/024* (2013.01); *B64C 39/028* (2013.01); *B64C 39/08* (2013.01); *B64C 2201/025* (2013.01); *B64C 2201/042* (2013.01); *B64C 2201/126* (2013.01); *B64C 2201/146* (2013.01); *B64C 2201/22* (2013.01)

(58) Field of Classification Search
    CPC ..... B64C 33/025; B64C 39/08; B64C 39/028; B64C 39/024; B64C 2201/025; B64C 2201/146; B64C 2201/126; B64C 2201/042; B64C 2201/22
    See application file for complete search history.

(56) References Cited

U.S. PATENT DOCUMENTS

| 5,899,408 A    | * | 5/1999  | Bowers, Jr. ............. | B64C 33/02 244/11 |
| 2003/0230672 A1 | * | 12/2003 | Charron ................. | B64C 33/02 244/72 |
| 2010/0308158 A1 | * | 12/2010 | Park ..................... | B64C 33/02 244/22 |
| 2010/0308160 A1 | * | 12/2010 | Keennon ................ | B64C 33/02 244/22 |
| 2011/0079677 A1 | * | 4/2011  | Chronister ........... | A63H 27/008 244/11 |
| 2011/0278391 A1 | * | 11/2011 | Kotler .................... | B64C 33/02 244/22 |
| 2017/0101177 A1 | * | 4/2017  | Smirnov ................ | B64C 27/08 |
| 2017/0166307 A1 | * | 6/2017  | Jiang .................... | B64C 33/00 |

FOREIGN PATENT DOCUMENTS

| CN | 103832588 | * 11/2014 | ............. B64C 33/00 |

* cited by examiner

*Primary Examiner* — Assres H Woldemaryam
(74) *Attorney, Agent, or Firm* — Franco S. De LiGuori; DP IP Group

(57) ABSTRACT

An improved drone with 4 flat wings reciprocating up and down, complete with motor and electronics. Appendages on each wing's surface allow air to pass across it during the up-motion, and block it in the down-motion; this creates lift and permits flight and manoeuvres. The drone resembles either a flying bird or an insect, depending on wing motion and on passive attachments appropriate for the respective resemblance, making for inconspicuousness. The drone can execute complex work, either as solitary or in a team, either in flight or at rest in various places, after approaching and adhering expertly.

14 Claims, 15 Drawing Sheets

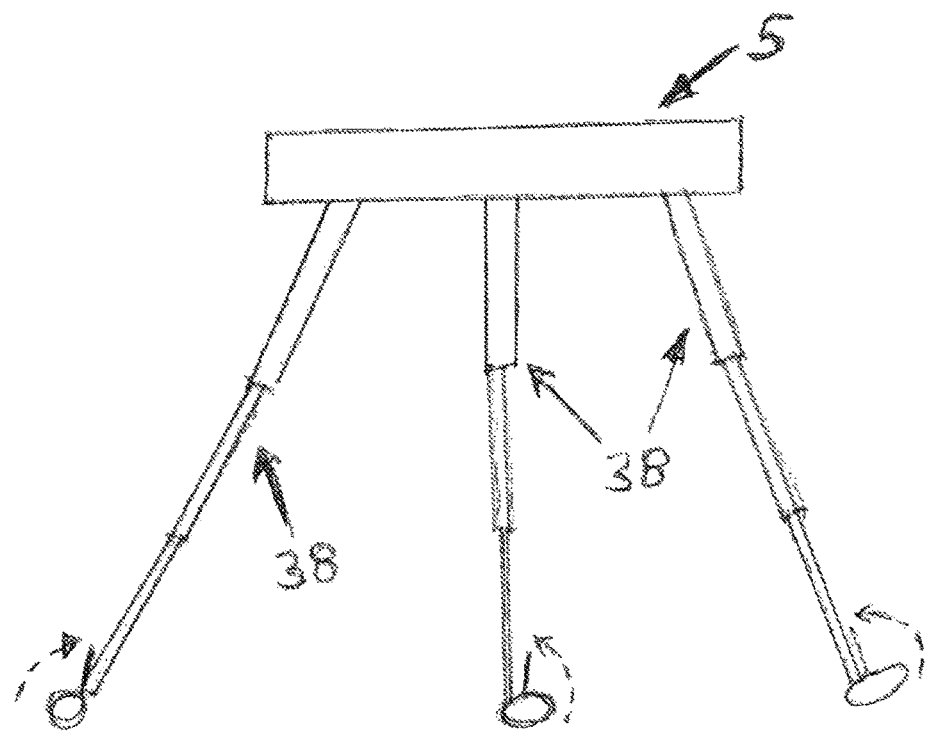
FIG. 15
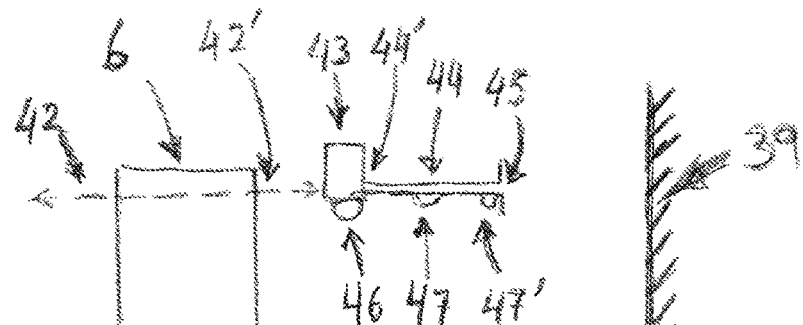
FIG. 16
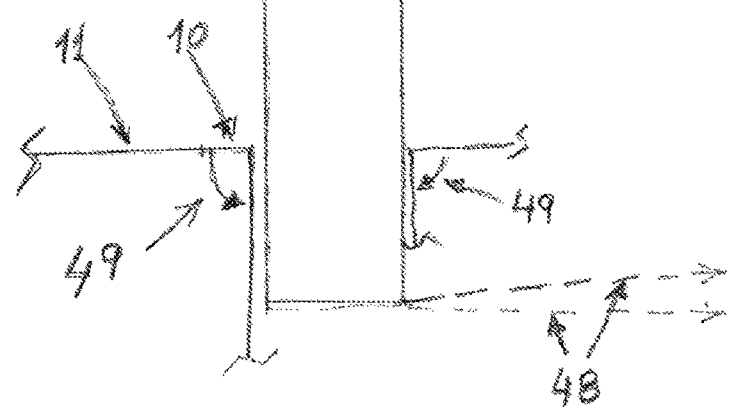

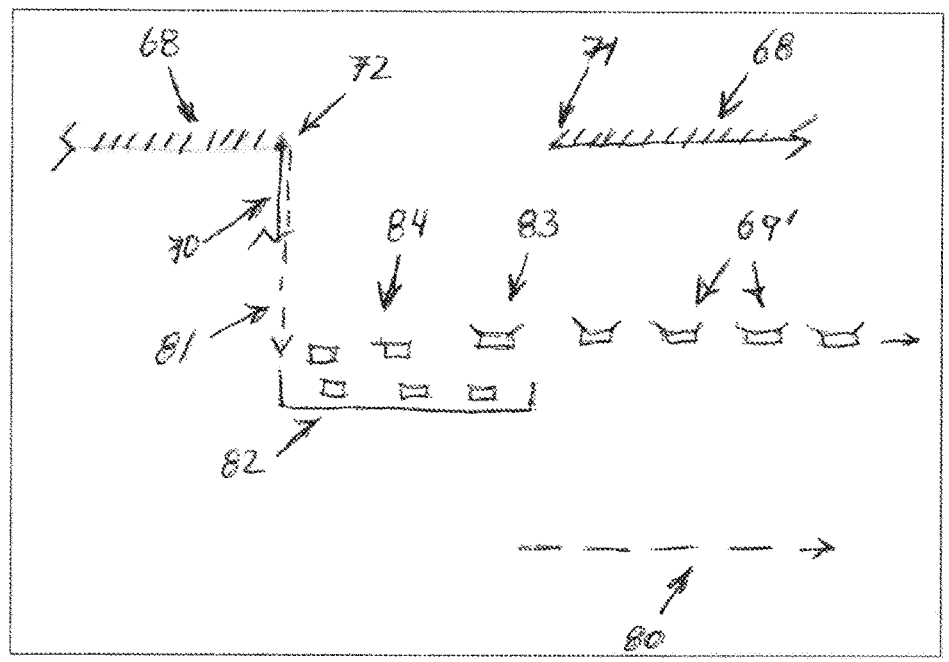
FIG. 25
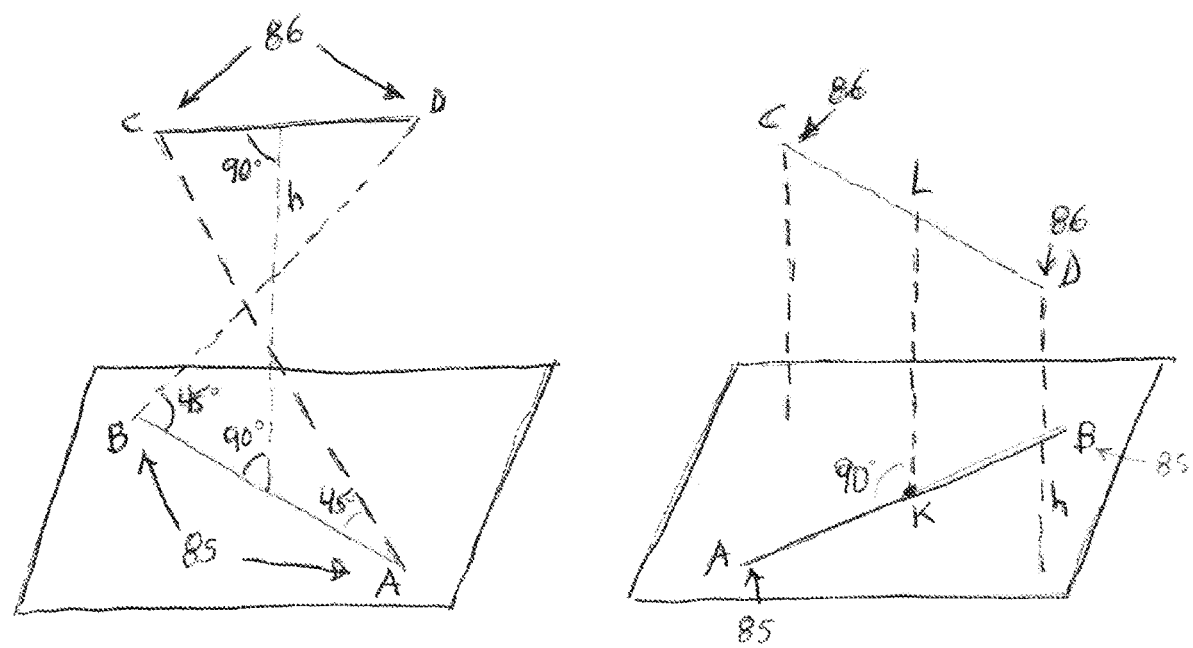
FIG. 26  FIG. 27

DRONE WITH FOUR WINGS MANEUVERABLE BY FLAPPING ACTION

CLAIM OF PRIORITY UNDER 35 U.S.C. § 119

The present Application for Patent claims priority to Greek Patent Application No. 20130100619 entitled "Small Bird-Form Flying Machine and Applications Thereof" filed Oct. 25, 2013, hereby expressly incorporated by reference herein.

BACKGROUND

Field

The present disclosure relates to small, unmanned flying apparatuses (drones), and in particular, drones that maneuver by flapping action of the wings.

Background

Small, unmanned flying apparatuses, called drones, already exist, mainly used by armed forces. News services exaggerate on the matter as usual, and lowmakers (in USA first) reluctantly consider enacting laws covering their usage by other administrative services and by the public at large (the private sector): usage deemed fruitful and indispensable by many, given that laws and regulations, strongly needed, get in force for their use and for safety in use.

Such apparatuses are mainly of the type of small airplanes; but also drone helicopters exist, along with several experimental flyers having wings with either a rapid reciprocating up-and-down motion, or a reciprocating fore-and-aft one. Each one of these four categories has its own disadvantages The small airplanes cannot float in the air (at a fixed aerial position), they are noisy, and they can not operate in inconspicuousness.

The small helicopters are also noisy, they cannot fly hovering with their motor idle, and they cannot approach a given point enough for clinging upon (to execute work while motionless, in inconspicuousness), due mainly to the dimension of the rotor's blades.

The existing insect-like drones have wings reciprocating up and down, which present a certain asymmetry in the consecutive motions up and down; inertia makes for fatigue and the materials wear out, or the wings must be strong enough and hence heavy.

During the down-motion the wing is in horizontal configuration in order to produce lift; then there follows an instantaneous swivel-like turn and in the ensuing up-motion the wing is in vertical position (on a vertical plane) for not having to meet any resisting air, then again there follows a rapid, reverse turn, the wing reverts to horizontal configuration for the subsequent down movement, and so forth. The speed of the turns is achieved through revolving mechanical blows which are noisy and cause wear of the material. Besides, these drones cannot hover with their motor idle, either.

The existing ornithopter machines have wings mimicking birds' motion: stretching and moving aft in one, contracting and moving fore in two. This composite in-and-out and fore-and-aft motion intends to make the machines unobservable, but the three-dimensional coordination can not be perfect, is not ergonomical, and so the flying quality and the stability in flight are not up to the mark, nor is the achieved inconspicuousness satisfying.

There also exist several further designs, very sophisticated in biomimicry and in technology, which unfortunately have been stuck in the blueprint phase, due to the single biggest obstacle for flight, inconclusive aerodynamic efficiency.

It comes down that no existing category of drones fulfills the sought requirements that could make them instrumental and productive in a new way, which are: low observability (hardly attracting attention), quietness, capacity to float in the air and to hover ability to approach and adhere to surfaces/objects, stay there at rest, and execute work when the moment comes;

ability to disengage from these places in a harmless way;

ability to execute various assignments/missions both while flying and while being stationary at places, as well as at the intermediate moments of transition: flying-to-stationary, and stationary-to-flying; and ability to withstand hardships such as rain, heat, vibrations, dust, wind gusts, etc.

For the time being, drones are being used for military purposes, and existing designs mainly serve these. New designs, though, emerge at a regular pace, calling for new uses and applications; mostly of large size and very high cost, enriched with high technology, with confidential if not secret systems. There is a need for new designs suitable for the private sector, small ones, with an affordable cost, with over-the-counter technology.

SUMMARY

The present disclosure describes a novel type of flying system for drones, or micro air vehicles (MAV). In particular, a flying system is disclosed formed of four wings integral with minute elements performing various roles in flight; they are made from transparent parts (and the entire drone is transparent); their form, extending X-style horizontally from the drone body, and their motion are copying a bird's (or an insect's) ones; thus they only attract little attention while flying or resting on a place and the flight passes inconspicuous, making the drone's role instrumental in missions where this character of inconspicuousness is needed.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 15 is a diagram of the 3 telescopic legs, horizontal view.

FIG. 16 is a diagram of the wall-adherence system, from the side.

FIG. 25 is a diagram of rapid retrieval of drones in mother drone's deployed net, from the side.

FIG. 26 is a Triangulation diagram: given 2 points on the ground, the remaining two are sought in the air, empirically.

FIG. 27 is a Triangulation diagram: given 2 points on the ground, 2 are sought in the air, at equal heights, simultaneously.

DETAILED DESCRIPTION

Figure 1:
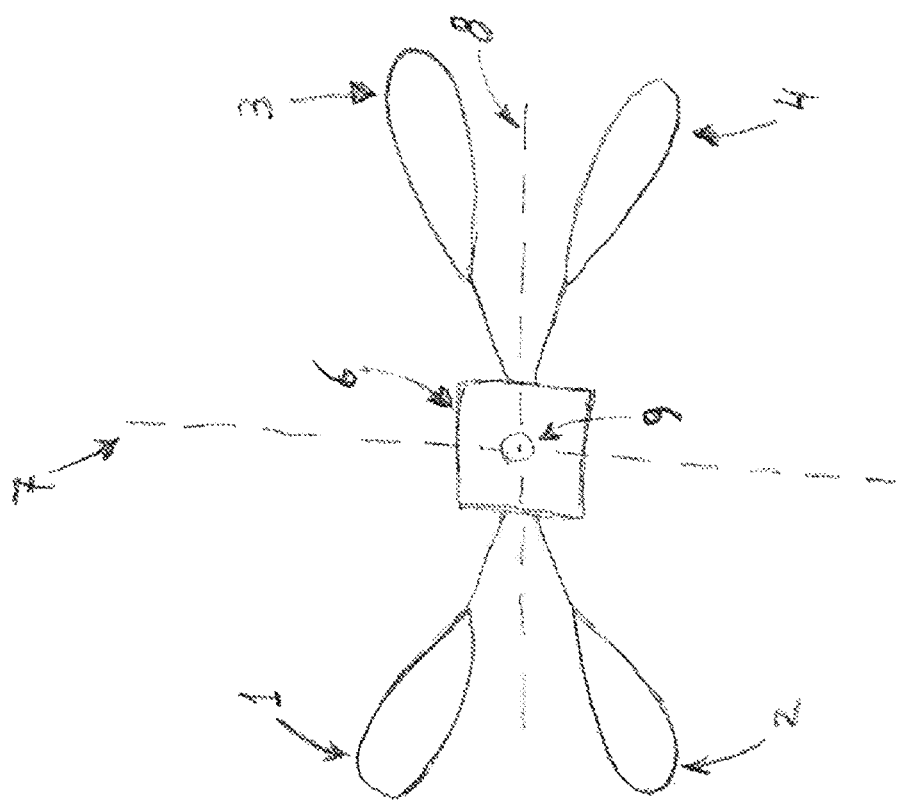
FIG. 1 is a sketch of the machine in horizontal mode, view from above.
Figure 2:
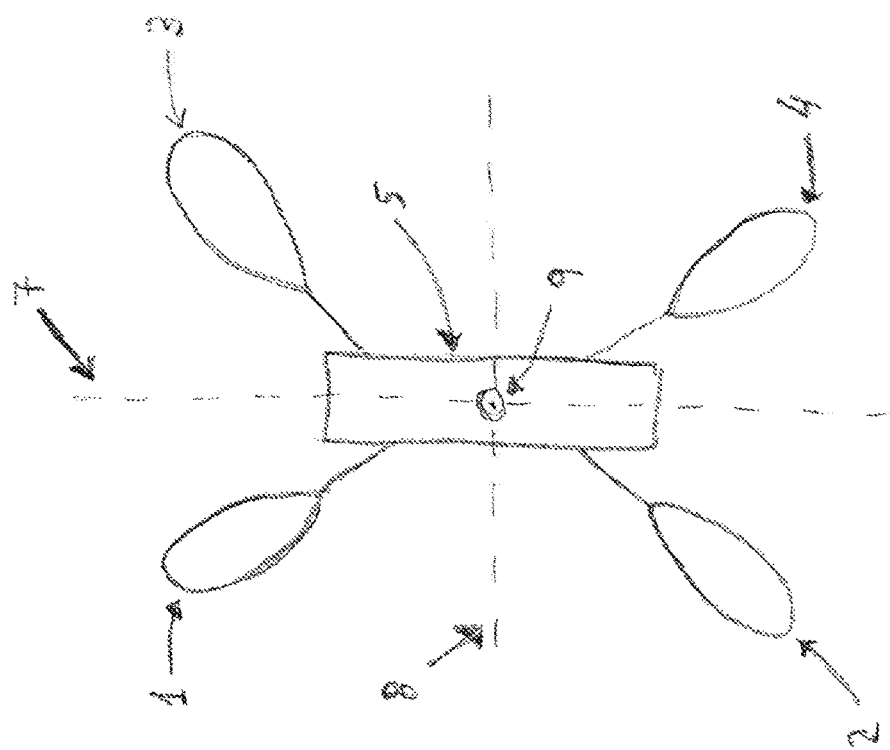
FIG. 2 is a sketch of the machine in vertical mode, from above.

The word "exemplary" is used herein to mean "serving as an example, instance, or illustration." Any embodiment described herein as "exemplary" is not necessarily to be construed as preferred or advantageous over other embodiments.

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The present disclosure describes a novel type of flying system for drones, or micro air vehicles (MAV). In particular, a flying system is disclosed formed of four wings integral with minute elements performing various roles in flight; they are made from transparent parts (and the entire drone is transparent); their form, extending X-style horizontally from the drone body, and their motion are copying a bird's (or an insect's) ones; thus they only attract little attention while flying or resting on a place and the flight passes inconspicuous, making the drone's role instrumental in missions where this character of inconspicuousness is needed.

The group of functions in which a drone equipped with such a wings system excels is when the drone is called to adhere on a surface or an object, horizontal (from below) or vertical, to stay there motionless, attracting no attention, and to perform work or whatever is needed. This is made feasible thanks to specific equipment-tools efficiently serving the need for adherence and support at those places: a hook, a glue subsystem, and legs.

The group of missions, made operative thanks to said character of inconspicuous flight and thanks to use of the adherence-specific equipment, is quite various. The drone can help in patrolling inconspicuously aloft, triangulation in 3D and penetration in otherwise inaccessible scenery and data transmission therefrom, and in approach and adhere to places in order to perform work there without attracting attention.

Each wing is oblong shaped, basically flat with a slight cylindrical curvature at the edges, and resembling a bird's wing since it is covered at the perimeter with camouflage material. Mechanisms move the four wings (10,11) in one of two ways, alternating them at will as programmed but also remote controlled (RC) in case of emergency: (i) the two pairs of diametrically opposite wings alternate in moving up and down (an insect-flight mode), and (ii) all four wings flap together up and down (a bird-flight mode). The wing turns round its longitudinal axis BC to generate horizontal thrust in flight, and flaps vertically in a repetitive two-part move (35) generating lift force: one, radial (33) round its support (A) on the drone body, and the other, parallel motion (34) together with the support, stretcher-like.

Longitudinal (15') and transversal (16') rods ("border lines") with I-form cross section divide the leaf's surface into equal rectangles (13) ("leaf elements"), open conduit-like air passages (while external leaf elements (14) adjacent to the perimeter 12' are either triangles, trapezoids or pentagons); all leaf elements are each entirely occupied by two non-overlapping, rectangular, equal-surface vanes (18), the "leaves" (the exception being the triangular ones, adjacent to the perimeter, 12', occupied by an equally triangular leaf). Each leaf (17) is articulated (hinged) at one of its longer sides to a longitudinal border (15) (part of a longitudinal border line, 15'), or (the external leaves) to a p-border (12) (part of the perimeter, 12'), and free to flap up and down with its flat surface; this revolving articulation (21, 24, 25) is fixed along the border's upper side, each border (15) having two leaves (17) articulated at its two sides.

For lift force generation (26), in upstroke (20) the air pushes the leaves (17) to revolve open (21) (due to its inertia) up to an angle slightly less than 90°, a restriction achieved thanks to a network of plastic fibers (27) ("under-fibers") stretched below and parallel to the borders, held-glued there at quite-vertical thin plastic stems (28) hanging from border lines' intersections; this restriction has the leaves ready to return (24), pushed upwards by the air in the ensuing down stroke (23), to original horizontal position (25) where they stick (and revolve no further up) thanks to another network of plastic fibers (29, 30) ("over-fibers"), longitudinal and transversal, interglued there just above the leaves' horizontal position, thus helping keep the wing surface airtight, fully occupied by leaves and borders, and prompting generation of lift force (26). Wing motion case-specific sequences, programmed for stability, befit flight in bird and in insect flight mode respectively.

Wings can also fold (49) out of the way in case the drone adheres and remains stationary in various places and attitudes (39, 40, 41 and 58).

Wings' transparency allows low visibility and low signature in flight.

Amplitude and frequency of wings' vertical move (35), and their transversal-angle attitude, are controlled and grant the drone capability to perform every type of move, at various flight speeds, every direction/slope/acceleration, lift-off and smooth landing, VTOL quality, 3-axis turns, maneuvers in the air, soaring like a bird and floating at a fixed point aloft. All this thanks to bespoke mechanisms powered by an engine and controlled by an onboard electronic (AI) unit.

The adhering subsystem confers the capacity to adhere to vertical places/objects by putting to use certain minute elements and the mentioned capability to float-fly. A heating element (46) warms a small quantity of thermoplastic material held in a container (43) and a pumping mechanism injects a few drops thereof in melted glue form through a perforated, horizontal needle (44) up to a connected washer-like small surface (45, 54), kept for a moment in contact (by float-flying) with the object to adhere to (39, 41); there the warm glue cools and solidifies instantly, maintaining adherence force to the object. A mechanism moves this glue subsystem between two alternate positions, from high in the drone body's side to low and v.v., serving in adherence to a vertical surface (a wall, 39, a corner etc.) and to a small-cross section vertical object (41) (e.g. a wire) respectively. Another mechanism brings-alternates two washer-like elements (45, 54) in front of the needle (44) for adhering on a wall (39) or a wire (41): a flat one and an angled (V-shaped) one respectively. The drone stays at the place ready to perform work, and at the end the glued contact (45-39, 54-41) is heated again (by another heating element, 47), melts, and the drone flies away.

For staying adhered to a wall (39), two horizontal elements (48) extending from low in the drone's side provide a steady support, whereas in the case of a wire (41), a four-needle hook (52) protrudes horizontally from high in the body side to expertly get anchored onto the wire (41), to secure adherence attitude; eventually the hook disengages (56'-57) equally expertly at mission's end and the drone flies away free.

The drone accepts at the subsystem's place other devices, replacing it for adhering onto other objects in a multi-mission: an electromagnet, for iron posts; a needle, inversely catapulted, for vertical wood; a boring drill (50-51), again for wood (40); and a sucking device, for glass. Thanks to the wings' abilities, adhering action is hardly noticeable: approach/departure get no attention, being immobile (resembling a bird) passes unnoticed, and the drone has a low signature to tracing means.

A hook subsystem (60), similar to that (52) used to adhere to a vertical wire (41) but operating vertically, being turned by 90°, is used to adhere to horizontal objects of small cross section (e.g. a wire, 58) by putting to use the wings' mentioned capacity to float-fly. This subsystem pushes up (59) and maneuvers expertly its hook (60) to grip (60-60') on to the wire (58); the drone stays hanging to perform work, and eventually maneuvers (56', 57) to disengage and it flies away. This process is inconspicuous since the drone, resembling a bird, flies in floating mode and hooks (60-60') on the wire (58) unnoticed.

A drone equipped with the described set of wings can render service by overflying land, forest etc., detecting a hazardous event (forest fire etc.) and intervening to gather evidence from close. The wings are a metallic version adapted for the circumstance: they dispose piezoelectric-quality leaves, to endure high temperatures and updraft wind in blazing areas; they also have sensors/electronics/attachments vital for the mission, all heat-resistant; a database of the area surveyed (reported/potential hot spots, and the land's relief), or provision to download it while in flight; audiovisual pattern-recognition software; two cameras (optical, IR); and a tele-microphone. The drone flies high in regular raster-like pattern scanning the area allotted, assisted by GPS, first in reconnaissance to update the databases, then in a patrolling role to repeatedly overfly places every 10 to 15 min., ready to detect eventual evidence of smoke puff, intense light/temperature/sound, explosion etc., rousing no reaction, resembling an overflying bird. In such events it compares evidence against the inborn database, pitches down to safely approach the place, accordingly zooming the cameras, and transmits video to RC operators in patrolling vehicles or HQs.

It ignores innocuous evidence (identified by the software as an animal, as rustle/knocks from tree branches, archived chimneys, fireworks, or a broken bottle under sunlight), it forwards details about persisting temperatures and lots of sparks, and recalls from inborn storage and transmits the last 15 min. video shooting (prior to it being erased, as programmed) for operators to spot eventual suspect past moves; eventually photos are taken on command. If a chimney ejects sparks, thick smoke, heat for longer than a preset time, it is identified and action is on; thereafter, in a blazing (forest or town) fire situation, the drone surveys new hotspots, maps them and informs ground firefighting crews.

A flying drone can enter and perform in various sceneries, efficiently and as inconspicuously as a bird can fly, disposing the described type of wings and augmented reality devices; the following sceneries/situations, apparently differing, highlight in common the kind of the drone's usability, using the inborn electronics and audiovisuals to perform diverse assignments in complementary mode.

Electronic and computer games are one such category of sceneries, whereby the drone represents the player in real flight, not fictional, in both man-made and natural sceneries, simulated or carrying masks (one of them being its own, bird-form).

Keeping an eye on natural environs, borders, sensitive facilities, herds, protected wildlife etc. is another field of usage, leaving activities' flow unaffected, alike to a "bird" soaring around and rousing no suspicions, non-arousing (for example) poachers' coveting capture of such distant "living" and flying specimen. The drone records distinct sounds from the milieu using telemicros; it sound-processes/alters them, and reproduces them (at irregular times/intensities) both televoiced and in tiny loudspeakers scattered in the area, radio controlled, taking turns.

Also veterans under treatment can benefit: those getting psychological (audiovisual) help to overcome meta traumatic disorders (PTM&SD etc.), using augmented-reality optronics (Oculus-rift etc.) to ease exposure therapy, virtually visiting past memories' theaters, e.g. battlefields, either recollected, faintly recalled, or famous historic ones (simulated, the latter). The (disguised) drone, blended into this existing practice, flies around and helps faint memories be recalled by tele-immersion into such theaters, the added value being not letting their presence affect importantly the place (jungle, village, coast, offshore etc.) and not excessively using avatars/simulations. The patient hears/sees (through tele-micro and double-camera front/rear) and is heard/seen (through onboard loudspeaker/monitor, or additional larger screen if needed): in relative inconspicuousness, thanks to their virtual-only presence in the field and to the drone's bird-resemblance.

Another useful application is a captive-flying drone being the virtual periscope of a towing submarine sailing underneath, lower than at periscope depth; it transmits data/video through the tying wire which pulls sufficiently for the drone to maneuver like a bird in curves and thus pass unobserved by faraway tracing means: taking off on command, flying high, attaining big surveillance ranges, serving far better than usual periscopes through inborn audiovisual and other equipment.

In all these cited exemplified versions of its usage, the drone as interaction medium carries case-specific augmented reality devices; it is since its conception designed to satisfy all the above callings and more, accordingly equipped, easy to adapt between cases and always remaining least observable.

Another type of application consists in inconspicuous surveillance of, or escorting, a moving object (car, train, airplane, even a disguising hood), performed by a small drone capable to resume operation even after discontinuities take place, thanks to appropriate chemistry and mechanisms.

The drone (5), being tiny in size and flying quite invisible thanks to its wings' transparency and to its bird-like flight, tags at the target's surface (65) or roof (by getting close or contacting unseen) a small RFID signaling device (prepared with sticking means on its surface), or a quantity of traceable substance (66) radiating in specific frequencies; next, this or another drone flies at safe distance in surveillance-escorting mode. Tagging with the substance is either done by spraying it from close at controlled angles, or by letting a drop fall or by launching (blowing or piston-pushing) a droplet (66) enclosed in protective membrane; upon falling with momentum the membrane is broken and the material spreads unobserved (67), alike to a bird's minute dejection, obscene but unimportant. The RFID device's operation either ceases with time or actively by sending a deactivating signal or by commanding self-demolition; the substance's radiating function either ends through timely deactivation or actively by beaming a specific ray onto it, resulting in chemically breaking it.

A different, group-working method of operation consists in a group of drones' resembling a small cloud in inconspicuous flight, disposing wings as described above, of which a large "mother drone" carries in flight a payload of safely stowed small, subsidiary or "daughter drones"; it releases them aloft to deploy in formation and perform collective work, and eventually takes them back in, in flight, all this being programmed or partly RC-ed. The daughter drones exit (75) the mother drone (their base) from its underbelly (68), maneuver in 3 dimensions in its company or not, fly in formation (and alter this, the density of flight and form of moves), scatter and regroup keeping controlled distances, follow individual roles as needed, and in due time reenter (78, 83) the mother drone (68) or otherwise disengage. They have mission-specific sensors/software/equipment, and appearance: basically bird-form, least observable both in individual and in flock-form flight, but also (oversize) insect-form with the above described wings' motion. The mother drone sends the group radio commands or it relays the operator's ones from HQs, and manages the daughter drones' moves: exit/deployment (76) from the underbelly (68), their collective flight, and getting back in (78, 83), safely stowed in rows/levels in transfer. For exiting, a backwards-guiding gate (70) is lowered (73); for reentering, the downed gate (70) swings to open forwards (74), scoop-wise; or for rapid group-reentering, a scoop-form net (82) unfurls (81) below the underbelly (68).

Another group-working application consists in a drones group's collectively performing a local GPS-like operation in floating flight mode, equipped with wings of the described type conferring partial invisibility aloft and constituting a daughter-drones group. The drones occupy in the air steady points of a local geo-positioning network covering a wide area independently of the widely used ones (GPS and rivals), owned/used by a private enterprise or a state agency. This gets implemented step-by-step. First, points widely visible are defined on the ground (high-rise roofs, hill tops, forest high points) at which a proprietary auxiliary transmitters network is installed and adjusted on the base of said networks (GPS etc.) to help put right the main one aloft. Second, a mother drone takes off and distributes the smaller drones in the air to occupy their prearranged places at a level plane in floating flight mode, neither overflying sensitive facilities nor bothering airport approach/airliners' flight paths, equipped with transmitters and programs for operation and position-adjustment, this latter being controlled at a frequency not less than 10/1" to brave wind gusts. Transmitters are adjusted on the base of said networks in peaceful times: on getting installed, or after landing (to refuel, to receive maintenance, or to evade stormy weather) and taking off back to position (or on reserve drones' taking up their position instead); or they are adjusted on the base of said proprietary, auxiliary ground network in critical times, when said grand networks keep absolute accuracy confidential. The drones either fly non-stop, receiving wireless energy or disposing photo electrics and battery, or are motorized and are recalled to land for refueling and maintenance.

An altogether different group-wise application of drones, disposing the characteristic capability to fly inconspicuously with their wings as described above, is a collective monitoring/transmitting operation in chain-like succession, the drones operating like daughter drones, either flying or being installed (in adhering mode on vertical surfaces or hanging from horizontal wires) at points along a virtual line, resembling a least-observable succession of innocuously flying or standing birds, each one within view from adjacent ones on either side, thus helping the operator receive information and video from distant, normally inaccessible places through augmented reality technology. This eases the operator's virtual presence there, realized by optical transmission (accurate, interference-exempt) along the virtual line from drone to drone, either floating-flying or clinging stationary on objects, with 3D photo-capacity, pattern-recognition software, and programming for narrow optical (in IR and UV) transceiving, compressed and spaced-out for security, also coded through polarized-angle jumping (that is, quantum key distribution, QKD); in parallel, radio transceiving programming is kept on standby. Each drone disposes a flat mirror (61) and a mechanism adjusting its incidence angle so that the light beam (63) (carrying data/video) coming from the next unit in front be reflected towards the direction (62) of the last unit behind (and v.v.). The drones are transported by a larger, mother drone: each one exits at safe distance, flies low to its programmed place (disposing the area's ground relief in store), and stays there float-flying or sticking to a firm object, ready to operate; it helps visually locate next one's position in front, watches over its installation, takes aim at both this and the last one behind, and adjusts the mirror and the 2 antennae (front/rear); then successively in a row next drone in front performs alike and the network is finally operation-ready. Amplifiers are supplied at distances as needed to restore signal strength decrease due to repeated unit-to-unit transmission. On mission's end the unit most in front disengages first (if not ruled to self-demolish), supervised optically by the one behind, and flies away; next ones back in line do alike till all are retrieved by mother drone or fly low, back to safe grounds, assisted by GPS.

The drones are also instrumental in performing triangulation in 3-dimensional space; their deployment is 3D, daughter-wise (transported and released by a mother drone) if distances are great; they operate as a 4-strong group, either float-flying, inconspicuously, disposing wings of the described type, or standing immobile, adhering on vertical objects or hanging from horizontal wires, as near as possible to a virtual regular tetrahedron's apexes; they have sensors, programming and RC subsystems and can locate instantly in 3D an event's point of origin: radio/TV/e-m signal, detonation, flash etc.

A 3D-triangulation using four drones ("tetr"angulation, really) adds to a habitual triangulation's definition of a point in a horizontal plane the extra definition of the point's height from ground which is the issue's value added: angles are measured as usual in every 3-apex plane (all 4 of them, the tetrahedron's triangular sides), then bespoke software computes distances and estimates coordinates. A 3D-triangulation is enacted step-by-step; tetrahedron's geometry is used in installing/adjusting the 4 drones.

Some drones (either 1, 2, 3 or all 4 of them) are positioned aloft (94, 86, 101, 95-96), and the remaining ones (if any) on the ground (98, 85, 93): maximum 3 (93); firm objects/clear surfaces are sought at the apexes of a tetrahedron, suitably chosen, and drones are guided there to cling stationary, adhering or hanging or just lying on the ground; if nothing fixed exists near an apex, a drone is installed float-flying firm at it, braving wind gusts, position-adjusted at a frequency at least 10/1"; to secure this, as many auxiliary ground-based transmitters (like those described in the GPS application, drone-borne) as needed are used for continuous adjustment: 3 in total, of which one, two or all three can be triangulation's drones proper, the remaining units (if any) being auxiliary.

Next, adjustment takes place and the triangulation sessions can be effected. Drones positioned this way serve in accurately detecting events originating inside the tetrahedron's space, but also to some extent those outside, even at distances four times the tetrahedron's edge.

Position definition of the 4 apexes is effected in case-specific ways, depending on how many of the four points are self-evident, easy to think of, the remaining to be sought in the environs; e.g. given one point high (adhering on a high-rise wall, 90, or float-flying) and a second one on the ground just below (91), and seeking two points opposite in the street at mid-height on walls or trees (92). A four-drone group can also escort a convoy, flying unobservable at triangulation-ready distances, or similarly escort a car, possibly tagged as described.

The present flying machine, proposed through this invention, innovates because it can execute the internal functions and the external work that the existing drones already execute, with a piece of value added: it can execute them with full satisfaction of the above requirements; it offers an appearance of continuous reciprocating motion of wings in natural succession (not too rapid, not in sequence of horizontal and vertical stance), unobserved and inconspicuous, since an accidental bystander's eye can only notice as follows: (i)

It remarks an object with moving wings, soaring in quietness in the environing space, among many other moving objects and (ii) has a fleeting feeling of noticing a bird, or an insect, and at once gets unconcerned towards it and so, at the moment the functions and the work get executed by the "bird's", the drone's accessories, there is no vigilant eye in proximity to comment on the fact.

Specifically, the four wings of the present machine perform well because a) with their very simple motion up and down, allowing air to pass freely through them in the up- and blocking it in the down-direction, and b) with the possibility they offer to the machine to pitch, roll and yaw and thus to execute every manoeuvre possible, the machine can cope with every demand for flight, turn, escape, survival, etc.

More specifically, the machine either resembles a bird (this is the case when the pair of the wings on the left side move jointly between them and in accordance with the two on the right side, i.e. the 4 wings move simultaneously), or resembles an insect (in case two diametrically opposite wings move simultaneously up while the remaining couple move down, then the inverse, and so on repetitively). In both cases, each wing executes the same up-and-down movement.

The machine further innovates with its ability to approach and to cling onto various places, in adherence to them, and to stay still there, in inconspicuousness, in order to execute functions and work, fully unobserved; such ability offers a further piece of value added. Drone helicopters (the only group of existing drones eligible to cope) cannot achieve such a procedure, due both to the vertical rotor's distance from the body and to the size of the horizontal rotor's blades, or in the case of multiple rotor helicopters, due to the large dimension of the system: this renders a satisfying level of approach impossible for this class of drones; besides, for drone airplanes it is unthinkable to imagine such an endeavour. As for the existing types of insect-like and ornithopter drones, the motion asymmetry of the first one and the jerky motion of the second one make for flight full of vibrations, discouraging designers to venture onto such procedures.

Given the two aforementioned abilities (it flies inconspicuously, it remains still in places), the machine is capable of accomplishing missions where furtivity and inconspicuousness are sought and noticeablity is shunned. Furthermore, it is exclusively suitable for undertaking such missions where unobserved approach to the workplace, and remaining motionless at it, are of importance. Several applications, missions of such a character, are described in the following.

Numbers of existing drones are systematically used in conflict zones and are being assigned various missions therein; furthermore, they render service in GIS work, firefighting, and some more. And in the private sector, freedom to use them is sought but lawmakers don't seem to rush to.

The present drone can produce work and render service in these sectors with more than a little suitability; it can open the door for novel types of missions thanks to its two inborn capabilities as above, and serve further sectors and purposes like the following: media, augmented reality, education, games, environment, outdoors (wildlife etc.), real estate, law services, security, and more.

Related Art

Patent GB 1919/124607, H. Hetherington.

Figure 7:
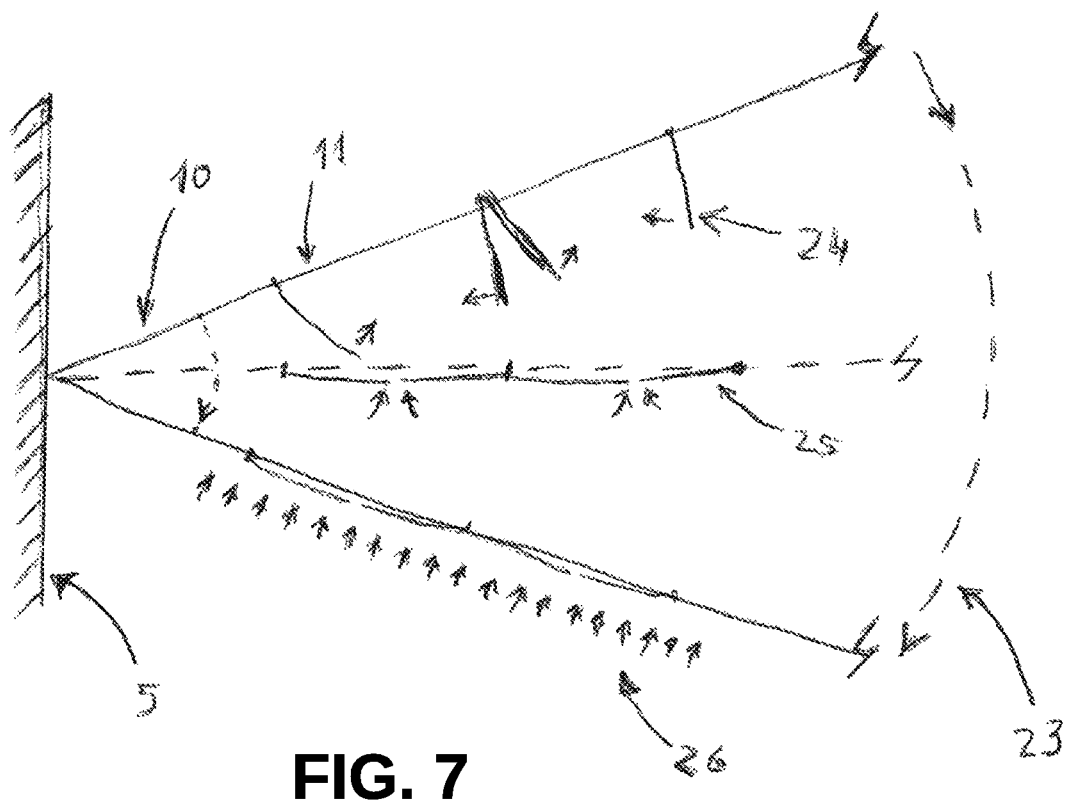
FIG. 7 is a diagram of the down-motion of a wing, longitudinal view.
Figure 8:
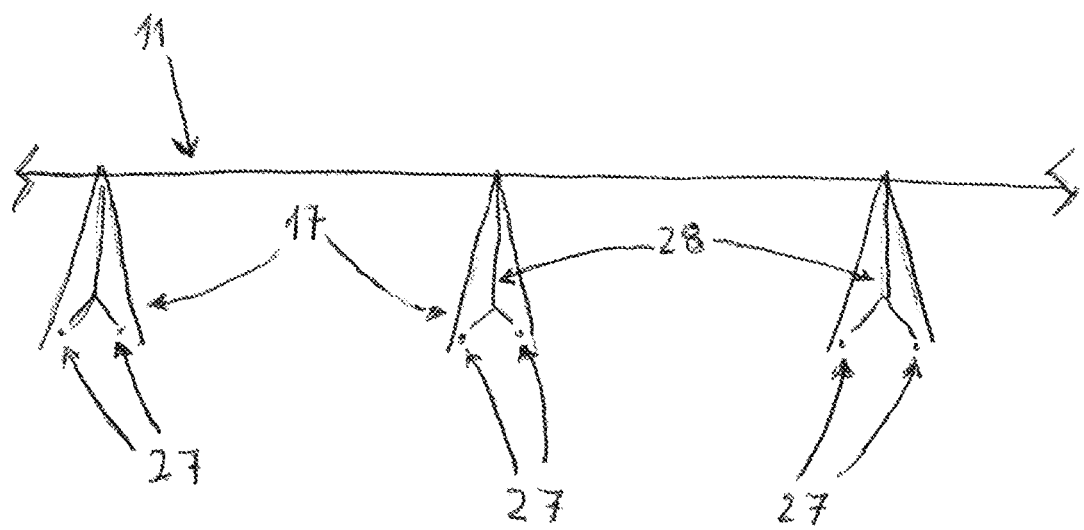
FIG. 8 is a diagram: leaves, underfibers, and inverse Y stem, longitudinal view.
Figure 9:
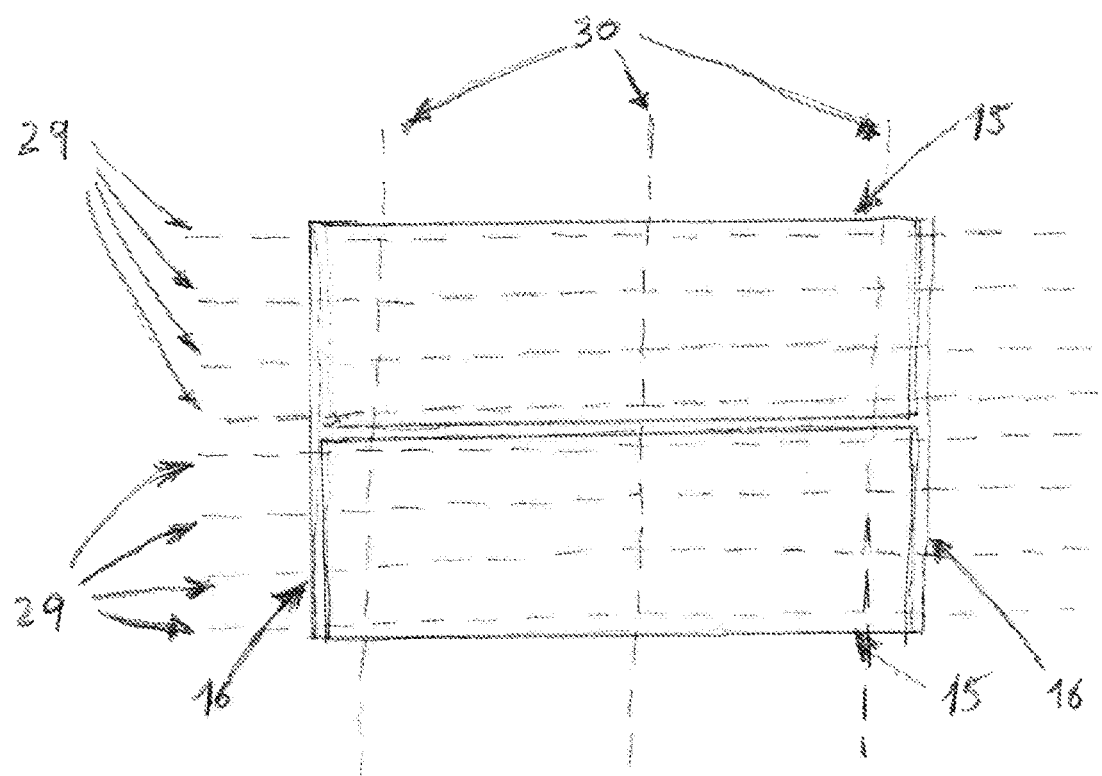
FIG. 9 is a diagram of over-fibers on a leaf element with 2 leaves, from above
Figure 10:
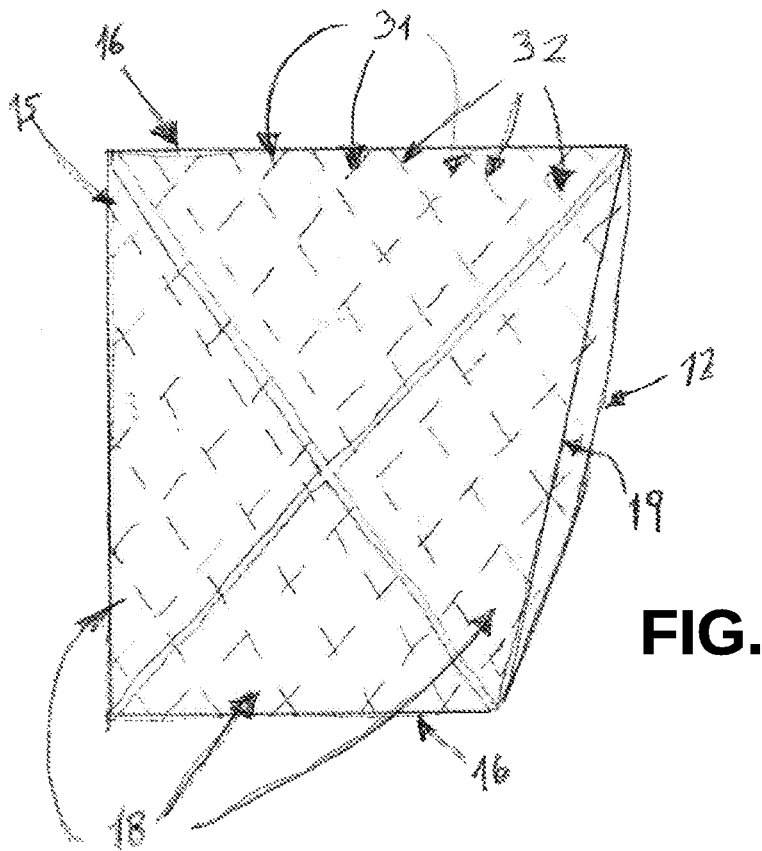
FIG. 10 is a diagram of over-fibers on a leaf element with 4 leaves, from above.

11a. It is stated (p. 2, l. 51) that, when floating/drifting, air pressure maintains the wing surface intact; this is objectable, since the brakes (stops) (25) against the vanes (24) opening upwards (FIG. 7) cannot keep them on this surface, the vanes gravitating to an opened position (p. 2, l. 46) when idle (either this, or the upward stops must be re-designed in FIG. 8 with lesser or no height); another objection is that the two stops (25) on the sides of each vane (24) act (to stop the vane's upward motion in the wing's downstroke) on the two sides of the vane, on a particular point in either side, generating flexure on two dimensions: one, on the vane's front-to-rear direction, generating the vane surface's sagging, and the other, on the wing's transversal direction, flexing the vane's free part (between the stop (25) and the vane's free angle); these two effects are counter-productive to generation of lift force (leaving gaps in the perimeter of the vane and restricting in reality the active, lift force-generating surface of the vane and of the wing in total) and cause fatigue of the material; to counter this, the material of the vanes must be strong to meet the mechanical claims, which translates into excess weight.

11b. There is no mechanism or device allowing or restricting the vanes' downward opening in upstroke to a predetermined degree of opening, making sure their return to normal horizontal position in the wing's downstroke.

11c. The T-section frame members 20 (FIGS. 4 to 9) restrict the wing's active, lift force-generating area versus having elongated vertical I-section, for having the horizontal protruding parts on either side, due to (possibly) inefficient materials available at the time.

Figure 11:
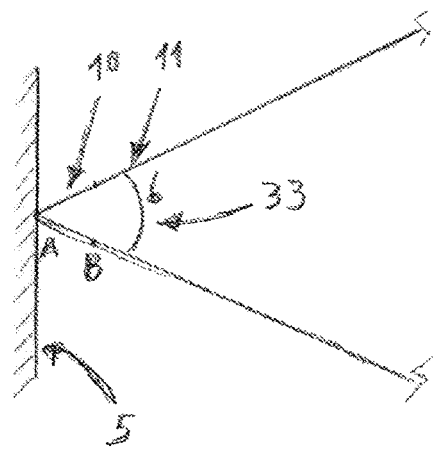
FIG. 11 is a diagram of the radial component of the motion, longitudinal view.
Figure 12:
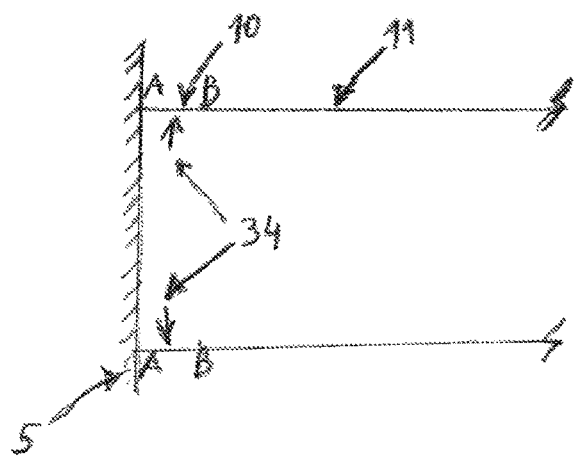
FIG. 12 is a diagram of the parallel component of the motion, longitudinal view.
Figure 13:
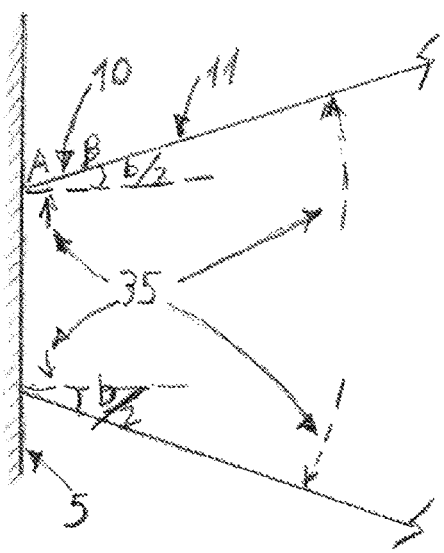
FIG. 13 is a diagram of the composite motion of a wing, longitudinal view.

11d. The brake (9) countering pulley wheel's (5) too fast revolving (FIGS. 11-13) is counter-productive and may be omitted, since resistance to air normally provides the restricting force against the lot of interconnected mechanisms revolving fast.

Figure 14:
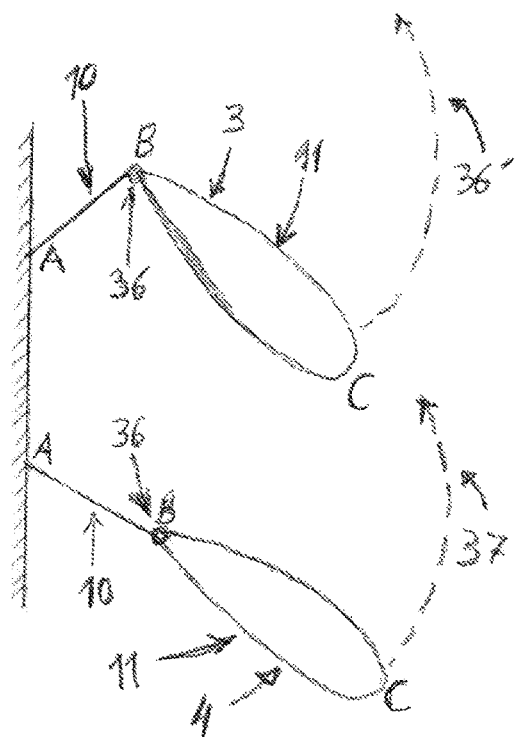
FIG. 14 is a diagram of the tweaked flight mode, from above.
Figure 17:
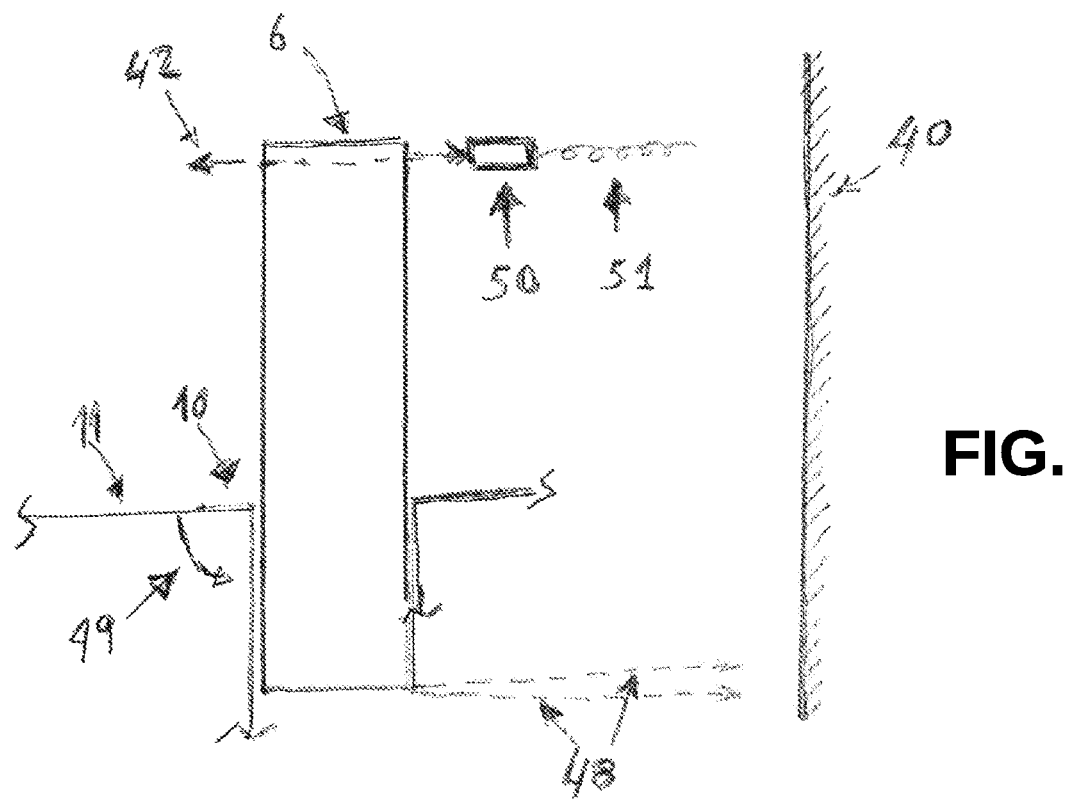
FIG. 17 is a diagram of a perforator adhering on a vertical wooden object, from the side.
Figure 18:
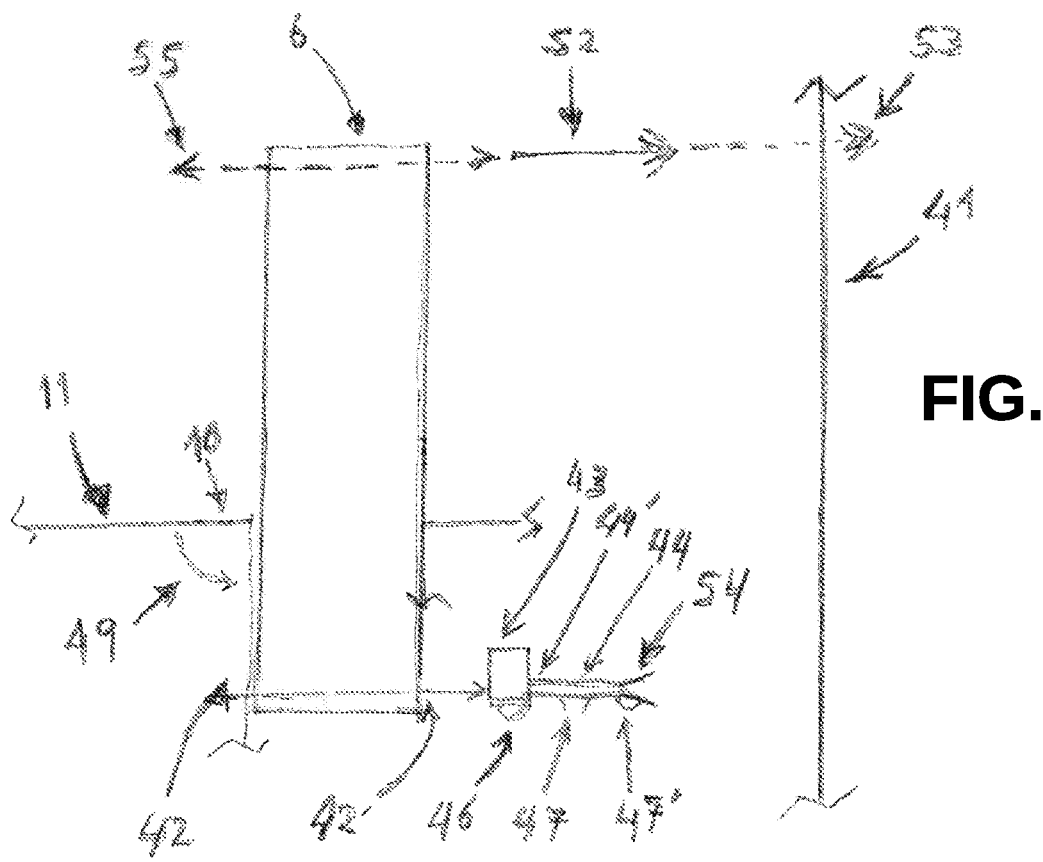
FIG. 18 is a diagram of the vertical-wire-adherence system, from the side.
Figure 19:
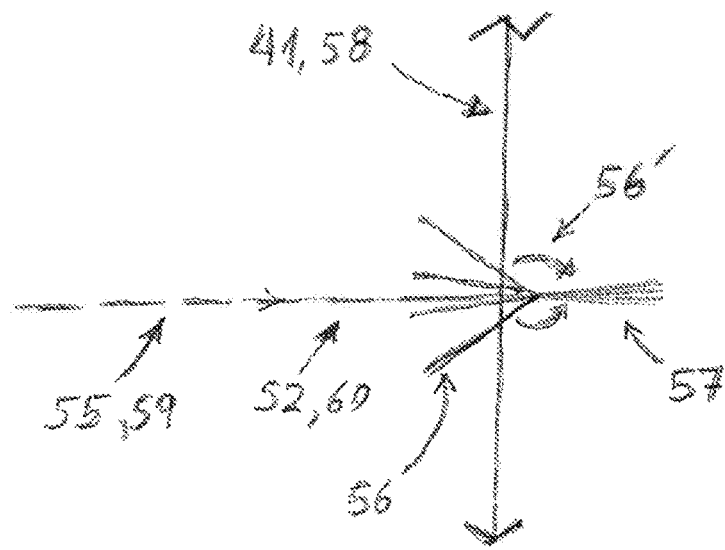
FIG. 19 is a diagram of wire-adhering hook, needles revolving by 135°, from the side.
Figure 20:
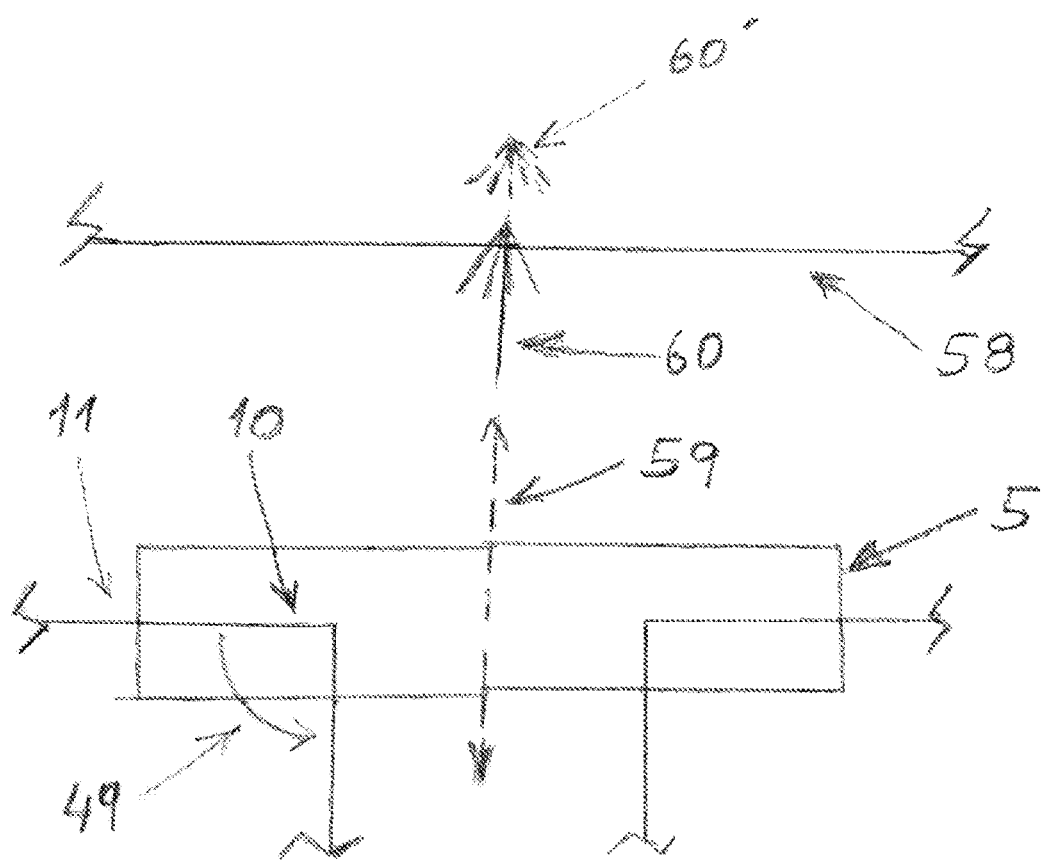
FIG. 20 is a diagram of the horizontal-wire-adherence system, from the side.
Figure 21:
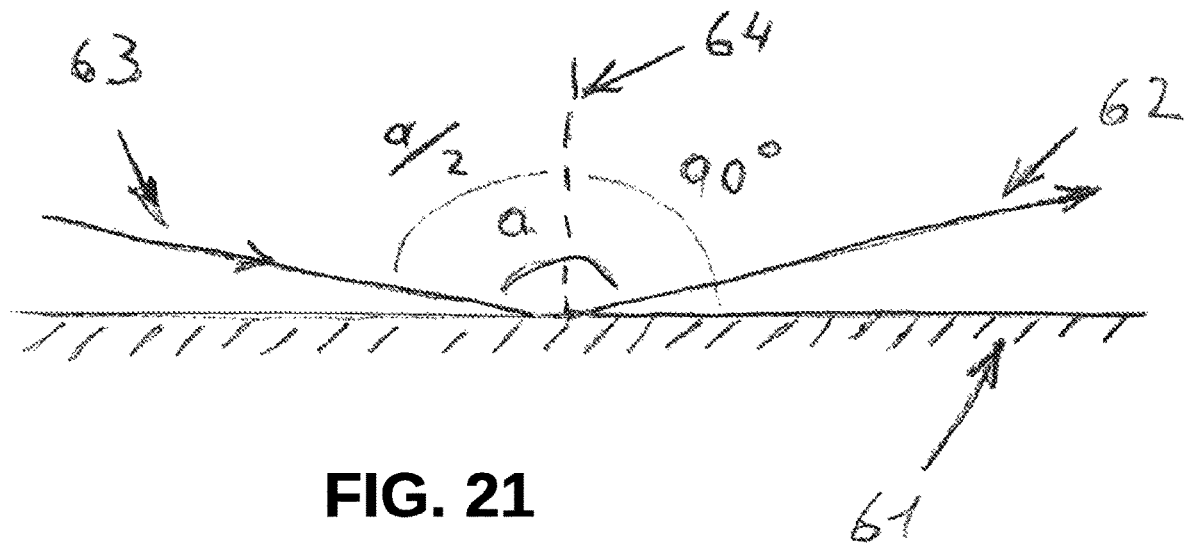
FIG. 21 is a diagram of optical beam reflecting on mirror in Penetration, from above
Figure 22:
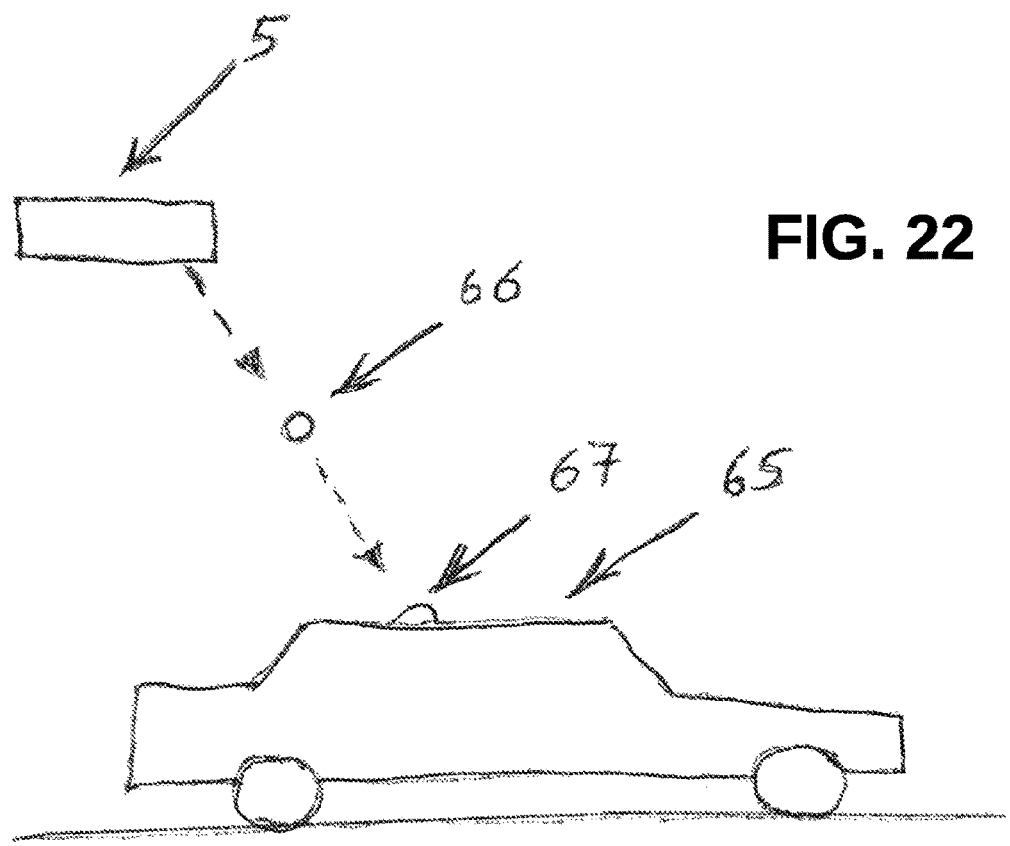
FIG. 22 is a diagram of launching a tag drop onto a car's roof, from the side.
Figure 23:
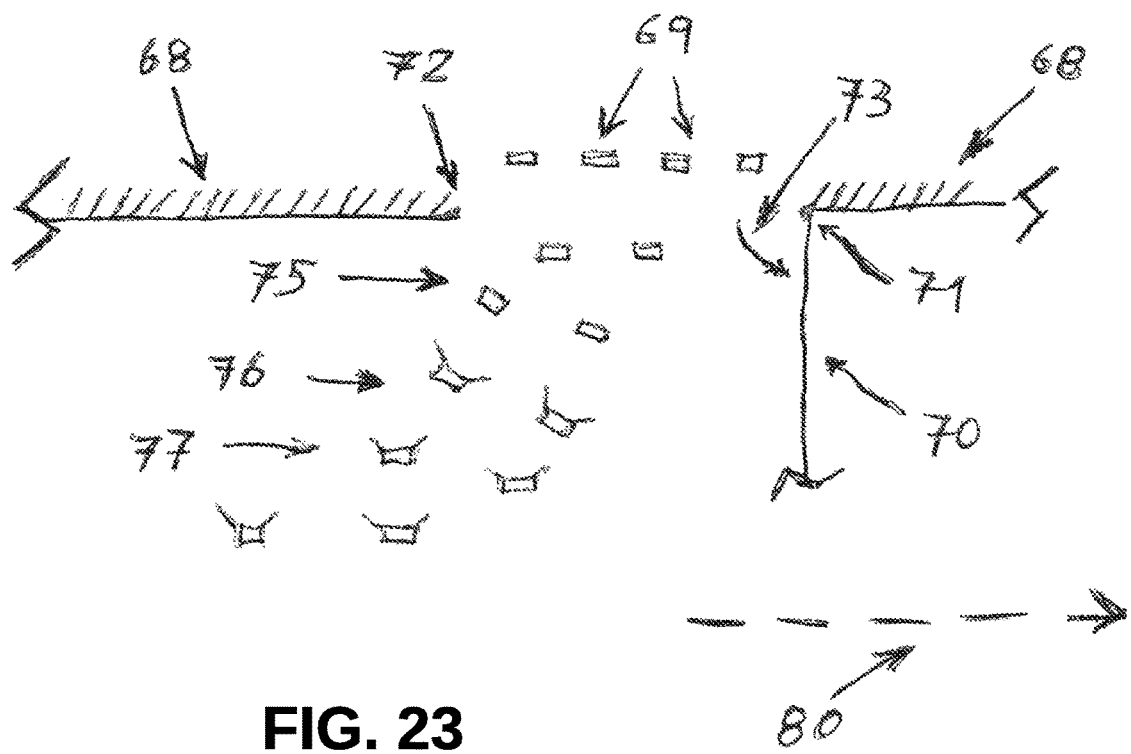
FIG. 23 is a diagram of drones let fly free and deploying out of mother drone's gate in Collective, from the side.
Figure 24:
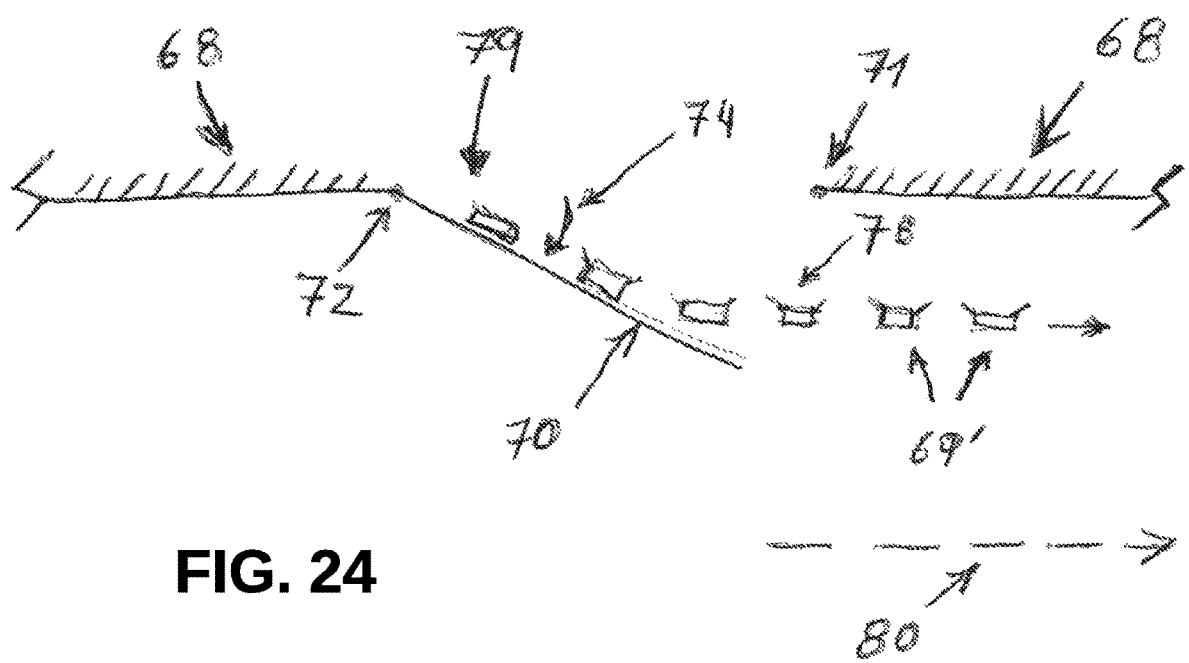
FIG. 24 is a diagram of gradual retrieval of drones back to mother drone, from the side.

11e. The proposed mechanisms for the elliptical motion of the wings (page 1, line 33) and the motion of the tail are not quite biomimicry; in detail: (i) the wings are too predeterminedly mechanised, since grooves (42) and depressions (43) of the pulley wheel (5) (FIGS. 14-16) and pins and other minute elements and the great number of gears give a non-natural appearance of repeatedness (and are prone to malfunction), and (ii) the tail's control is too rhythmic, since pinion (33), cooperating with hand heel 36 and controlling the vertical rack 34 (FIGS. 15, 16), only permits vertical motion (and is again prone to malfunction) or whatever rotation angle about the longitudinal axis has been preset in the hand wheel, thus not really steering the machine, if not in.

12. Patent US 2000/6082671, R. Michelson/Georgia Tech R.C.

12a. The wings generate lift force by only flapping up and down, which is not really productive; and the two-stage biomimicry (flying, crawling) is mediocre.

12b. Birds' wings, efficient due to evolution, extend with their parts leaving gaps between them in the up-for-ward move, and retract with these parts leaving no gaps in the down-rear-ward one, and so the air presents minimal resistance to the former and substantial one to the latter move, and compound lift and frontward force is generated. In the invention the interstitial material attached to the wing spars (26) and (27) allows some undulating configuration during each wing's motion against the air, permitting a certain amount of lift force generation, but this is not satisfactory.

12c. The hollow flexible stiffening veins 120 to 127 the flexible exoskeleton 34, the elastic outer skin of reaction chamber 51, the horizontal flexible strap separating the bladders 85 and 86, the vertical such separating the differentially inflated bladders 93 from 94 and 95 from 96 and the flexible pressurised bellows 220 and 221 as well as 320 and 321, are all prone to fatigue after a great number of extension/retraction (and more so if the entomopter is to fly outdoors, under solar UV rays.

12d. The use of waste gas flow to produce sounds and range distances in the year 2000 is academic but impractical (far better devices, electronic ones, exist and do not need any gas flow).

12e. Concerning the crawling capability, the exact moment of leg's 140 engagement at the leg angle stop 146 (against the leg actuation arm which reciprocates up and down at a rapid pace) under the weight of the fuselage is uncertain and so the mechanism is prone to malfunction, so much the more since there are four leg mechanisms.

13. Patent US 2006/0102782, M. Earl, R. Earl.

13a. The comments in previous Paragraph 12a and in the first part of Paragraph 12b are also valid here. The invention employs elastic wings with highly torsional configuration of their central parts near their fulcrum (FIG. 1), mainly by attaching the wings firmly to the body (in the preferred embodiment) and having the wing spars bent to the rear (paragraph 0012, 0013); this helps in generating a certain amount of lift force, but it is not satisfactory.

13b. Rear strut extensions (39) and pliable mylar membrane material (FIGS. 11-13) confer elasticity in up- and downstroke which also generates some forward force, but this is minimal.

13c. The machine is in reality a toy-like device, the elastic band-form power source (7) providing a very low force, duration and total energy (FIG. 1).

Figure 3:
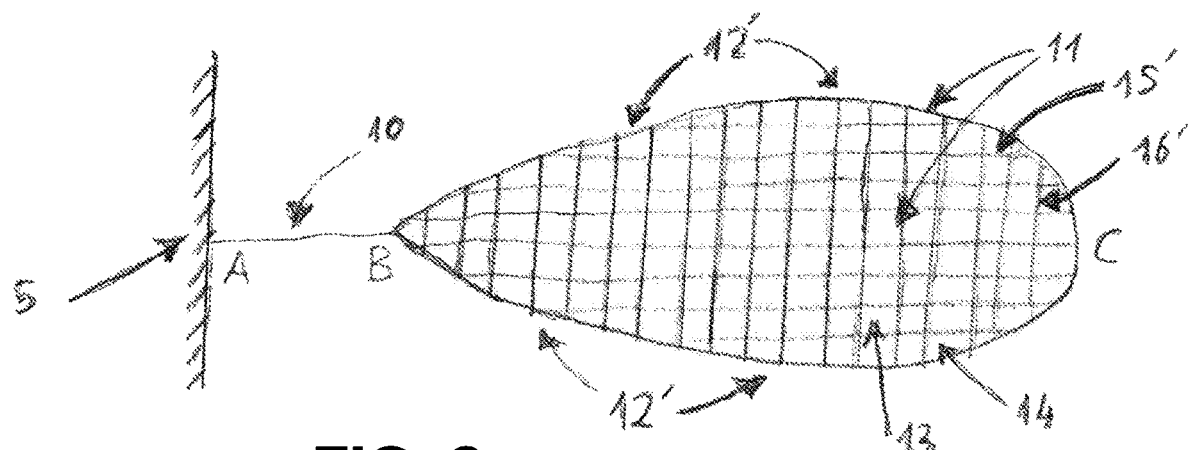
FIG. 3 is a diagram of a wing, from above.
Figure 4:
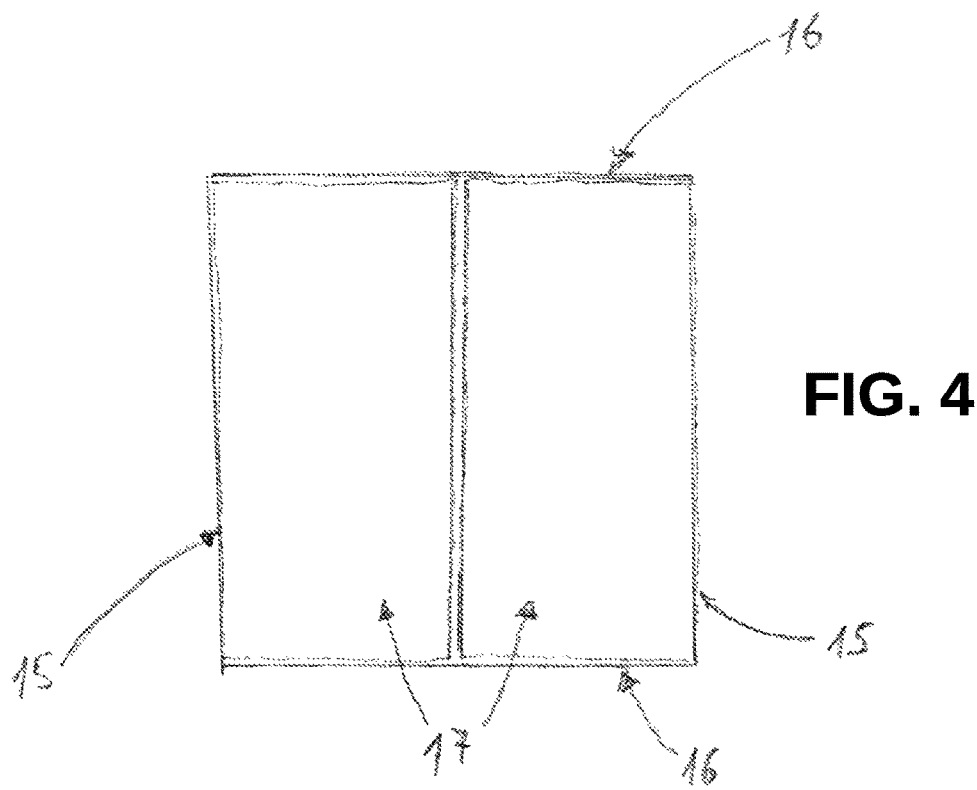
FIG. 4 is a diagram of an internal leaf element with 2 leaves, from above.
Figure 5:
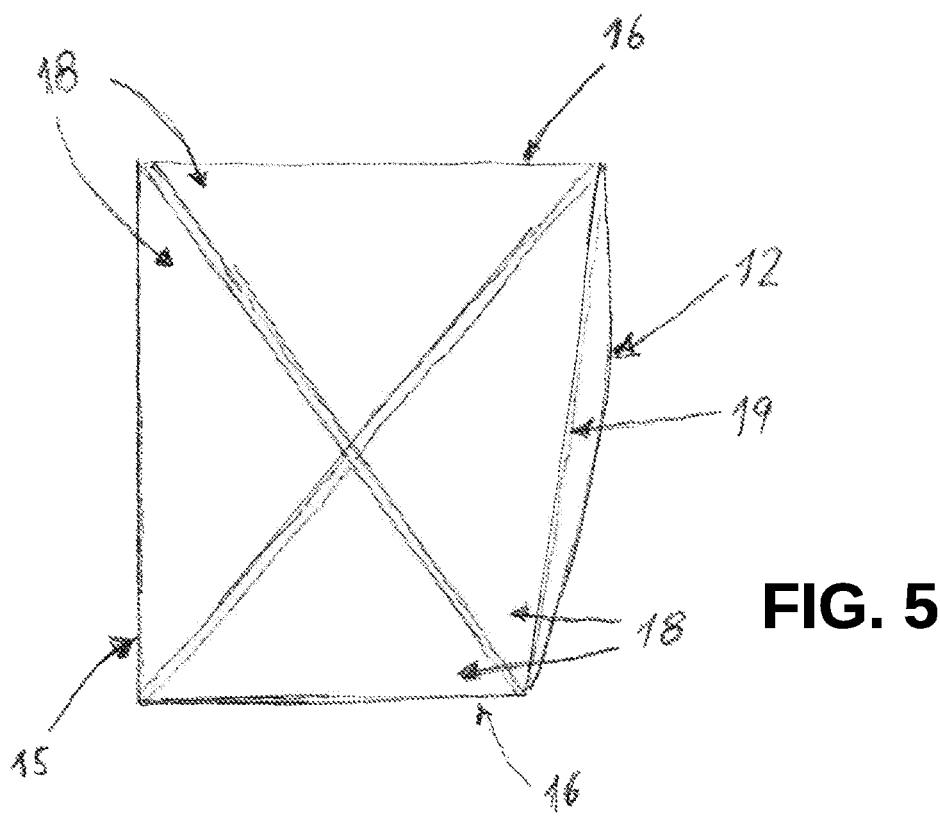
FIG. 5 is a diagram of an external leaf element with 4 leaves, from above.
Figure 6:
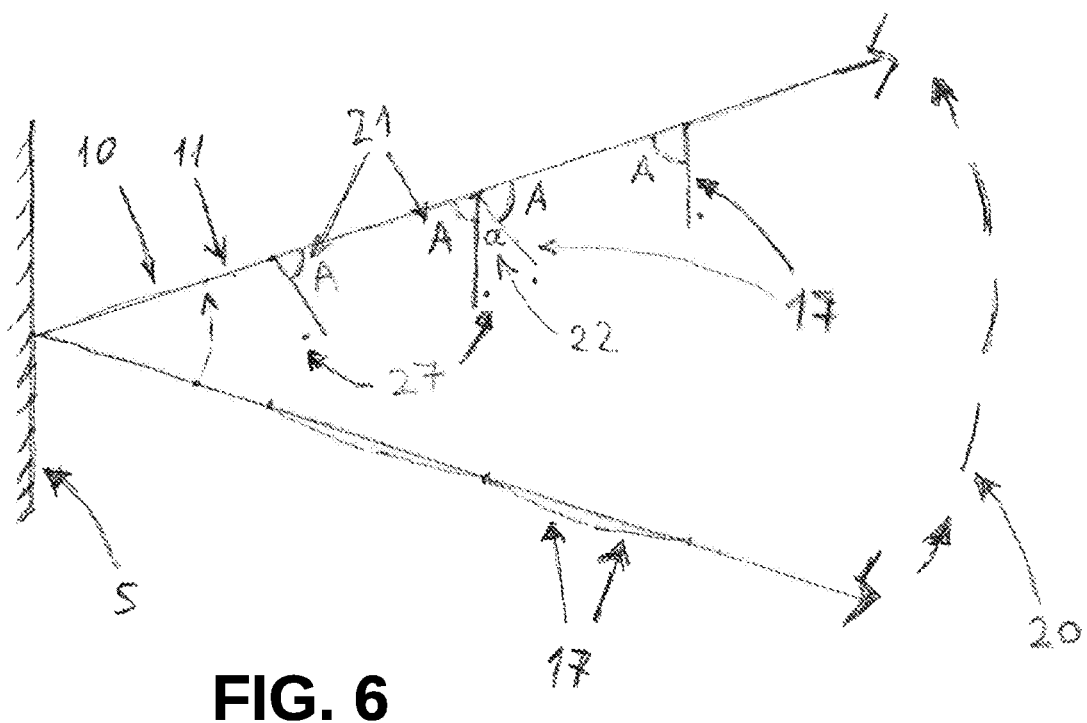
FIG. 6 is a diagram of the up-motion of a wing, longitudinal view.

13d. In upstroke and downstroke wing vanes (26) (wide) and (27) (narrow), that is barbules (22) and (23), bend differently, thus generating lift force during the latter move, whereas air passes (partly) free across in the former; in detail:

A In upstroke the vanes (26), (27) leave a narrow, sloping, free active gap for air to pass with no resistance;

A1. This gap is narrow compared with the distance (21) between adjacent wing spars, whereas the remaining inactive area's width (spar-to-spar, minus the active gap) functions like a funnel and presents friction to air which is obliged to pass through the narrow free active gap;

A2 This gap obliges the air to pass in sloping direction, so presenting a certain amount of frontal (vertical) resistance to air;

A3. The narrow barbule (23) of a feather being in front of the next (rearward) feather's wide barbule (22), the funnel resulting in upstroke makes for counter-productive generation of the resistance force's horizontal component towards the front, countering frontward flight (or the drawings must be redrawn, the other way round);

A4. all this translates into an ineffective action of barbules, resistance to air from the inactive area's upstroke move, and counter-productive horizontal force component;

A5. further to this, nothing assures that the narrow vane (27) will not bend downward in upstroke (due to inert air's pressure) to further restrict the passage, except if having a really stiff feather (20) (and wing) construction (FIGS. 3, 4) in the transversal dimension, which translates into too much weight for this apparently very light device.

B. In downstroke the vanes cooperate in forming a continuous surface leaving no free passage to air, by having the wide vane (26) be supported by the narrow vane (27);

B1. commenting this, similar to paragraph A5 above, nothing assures that vane (27) will not bend upward, yielding to pressure from vane (26) and dissipating the unified-surface effect, starting from (27)'s frail end far from shaft (21), where the center of force from air resistance on barbule (26) strongly applies, then following in yielding of total (27)'s span and generating unwanted air passages between sloping (27) and (26) barbules;

B2. such passages, similar to paragraph A3 above, would direct air frontward, countering the forward-directed flight;

B3. but the most dismal effect from barbule 27's yield would be the dissipation of the effect of the unified wing surface, as stated in paragraph B1 above, no more generating lift force;

B4. to prevent barbule 27's yield, the machine must dispose a strong construction of feathers and the ensuing excess weight, as already stated in paragraph A5 above. 13e It is inferred from the above that this machine is not really efficient in generating a steady lift force.

14. Patent US 2011/0278391, A. Kotler

14a. The comments in Paragraph 12a above and in the first part of Paragraph 12b are also valid here.

14b. The invention employs two pairs of blade-wings with phase difference between front and rear wings, which makes for unsteady course in flight, countering the camera's effective function.

14c. The wings have a fixed surface and generate lift force by their reciprocating up and down move, which is neither efficiently generating lift force nor effective biomimicry.

14d. The blade-wings may be moved from their base in the torsion, bending and yaw directions for the two pairs of anterior and posterior blade-wings pair with shift of a phase between them. More specifically, thrust, pitch, yaw and roll flight control are provided by changing amplitudes of returnable forward-rotary actuations of each blade-wing. This means that such flight controls are possible, but only through complicated blade-wing actuations. A tail beam is assembled to the fuselage's back end for stabilisation, establishing a centre of mass at a desired position. From this it is understood that at least one dead weight is annexed to the machine's body in order to amend an inefficiency (in this case, in ascertaining its stability by itself in the first place).

15. The Present Machine in Light of the Specific Four Prior Art Patents

15a. Facing H. Hetherington's patent from 1919, the present machine disposes networks of under-fibers and over-fibers below and just over the wings respectively, which control the extension of the opening and the closing phases of each wing in the up- and the downstroke respectively. The surface of the wing remains plain while soaring, a fact wrongly claimed in the prior art. The active, lift force-generating percentage of the wing's surface is closer to unit (=1) than in the prior art, since the cross section of the borders is elongated vertical and not like the T-form frame members of the prior art. Steering through a tail attachment is superfluous, since every kind of manoeuvre is feasible through adjusting the inclination and the amplitude of wings' moves.

15b. Facing R. Michelson's patent from 2000, the present machine also has wings flapping up and down, but not undulating: they have vanes fully opening down in upstroke and firmly closing in the downstroke move, which is far better at generating lift force. There are no hollow flexible elements like in the prior art, only plain and fixed ones, not prone to fatigue through long use. Crawling (though prone to malfunction in the prior art) is not a part of this machine's specifications, but the three adjustable-height telescopic legs (cf C4.2b. below) confer the capacity to stay upright on the ground.

15c. Facing M. and R. Earl's patent from 2006, like in the first comment in 15b above, wings also flap up and down in the present machine, but generate lift force through vanes opening and closing, not through a wave-form move of wings and through the elasticity of mylar membrane surfacing of the prior art which do not generate lift force like in flying birds. There is no excluding a part of the wing surface due to only being active a passage of air (though directed forward, countering forward flight) between the barbules in the prior art, but almost the total of the wing surface (pending deduction of the surface of borders) is active, generating lift force; and forward movement is feasible through suitable turn of the wing round its longitudinal axis. Regarding the general character of the present machine, it is a real working appliance with motor, electronics and controls, and not a toy-like device as is the prior art.

15d. Facing A. Kotler's patent from 2011, like in the first comment in 15b above, wings also flap up and down in the present machine, but generate lift force through vanes opening and closing, not through an up-and-down move of blade-wings like in the prior art which does not sufficiently generate lift force. There is not a phase difference between front and rear wings, which causes an unsteady course in the prior art. Pairs of diametrically opposite situated wings work together in tandem, with their centre of force being in the same vertical line with the machine's centre of gravity: either the two pairs moving one after another repetitively in the insect-like flying mode, which is steady both horizontally and vertically, or all four wings moving together in the bird-like flying mode, which is steady horizontally but less so vertically; anyway, steadier than the prior art which is unsteady horizontally.

15e. Facing the group of the four prior art patents, the present flying machine is the only one really capable of flying a steady course in any direction and making whatever manoeuvre in flight: turns round the 3 axes, accelerating and decelerating, liftoff and landing; all this, while remaining almost invisible, thanks to its effective biomimicry, both in flight due to its wings' inconspicuous way of moving and in appearance due to its peripheral appendages. More than this, it has the other capabilities unique so far from a flying scope: to approach and adhere onto various objects and places, and to execute work no other flying unit has ever had the ability to realise.

1a. This is about an unmanned machine of small size that can fly thanks to a motor, to appropriate gear, and to expert software; and most importantly, thanks to a novel method of creating lift, the basic ingredient for flight: moving up-and-down wings resembling a bird's or an insect's ones. There are four flat wings, of which 2 are on the left side (1, 2) and 2 on the right side (3, 4). The architecture of the wings is described in short in the following (C2.1 below) and more extensively further on. They move unimpeded up (20), letting air freely flow across their area (21), then upon moving down (23) they block the air (25), push it down and generate lift, and so on, repeatedly.

1b. Such machines are called unmanned air vehicles, UAVs; small ones are called drones; so, this is a novel kind of a drone, or rather a novel category of drones, a step of striking change, adaptable to everybody's needs, and then evolution follows: as soon as further needs and necessities arise in the future, with vivid imagination notwith-holding, eventually various types of such a drone will be designed and brought to action. This flyer outclasses old ones in performing a wide range of operations, as detailed below. It is not meant to improve on existing drones and flying techniques. It is in essence a new system and method altogether, regarding drones and the notion of flight respectively.

1c. In flight, the machine reminds a bird or an insect (a bug, a butterfly, etc.) thanks to (repeatedly reciprocating up and down) wing motion respectively programmed and thanks to peripheral appendages intensifying the respective appearance. It has the capacity to execute every possible flight move, every detour and manoeuvre, and to approach to and adhere inertly upon various surfaces and objects, detailed in the following, either staying there at rest (unobserved) or being ready to execute work (in silence). Such places include walls, trees, wires, the ground, the water surface, even underwater.

1d. The machine carries equipment with affixed accessories; these infer the possibility to carry out a wide variety of work while either in flight or stationary on a place.

1e. The important condition for designing such a machine, producing it, and putting it to operation is its inconspicuous existence and operation: as non-observable as possible, due to its appearance, passive appendages and quietness, and untraceable, with sealed circuits and with provision to self-destruct.

1f. In the following, the machine in view will be related to as machine or drone: machine, mostly in case its mechanics are referred to; drones, in case the flight abilities and the unity of the apparatus come first. But really, the designation remains text-agnostic.

2 Form

2a. The body of the machine has an elongated form, with a steady cross-section through the whole length, with external texture and coloration in accord with the important condition of inconspicuousness as above. There is provision for peripheral non-operative (passive) attachments covering the body, with appropriate colour, texture and case-dependent form to mimick a bird's or an insect's body (beak, legs, plume, antennae, shiny or coloured hump, etc.), with the additional provision of them moving life-like, especially at the wings' tip.

2b. There is also provision (set of mechanisms and wing moves): for setting the body length in any angle to the horizontal: the machine (i.e. the machine's body) being in horizontal (5), upright (6), or inclined mode (horizontal for normal flight, upright for adhering to a vertical surface, and inclined during manoeuvres and while following the ground's relief), and for adjusting: A) the wings' horizontality, the machine being in anyone of these three modes, B) the horizontal angle between the two medium lines (the axes) of the wings on the left side of the machine, as well as the angle between the two on the right, and C) the distance between the two support points of these wings (from an aerodynamic point of view, the vertical distance between these two support points in upright mode needs to be substantially less than their horizontal distance in horizontal mode).

3. Arrangement

3a. The machine has A) internally: a motor, transmission mechanisms, a means for energy storage (pertol tank and/or battery), sensors of internal functions, AI unit, printed circuits, the necessary wiring, a small explosive charge for technical purposes and eventually for self-destruction, and equipment for performing internal functions. B) externally: the envelope of the body, made from material (i) consistent with the "important condition" stated above—inconspicuousness, and (ii) enduring adverse conditions and multiple kinds of physical attacks (vibration, radiation, rain, shower, dust storm, seawater etc.), along with the necessary aerodynamic devices for generating lift (and flight), i.e. the wings, sensors (antennas, cameras), transmitters, (possibly) photovoltaics, and adherence- and mission-specific equipment (that is, various attachments for adhering to places, and accessories for execution of work).

3b. The axes of the machine's body are: longitudinal (i.e. fore and aft), (7), transverse (8), and vertical (9). In the following, in case no horizontal or vertical mode of the machine is mentioned, horizontal is assumed.

4. Size

The size of the machines can vary between the two extremes of very small and quite large:

4a. A tiny drone, of the order of an insect: equipped with an electric motor, and has only few functions besides flight, mainly video and sound.

4b. a medium size drone, of the order of a small bird: a small petrol (or castor oil) motor, or an electric one, and more abilities, like approach—adherence to places, transmission relaying, follow-up flight, swarm-mode flight, incessant flight-cum-photovoltaics, etc.

4c. Quite large a drone, of the order of a large bird: either a strong petrol motor (with muffled exhaust) or an electric one with rectennas to receive broadcast energy; external RC arm with varying work-appropriate extensions; a sensor for dust precipitating (on body and cameras), and a hydraulic system to shower it off; a hatchway space (attached on the underside) for "mother-drone" assignment, for small (similar) subsidiary drones swarming out, working in collective flight, and returning back in; etc.

4d. The machines are graded according to the weight they can carry, their total weight, and the capacity of their motor unit.

5. Functions and Work.

5a. The machine has the capacity to stay idle in a place, unobserved, until a signal for action is received. It can operate following a programme either until a programmed moment comes, setting off alarm and ceasing operation, or until a signal is received to turn into RC (remote control), then again revert to programmed flight at a propicious moment (cf C6.4j. below), using (broadcast from headquarters, or) inborne SW (software) coupled with the AI unit (artificial intelligence).

5b. It can be programmed, e.g. to fly at a fixed (or changing) altitude and direction, based on needs and regulations (e.g. to avert collision, under a proprietary TCAS-level SW), or to respect a set flight priority in case 2 drones fly on merging (colliding) paths at the same altitude, and to follow regulations (when bills and acts get passed) for keeping distances from buildings, houses, army facilities, groups of people etc. for inconspicuousness and safety, based on a set system (rightfully updated) applying marks to places and spaces.

5c. In this description of the invention there are a small number of alternative proposals in presenting materials and processes, since its design is not based on prior models, its construction is first hand, and its operation is still not fully tried to a great extent.

C2 Wings

C2 1 to 7 Generalities: Flight Modes, Creation of Lift, Axes, and Balance

1. General Description of a Wing:

1a. The machine carries at its two sides four flat, leaf-shaped wings 11 producing lift necessary for flight to occur. They move each one up and down in a continuous reciprocative way, following a pattern for moving jointly between them. The wings serve in performing flight in various ways, the flight modes, of which there are five, presented hereafter, and described further-on below: (i) insect-like mode, (ii) bird-like mode, (iii) tweaked mode, (v) hovering mode, (vi) floating mode, its particular case, captive mode, and (vii) collective mode.

1b. At the base of each wing there is a short axis AB, the complementary axis 10, producing no lift, supported unto the machine's body at point A. In continuation of the straight line AB there is the basic part BC of the wing, its operative axis 11, producing lift. The angle ABC, normally 180°, can be changed depending on the necessities of flight: this is the tweaked mode. The structure of a wing is basically on a plane, but depending on the necessities of flight (to better produce lift) it can be slightly curved (in a cylindrical form: the two transversally extreme regions, most distant from the median line BC, are bent down. The disposition of a wing is basically horizontal, but again depending on the necessities of flight (to better execute manoeuvres) it can rapidly change inclination by turning around the (longitudinal) median line BC, through a turn of the axis ABC at point A as a swivel. The contour of a wing is supplemented with appendages in the form of feathers or plume and care will be paid for it not to present much resistance to air either in flight or while staying motionless at a place.

1c. On the flat layout of the wing, borders are arranged on two directions, longitudinal 15 and transversal 16. They divide the wing's surface into leaf elements 13, 14, surface portions individually generating lift. Lift is generated by leaves 17, 18 affixed to the borders and occupying the whole of the surface of each leaf element. Leaves are scheduled to easily bend or revolve down during the up-motion 20 of the wing, in order to give way to the air so that it passes free through the leaf elements (and the wing's surface as a whole). On the other hand, during the down-motion 23 of the wing they are being kept (by force) on the plane of the wing, so a) being restrained from revolving up, b) presenting resistance to air encountered during the motion (in reality, the air resists to the leaves moving down and to the wing as a whole), and producing lift_force, sustaining the flight.

1d. In the context of the up-motion of the wing, the freedom of the leaves to bend or to revolve down is restrained from attaining a 90° rotation by the means of arranging a net of under-fibers 27 below the leaves. In the context of the down-motion, the confinement of the leaves within the wing's plane, leaving them no freedom to (equally as above) bend or revolve up, is achieved through arranging a net of over-fibers just above the surface of the leaf elements (and of the wing as a whole).

2. A wing's axes are: longitudinal (the line ABC in its basic appearance, straight), transverse (the vertical to ABC, standing on the plane of the flat wing), and vertical (which is vertical both to longitudinal and to transverse).

3. Each wing moves basically in a radial configuration 33, 35 up and down repeatedly, round its point of support A, its transversal axis maintained horizontal, but depending on the mechanical necessities of flight (and also in order to achieve the perfect appearance of a living flyer) the transversal axis is temporarily inclined during flight and in certain patterns of manoeuvres, and especially inclined towards the front during take-off and acceleration, and towards the back for landing and for deceleration (cf C3.6. below). The radial motion depicts an angle of roughly 35° (33) in a rapid reciprocating succession: up, down up, down, . . . . . , repetitively. The repetition rate depends on the desired appearance: about 4/sec to mimic a bird (or 3/sec for larger drones), and more than 12/sec for an insect.

4. Description of the Wings:

4a. The wings on the left side of the body are numbered 2 and 1, the numbering direction being the same with the direction of flight, and similarly the ones on the right side are 4 (aft) and 3 (fore). Wings move in one out of 2 basic patterns, or flight_modes: insect-like and bird-like.

4b. First mode: Wings 1 and 4 move simultaneously down while wings 2 and 3 move simultaneously up, then in succession 1 and 4 move simultaneously up while 2 and 3 move simultaneously down, then again 1 and 4 down while 2 and 3 up, and so forth, i.e. each one of the two pairs of diametrically opposite wings move simultaneously down while the other pair move up, next, in rapid succession, each one of the two pairs move simultaneously in the opposite direction, next they move again in their previous direction, and so on, in an insect-like mode.

4c. Second mode: The four wings move simultaneously: the pair on the left side move jointly between them, as well as the two on the right side: up, down, up, down, up, . . . . , in a bird-like mode.

5. The angle between the two axes of the wings on the same side is close to 90° in insect-like mode and close to non-existent in bird-like mode, and likewise the distance between their support points on the body. There is a mechanism providing for a flight mode transition during flight (insect-like to bird-like mode, and vice-versa), by which the drone can change its appearance while flying (quite high) at a distance from casual watchers, for achieving desired effects; the transition is achieved by altering one or more of the four flight-mode characteristics: motion mode, repetition rate, axes angle, and support points distance.

6. There is a Third Possibility as Far as Flight Modes are Examined, the "Tweaked" Mode:

6a. The tweaked flight mode is accomplished through imposing on the wing's central line ABC an articulated bend at point B 36, at an angle fluctuating at will, making it a broken line. This mode contributes to stability of flight. The two bends (at the B points) of a pair of diametrically opposed wings, say 2 and 3, bring the two wings' centres of air resistance towards places C1 and C2 just on either side of C', the body's centre of air resistance, and the straight line C1C'C2 becomes perpendicular to the machine's longitudinal axis instead of roughly at an angle of 45° (the basic configuration of the wings), making the flight quite birdlike although only two out of the four wings are operative at any one moment (a pattern basically insect-form, now turned bird-form).

6b. Next moment, wings 2 and 3 sustain a bends-straightening 36', and retreat to their basic postures (whereas the three centres of air resistance [centre of 1], [centre of body] and [centre of 4] lay on a straight line roughly at 45° to the longitudinal), while the other pair, the wings 1 and 4, sustain at their B points an equal bend as the above 37, bringing their centres of air resistance unto the same points C1 and C2 as above.

6c. Next, wings 1 and 4 straighten back and wings 2 and 3 bend again, next 2 and 3 straighten while 1 and 4 bend anew, and so forth. This tweaked mode is useful for certain flight manoeuvres, but the configuration is not robust enough, mechanically.

7. Balance of the Drone:

7a. For each one of the two pairs of diametrically opposite wings i.e. 1 and 4, as well as 2 and 3 the weights of the two wings are equal, and likewise for their resistance to air.

7b. Two conditions are in force in order for the machine to be self-redressing in case it gets momentarily out of balance: for each one pair, their two centres of gravity are symmetrical in reference to the centre of the compound weight of the body with all its accessories, and likewise for their centres of air resistance in reference to the centre of total air resistance of the drone, by arranging accordingly the attachments to the body.

7c. In said case of the drone getting out of balance, redressability is enhanced if the four wings are momentarily disposed in their uppermost position (76, 77). Concerning said total drone air resistance, it means both a) resistance to vertical air direction, for flight sustenance, and b) resistance to air direction (counter to drone's direction) at any one given moment.

7d. Wings in good balance can also serve in hovering mode, without moving in a reciprocative way. The upper surface of the wing, disposed in a slightly curved form, conduces to low pressure and its front-mounted feather-like attachments play the role of a razor-sharp-like angle of attack, so hovering flight is sustained.

C2 8 to 16 Border, Leaf, Leaf Element

8. Description of Borders:

8a. As already related (1c. above), each one of the four wings has its surface divided into "leaf elements" by disposing "border lines" parallel to the medium line BC (the operative axis), longitudinal to the wing (15'), equidistant between them, and further border lines vertical to them, transversal to the wing (16'), again equidistant between them. The resulting leaf elements are either quadrilateral rectangular, quadrilateral oblique, triangular, or pentagonal: respectively r-, o-, t-, and p-leaf elements.

8b. Border-line pieces corresponding to individual leaf elements are the "borders" (15, 16). Each border line's 2 ending points are points of the wing's perimeter (12'). Each and every part of the perimeter between two adjacent ending points is a "p-border" (12) and corresponds to either a quadrilateral oblique or a triangular leaf element. The total of the p-borders on a leaf constitute its perimeter (12'). Each border belongs to two leaf elements, adjacent to one another. It separates them and supports one leaf from each one of the two leaf elements. The two leaves are each fastened to one of the two sides of the border's upper surface.

8c. Borders and p-borders, collectively designated as (p-)borders, are made of transparent, plastic material (through extrusion, 3D printing, or other production methods), with an intensely oblong (elongated) rectangular cross section having its 4 corners slightly rounded, or (alternatively and in order to cut down on weight, but on the other hand risking a higher visibility to radar emissions) an intensely oblong elliptical cross section; only in case of high temperature, intense radiation or other adverse environmental conditions are metallic non-ferrous (p-)borders used instead of the plastic ones. The larger of the 2 dimensions of borders' and p-borders' cross sections is vertical to the plane of the wing, so that the best possible endurance-to-weight ratio is attained.

8d. All uppermost points of a wing's border lines are disposed on the upper level of the wing, taking in account the provision (1b. above) that this surface's sides are bent down in a cylindrical configuration on aerodynamic terms. The same is valid for the lowest extreme of all border lines' cross section, situated on the inferior level of the wing, taking in account the same provision. The uppermost line of the wing's perimeter (counting as the total of the p-borders) lies at the wing's upper level as above. The perimeter's cross section is slightly higher than that of the border lines, and quite wider, in order to bear the weight and to endure the vibrations of the border lines.

8e. The perimeter (12') is made in one piece along with the complementary axis AB (10); the transversal border lines (16') are also made each one in one piece (they are shorter than the longitudinal ones and so they behave stronger mechanically); the longitudinal ones (15') are made piece by piece and soldered (or glued) to the transversals. The whole of the structure [border lines (both longitudinals and transversals), perimeter, and complementary axis] can be 3D-printed for best mechanical results: inclusion of specific high-resistance fibers the length of its parts reinforces it.

8f. A p-border's external face follows the curve of the wing's perimeter, but its internal face follows a straight line (19), in the image of a regular border (longitudinal or transversal). In case the cross section is rectangular, the internal face is flat, on an upright plane.

9. A Leaf, and Categories of Leaf Elements:

9a. A leaf is either triangular 18, or quadrilateral: a quadrangle 17 or a trapezoid. A quadrilateral leaf's 4 sides are the support line (fastened to one of the 4 borders or p-borders), the 2 transversal bordering sides, adjacent to the support line and meeting one of its extremes each, and the bordering line opposite the support line, designated as the leaf's free side. A triangular leaf's three sides are the support line and the other two sides: its bordering sides or free sides. A leaf is either made of plastic (and transparent) material, or of thin metal, depending on the need to operate unnoticed on one hand and on environmental conditions on the other.

9b. Depending on the place each leaf element occupies on the plane of a wing, the leaf elements diversify, and the different categories, as depicted already (8a. above), are described below. There are r-leaf elements (quadrilateral rectangular, 10. below), o-leaf elements (quadrilateral oblique, 11. below), t-leaf elements (triangular, 15. below), and p-leaf elements (pentagonal ones, 24. below).

9c. Further on, the o-leaf elements divide (cf 11a. below) into t.o-leaf elements (transversal oblique leaf elements, 12. below) and l.o-leaf elements (longitudinal oblique leaf elements, 13. below). And specifically for the l.o-leaf elements, we distinguish (cf 13a.b below) the m-case l.o-leaf elements (more-than-half case longitudinal oblique leaf elements, 13b. below), the h-case l.o-leaf elements (half-case longitudinal oblique elements, 13d. below), and the l-case l.o-leaf elements (less-than-half case longitudinal oblique leaf elements, 13e. below).

9d. Quadrilateral leaf elements either have 2 quadrilateral leaves or 4 triangular ones. Hereafter, 2-leaf quadrilaterals are described as default case. Further down (14. below), the 4-leaf configuration is described. Triangular leaf elements have one stand-alone triangular leaf.

10. Description of a Quadrilateral Rectangular Leaf Element:

10a The quadrilateral rectangular leaf elements (designated r-leaf elements as above) constitute the majority of a wing's leaf elements; they are the ones non-adjacent to the wing's perimeter. They are each confined by four borders, two of them longitudinal 15 and two transversal 16; these leaf elements are all equal between them.

They are either rectangles or squares, depending on the relation between the densities of the longitudinal and the transversal border lines, but in the case of rectangle r-leaf elements, provision is taken so that their greater dimension is longitudinal.

10b. Two rectangular "leaves" 17, non-overlapping, cover the whole of each and every one of these leaf elements; they are fastened on the two longitudinal borders (15); they meet at the median line between (and parallel to) the two supporting longitudinal borders, not connecting between them at this line; as for the longitudinal dimension of the leaves, at the two transversal bordering sides each one of the two leaves reaches to the two transversal borders enclosing the leaf element, not connecting with them.

11. Description of a quadrilateral oblique leaf element:

11a. The quadrilateral oblique leaf elements (designated as o-leaf elements as above), are situated adjacent to the perimeter of the wing. They are trapezoidal in shape. Depending on their place on the perimeter of the wing's plane, they are each (as already depicted, 9. above): either confined by a p-border, its neighbouring transversal border, and 2 longitudinal ones (a transversal oblique leaf element, designated as a t.o leaf element case) (12. below), or confined by a p-border again, its neighbouring longitudinal border, and 2 transversal ones (a longitudinal oblique leaf element, designated as an l.o-leaf element case) (13. below)

11b. A t.o-leaf element sits on the wing's extreme, near the point C where the p-border replaces a transversal border in the usual configuration of a leaf element confined by 4 borders (as at 10a. above), while an l.o-leaf element is situated on the side of a wing (away from the points B and C of the wing axis ABC) where the peripheral p-border is substituted to a longitudinal border.

12. Description of a Transversal Oblique Leaf Element:

12a. The total of the surface of a t.o-leaf element is occupied by two leaves, non-overlapping, both trapezoids (an alternative configuration, with four leaves, is described at 14. below).

12b. Like the leaves of the r-leaf elements (10. above), the rectangular ones, they have the same width (on the transversal dimension); they are similarly fastened along their length each to the corresponding longitudinal border of the leaf element to which they belong; they meet at the median line between (and parallel to) the two longitudinal borders, not connecting between them;

12c. Each leaf's external bordering side, the one reaching to the p-border, is oblique to the wing axis in general; only exception, one such leaf element, situated just on the wing axis, may have its two leaves with external bordering sides being transversal (cf 22e. below).

12d. the other one, the internal bordering side of each leaf, is transversal (that is, perpen-dicular to its length and to the wing axis ABC) and reaches to the leaf element's transversal border;

12e. The above two bordering sides are not connected with the corresponding borders (i.e. the border and the p-border).

13. Description of a Longitudinal Oblique Leaf Element:

13a. The total of the surface of an l.o-leaf element is (in the standard configuration), occupied by two leaves, non-overlapping; (two alternative configurations are possible and, at cases, preferable: (i) an l.o-leaf element with 4 leaves (described at 14. below), and (ii) an l.o-leaf element with one leaf (described at 15d. below). Depending on the place of an l.o-leaf element along the sides of the wing, a) the longer of the two transversal borders may either be equal in length ("full length") to a regular transversal border (one that belongs to an r-leaf element, as are the majority of a wing's leaf elements), or less than that, and b) the shorter of the two transversal borders may be either half the length of the other one, or longer, or shorter than this. These cases are designated as h-case l.o-leaf element, m-case l.o-leaf element, and l-case l.o-leaf element respectively, meaning half case, more-than-half case, and less-than-half case respectively. Particularly in an m-case l.o-leaf element, the external leaf, the one towards the p-border, is of trapezoidal form in case the longer transversal border is full length (as above) or quite so, and conversely, it is of triangular form in case the longer transversal border is small; besides, in both an h-case and an l-case ones, the external leaf is a triangle.

13b. In an m-case, l.o-leaf element (more-than-half case longitudinal oblique leaf element), the putative trapezoidal external leaf's two parallel bordering sides, the transversal ones, reach to the 2 transversal borders, not connecting with them; its external, oblique, bordering line is fastened to the p-border's straight internal face; and its internal bordering line is parallel to the longitudinal border and meets the internal leaf of the same leaf element, not connecting with it. On the contrary case, the external leaf being a triangle, it is described alongside of the triangular leaf elements (15b. below).

13c. The other leaf, the internal one (of an m-case, l.o-leaf element), is a rectangle. It is equal in dimensions as the leaves of the r-leaf elements (10. above) in the case of a full-length longer-transversal-border or quite so, and lesser in width than that in other cases. It meets the external leaf (trapezoidal or triangular, as above) without connecting with it, and it is fastened to the longitudinal border; its 2 transversal bordering sides reach to the two transversal borders, not connecting with them.

13d. In an h-case, l.o-leaf element (half case longitudinal oblique leaf element), a) the external leaf, a triangular one, is described alongside of the t-leaf elements (15b below), and b) the internal leaf is similar in description to the internal leaf of an m-case, l.o-leaf element (13c. above): equal in dimensions as the leaves of the r-leaf elements in case of full-length longer-transversal-border, of lesser width in other cases, reaching to the external leaf and to the two transversal borders but not connecting with them, and being fastened to the longitudinal border.

13e. In an l-case, l.o-leaf element (less-than-half case longitudinal oblique leaf element), a) the external leaf, a triangular one, is again described alongside of the t-leaf elements (15b. below), and b) the internal leaf is nearly like the internal leaf of an m-case, l.o-leaf element (13c. above) in description: it has the same length, but a lesser width than that one has; it reaches to the external leaf and to the 2 transversal borders but does not connect with them, and it is fastened to the longitudinal border.

A four-leaf element configuration, alternative to the described two-leaf one and preferable at times, depending on the wing's aerodynamic necessities for flight, is the standard configuration for the leaves of the extreme side quadrilateral leaf elements most distant from the median line BC, the l.o-leaf elements (longitudinal oblique): Instead of having two leaves, as described above, the whole of the surface of an l.o-leaf element is occupied by four triangular leaves 18, non-overlapping, which meet at a point near or exactly at the intersection of the two diagonals of the rectangular. Each one of the 4 leaves is fastened to either one of the three borders or to the p-border (the three borders and the p-border which surround every leaf element adjacent to the wing's perimeter). Depending on the conditions of the programmed flight and on the type of the mission, the 4-leaf configuration may be preferable to the two-leaf one for all quadrilateral leaf elements of the wings: r-, l.o-, and t.o-leaf elements, as well as the p-leaf elements (cf 24b. below). This means that the wings, constructed in this way beforehand, are prepared to be attached to the machine, ready to operate, in the case of bespoke conditions of flight and type of mission.

15. Description of a Triangular Leaf Element (and of a Triangular Leaf in General):

15a. The triangular leaf elements (called t-leaf elements as above) are situated adjacent to the perimeter of the wing; they are confined by a p-border, a longitudinal border, and a transversal border. Every triangular element has one leaf, a "sole leaf", occupying the whole of the surface of the leaf element. The two borders intersect at 90° and the third bordering line, the straight internal face of the p-border, is disposed at various inclinations to the wing's ABC axis, depending on the triangle's various places along the perimeter of the wing.

15b. The triangular external leaves of the m-case l.o-leaf elements (putative, 11b, above), of the h-case ones (11d, above) and of the l-case ones (11e, above) fall into the same description as the sole leaves of the triangular leaf elements. In all of these four groups, the standard fastening configuration is for each one of the triangular leaves to be fastened to the p-border's straight internal face. (Alternatively, for practical reasons and for facilitating neighbouring leaves' treatment, the triangle is fastened to the longitudinal border, as in 15d. below.) The two other sides (in the standard configuration) reach to the two respective extremes (one longitudinal, one transversal), not connecting with them.

15c. Of these two extremes of a triangular leaf, the transversal one is the transversal border in all four groups. The longitudinal extreme is the longitudinal border in the case of the sole leaf of the triangular leaf elements, and it is the external bordering line of the internal leaf in all 3 cases of m-case (but putative), h-case, and l-case of the l.o-leaf element kind.

15d. An alternative configuration is used for simplicity in the cases of the l.o-leaf elements of quite small transversal dimension and of the triangular leaf elements: a) A longitudinal oblique leaf element, in case the longer transversal border is of quite small length, can have the whole of its surface occupied by a sole leaf (instead of by two smaller leaves) fastened to the longitudinal border and non-connecting to any of the two transversal borders or to the p-border and b) a triangular leaf element on the other hand can have its sole triangular leaf fastened to the longitudinal border (instead of to the p-border) and reaching but non-connecting to both the transversal border and the p-border. Such a configuration utilises the longitudinal borders (and no p-borders), which are already used for fastening the leaves of the neighbouring leaf elements.

16. Description of a Leaf's Fastening Method and Composition:

A leaf is fastened to a (p-)border, along its support line, in two ways: either 16a. the leaf can rotate freely and radially around the upper limit of the border (as far as the under-fibers and the over-fibers permit it to do so), so that the leaf's bordering line opposite to the support line (i.e. the free side of the leaf) describes a cylindrical figure around the support line; the support line running along the border's upper limit constitutes a linear articulation; or 16b. The leaf's part adjacent to the border does not revolve around the support line which runs along the border's upper limit facing the leaf; the material of the leaf has a certain plasticity which allows it to bend down elastically and to return (in the up-motion and the down-motion of the wing, respectively); the support line running along the border's upper limit is a stiff, non-yielding fasten-line.

16c. Depending on either stiff or articulated fastening being the leaf-to-border connection, the material of the leaves differs. For a linear articulation (16a. above), the leaf is made of transparent, stiff plastic material while for stiff fastening the leaf is made of transparent, thin plastic, bendable under stress. 16d The composition of the leaves is different in the case of adverse environmental conditions such as a corrosive environment, high temperature, or intense radiation: the leaves are metallic, from non-magnetising material, similar to that used for borders (8c. above) under such conditions.

C2 17 to 24 Under-Fibers, Vertical Stems

17. Description of Under-Fibers:

17a. As already related (1d. above), during the up-motion of the wing the leaves bend or revolve down in order to let air pass free across the surface of the wing and the freedom of said bending/revolving is restrained from attaining a full rotation of 90° through arranging a net of under-fibers 27 below the leaves. The under-fibers are disposed parallel to the borders (and to the eventual p-borders), but they diverge slightly inwards to the leaf elements the respective leaves belong to, (disposed) at a level lower than the wing's level but a little higher than the lowest lines of the leaves 17 and 27 in their "open" phase (fully bent/revolved down), and are connected with the intersections of borders through the means of "vertical stems" (which are not exactly vertical) hanging from these intersections. We distinguish standard under-fibers, affixed to the undermost (tip) point of the stems, and additional under-fibers, parallel to the standard ones but affixed higher, between the tip and the root of the stems.

17b. The cause of using under-fibers is that, if the two leaves fastened to the sides of a border (leaves belonging to two neighbouring leaf elements) are allowed to rotate at 90° (or even more, in the putative absence of underfibers, and to such an extent that they meet between them below the lowest line of the border) the duration of the up-motion, then, at the moment of starting the ensuing down-motion of the wing, the air will not really tend to blow them apart (towards their normal position—closed), but it will rather push them harder to one another, presumably, which does not conduce to creation of lift. So, under-fibers 27 are adopted, the leaves' opening angle is kept less than 90° 21, and up-and-down wing-motion functions correctly (cf 26c. below).

18. Under-Fibers and Vertical Stems in the Case of (Two-Leaf) r-Leaf Elements (the Standard Configuration of Quadrilateral Rectangular Ones, 10. Above):

18a. The under-fibers correspond to the borders as follows: one under-fiber parallel to and below each transversal border line, equal to it in length, reaching to the perimeter of the wing at its two extremes, and two under-fibers parallel to and at the same height between them below each longitudinal border line, equal to it in length, reaching to the perimeter of the wing at each under-fiber's two extremes.

18b. The transversal and the longitudinal under-fibers collectively constitute the grid of under-fibers. They are equally distant from the upper extreme of the borders, a distance a little bit less than the width (the transversal dimension) of the corresponding leaves of the two neighbouring leaf elements (i.e., the two leaves that rotate from the two sides, coming each from one of the two neighbouring leaf elements, and encounter the under-fibers with a certain velocity, violently). At this height, the transversal under-fibers are soldered with the (couples of) longitudinal ones (calling for the existence of two vertical stems at each intersection of borders). Their meeting points are sustained at this height thanks to the vertical stems.

18c. Instead of having two vertical stems at each intersection, there is one stem hanging from and soldered to the central point of each intersection of two border lines (one longitudinal, one transversal, meeting at 90°), and at its lower extreme there are two short offshoots at 90° between them, directed downwards, so that the total of the 3 parts, the vertical stem as such, resembles an overturned Y, designated as Y' 28.

18d. The Y's are hanging from the borders' intersections, each one from each, perpendicular to the wing's plane; it is noted that the wing's two transversal extremes, most distant from the median line BC, are slightly curved in a cylindrical form with axis parallel to the wing's axis ABC (cf 1b. above), so the vertical stems at and near these two extremes are disposed perpendicular not to the local direction of the locally situated (inclined) transversal border, but rather perpendicular to the wing's plane as a whole. The (two-dimensional) Y' is situated on a vertical plane, perpendicular to the plane of the wing and transversal in direction. The free undermost extreme of each one of the two oblique (at 45°) offshoots of the Y' supports (is soldered to) the joint of the corresponding transversal under-fiber with one of the two local (standard) longitudinal under-fibers.

18e. Potentially, after experimental trials, an additional longitudinal under-fiber is disposed above and parallel to the standard one at any place, at an appropriate height, in order to keep under control the leaf, which curves under the pressure of the air. For perfect control then, a number of additional under-fibers can be disposed at various heights, accordingly soldered to the Y' at the respective heights. For a more accurate under-fiber geometry, 2 sole-shoot oblique so-called "vertical" stems can be connected (at a transversal orientation between the two in a configuration of an overturned V (designated as V') instead of the Y', each half-V' being suitably inclined (in a vertical, transversal plane, the two of them being in the same plane), in order to keep each (on-soldered) additional longitudinal under-fiber appropriately disposed parallel to the border and with the correct divergence inwards of the leaf element (cf 26b. below). Here, correctness means to follow the leaf's curvature (at its open position) with the successive one-over-another under-fibers, for best aerodynamic conditions.

18f. As for their aerodynamic efficiency, the under-fibers (either standard or additional) do not present any drag to air because they are disposed shielded from the passage of air by the leaves themselves.

18g. Each (under-the-border-line, face-to-face) pair of under-fibers are at a distance from one another a little more than the total of [the width of the border]+[the two thicknesses of the articulations, in the case of revolving leaves, not of the stiffly fastened ones], so that the leaves are restrained from performing a full 90° revolution in order for their coming back to their standard position (on the plane of the wing) to be fail-safe and prompt during the down-motion of the wing, as in 17b. above.

19. Under-fibers and vertical stems in the case of (adjacent to the wing's perimeter) two-leaf, l.o-leaf elements (the similar-to-r-leaf-element configuration of longitudinal obliques, as in 13a. above):

19a. The internal leaf is fastened to one side of the longitudinal border while the neighbouring (rectangular) leaf element's respective leaf is fastened to the other side, in the same configuration as in the foregoing, for r-leaf elements (18. above). The vertical stems are disposed as above.

19b. The external leaf is fastened (at its external oblique bordering line) to the p-border's straight internal side. There is not any other leaf to be fastened to the p-border's external side, so there is only one under-fiber running rectilinear below the fastening line at the internal side of each p-border (with the correct divergence inwards of the l.o-leaf element), following in the long run the curvature of the wing's perimeter in the form of a broken line, whose pieces are straight: the inner sides of the p-borders. Additional under-fibers, optional, finalise the external leaf's curvature and improve on aerodynamic efficiency. The vertical stems are one-shoot, straight supports (with the option of a curved form on a transversal plane, for perfect control of the opening of leaves) hanging each from a meeting T-point of a transversal border line with the perimeter of the wing.

20 Under-Fibers and Vertical Stems in Case of 4-Leaf, l.o-Leaf Elements, as in 14, Above:

20a. L.o-leaf elements of wings used for specific conditions of flight and specific missions are preferably configured with 4 triangular leaves, as detailed earlier.

20b. There are 2 longitudinal under-fibers under the longitudinal border (for l.o-leaf element's internal triangular leaf and for neighbouring leaf element's rectangular one), one oblique under-fiber under the p-border (for the l.o-leaf element's external triangular leaf), and 20c. Either two transversal under-fibers under each one of the two transversal borders (for l.o-leaf element's side-disposed triangular leaf and the neighbouring four-leaf l.o-leaf element's triangular one), in case there are similar neighbouring l.o-leaf elements, or 20d. only one transversal under-fiber under any one transversal border, in case the corresponding neighbouring leaf element is triangular (a t-leaf element), in which case the neighbouring one-only triangular leaf's fastening is effected: either on the t-leaf element's p-border in the standard configuration, or on the t-leaf element's longitudinal border in the alternative configuration (15d.b. above).

20e. In the case of a neighbouring l.o-leaf element (20c. above), a) The meeting T-point of the transversal border line with the perimeter of the wing has a Y'-form vertical stem (or an optional V'-form one) situated in a vertical plane "quite-longitudinal" (meaning that the plane passes through or comprises the line perpendicular to the bisector of the angle between the two p-borders surrounding the T-point from both sides); this vertical stem supports both the sole oblique perimetral under-fiber and the two transversal ones. b) The intersection of the 2 borders, longitudinal and transversal, has a compound vertical stem configuration in order to support the two longitudinal and the two transversal under-fibers (which form a square between their four points soldered to the stem's offshoots): instead of the Y' (or the optional V') configuration, four oblique of shoots (either partial for the Y' kind, or entire for the V', as far as their height is concerned), hanging from the intersection, form a quadrilateral pyramid between them 20f. In the second case (20d. above), the longitudinally-bound neighbouring leaf element being triangular (a t-leaf element), a) The meeting T-point of the transversal border line with the perimeter of the wing has a sole vertical stem supporting the two under-fibers, one transversal and one running under the p-borders. b) The intersection of the two borders, longitudinal and transversal, has an Y'-form (or optional V'-form) vertical stem supporting the two longitudinal and the one-only transversal under-fibers, which vertical stem is situated in a vertical and transversal plane.

20g. In both cases (20e. and 20f. above) the option, if not the necessity, is still valid for adopting additional under-fibers along the height of the vertical stems, and so the more for the present case of triangular leaves, since the tip of a leaf in the open phase is just a point; so, for better control of the restraining-the-opening-angle action, the additional under-fibers are a requisite.

21. Under-fibers and vertical stems in case of 1-leaf l.o-leaf elements, as in 15d.a. above:

21a. Quadrilateral leaf elements of small (transversal) width, adjacent to the perimeter, have only one leaf for practical reasons, fastened to the longitudinal border, as detailed earlier.

21b. The neighbouring adjacent-to-the-perimeter leaf element being either a triangular one, a longitudinal, or a transversal oblique one, the transversally-bound neighbouring leaf element is either an r-leaf element (rectangular) or a t.o-leaf element (transversal oblique). There are a transversal and two longitudinal under-fibers. The situation is similar to the one detailed (18. above) for the rectangular leaf elements. An Y'-form (or the optional V'-form) vertical stem situated in a vertical and transversal plane is to support the transversal under-fiber and the two longitudinal ones.

22. Under-Fibers and Vertical Stems in Case of (Two-Leaf) t.o-Leaf Elements, as in 12. Above:

22a. The two leaves are fastened on the two longitudinal borders. The transversally-bound neighbouring leaf element is either (case one) another t.o-leaf element or a t-leaf element. A t-leaf element's triangular leaf is fastened either (case two) on the p-border (in the standard configuration), or (case three) on the longitudinal border (in the alternative one).

22b. There is one longitudinal under-fiber under each one of the two longitudinal borders, in case two above, or there are two in cases one and three. Under the transversal border there is one under-fiber, and one more under-fiber runs under the p-border.

22c. In case two, there is a straight (one-shoot) vertical stem under each one of the four corners of the quadrilateral shape of the t.o-leaf element, in order to support the one-only under-fiber. In cases one and three, there is an Y'-form (or an optional V'-form) under each corner, in order to support the two longitudinal under-fibers and either the transversal or the perimetral under-fiber, depending on the particular corner.

22d. The two Y'- or V'-form vertical stems hanging under the two intersections of the two longitudinal border lines with the transversal one are in a plane vertical and transversal, the two of them in the same plane. Those two hanging under the meeting T-points of the two longitudinal borders with the perimeter of the wing are each in a plane vertical to the plane of the wing and "quite-transversal" (cf 20e.a. above) (meaning that the plane passes through or comprises the line perpendicular to the bisector of the angle between the two p-borders surrounding the T-point from both sides):

22e. As a general rule, the two longitudinal borders are of unequal length, and the p-border is oblique to the wing axis ABC; nevertheless, with one exception (cf 12c. above). In the case of the shorter longitudinal border of each t.o-leaf element, some local thickening of the p-border along its respective half, on its internal face, makes for efficiency in leaf motion and control:

22f. the (free) internal bordering line of the leaf which is fastened to the shorter longitudinal border shrinks from a trapezoidal to a rectangular shape thanks to this action, and so it can be controlled (restrained in its opening phase) by an equally-long under-fiber; otherwise, the external bordering line, the one fastened to the shorter longitudinal border, remains shorter than the (untouched) internal one which revolves to open in the down-motion, resulting in the awkward condition of the under-fiber being incapable to control a longer-length leaf.

23. Under-fibers and vertical stems in case of t-leaf elements (cf 15b. and 15d.b. above): As detailed earlier, the triangular leaf is fastened either (case one) on the p-border, or (case two) on the longitudinal border. The adjacent-to-the-perimeter neighbouring leaf elements are quadrilateral obliques (either l.o- or t.o-leaf elements), and in rare occasions a rectangular (r-leaf element) where a longitudinal and a transversal borders meet at a point belonging to the perimeter of the wing. In case one1 (the standard configuration) there is an under-fiber each under the longitudinal border, the transversal border and the p-border, in all 3 under-fibers. There is one straight (one-shoot) vertical stem hanging from each one of the triangular leaf element's three corners. In case two (the alternative configuration) there are two under-fibers under the longitudinal border, supporting both the t-leaf element's sole triangular leaf and the neighbouring leaf element's leaf, and one under-fiber each under the transversal border and the p-border. There is an Y'-form (or an optional V' form) vertical stem hanging from the intersection of the two border lines, longitudinal and transversal, situated in a plane vertical and transversal; also an Y'-form (or a V' one) hanging from the meeting T-point of the longitudinal border with the p-border; and a straight vertical stem hanging from the meeting T-point of the transversal border with the p-border.

24. Particular Case: Pentagonal (Five-Lateral) Leaf Element's Leaves, Under-Fibers, and Vertical Stems.

24a. A pentagonal, designated as p-leaf element (9b. above), is situated adjacent to the perimeter of the wing; as a general rule, along the perimeter the neighbouring leaf elements (facing outwards of the wing) on both sides are triangular, while across the other two borders (facing inwards of the wing) the neighbouring ones are r-leaf elements; a p-leaf element has a longitudinal and a transversal borders of normal lengths, plus a longitudinal and a transversal ones of lesser lengths reaching to the perimeter at their respective meeting T-points, and a p-border extending between these two T-points.

24b. A p-leaf element can convert into a quadrangular one through appropriately transposing the shorter transversal border; e.g., by having it rotate and move its meeting T-point with the perimeter move towards the shorter longitudinal border's T-point and coincide with it, a) the pentagonal becomes quadrilateral oblique (a trapezoid), having two leaves, resembling a t.o-leaf element, and shrinks in surface, b) the short transversal border increases slightly in length, c) the triangle on the other side of this border also increases in surface, and d) the total amount of the two surfaces remains unchanged.

24c. Subsequently to performing the transposition here detailed, a) the trapezoid (ex-pentagonal) can have its appendages (borders, leaves etc.) proportionate to its new shape and surface, in accordance with the preceding (12a. or 14. above, and 22. above); b) the triangle can have its appendages proportionate to its new surface, in accordance with the preceding (15a., 15d.b., and 23. above).

C2 25 to 27 Over-Fibers, Opening Angle of Leaves, Piezoelectrics

25. Description of Over-Fibers:

25a. As already related (1c. and 1d. above), during the up-motion of the wing 20 the leaves 17 bend or revolve down 21, allowing air to pass through, and they present no drag. In the context of the down-motion 23, the leaves are pushed back upwards by the air 24 and tend to return to their standard position on the wing's plane and, if possible, further up. Having in mind the necessity for creating lift force, a passive mechanism is put in place for the leaves to be kept (by force) on the wing's plane 25 during the down-motion, and so a) to be impeded from outrunning the wing plane and revolving up, b) to present drag to air encountered during the down-motion (in reality, the air resists to the leaves and to the wing as a whole moving down) 26, and c) for lift force to be created, sustaining the capacity for flight. The confinement of the leaves within the wing plane, leaving them no freedom to revolve up, is achieved through arranging a net of over-fibers (29, 30, 31, 32) just above the surface of the leaf elements (and of the wing as a whole).

25b. The over-fibers are thin non-ferrous wires or plastic fibers, fastened (glued or welded accordingly) at their extremities on the perimeter of the wing and extending just over the border lines, disposed in two directions which depend on the configuration of quadrilateral leaf elements: a) 0° (29) and 90° (30) upon the direction of the axis ABC of the wing (rectangular arrangement), in the case of two-leaf leaf elements, that is in the case of rectangular leaves, or b) (approximately or) just 45° and 135° (oblique arrangement) in the case of four-leaf leaf elements and t-leaf elements, that is in the case of triangular leaves. Hereafter the disposition of over-fibers is described while adopting the first of the two configurations, but their disposition in case of the second configuration can be correspondingly understood.

25c. The net of over-fibers is constructed in one of the following ways: a) the 2 directions of over-fibers are knitted between them in the way a tennis racquet is. This standard method is valid for both wires and plastic fibers.

b) b net of plastic over-fibers can be strengthened through gluing or lightly soldering the fibers at the intersection points, and one of wire over-fibers through welding the wires at crossing points. c) a plastic over-fibers net can be either extruded or 3d-printed for maximum resistance-to-weight ratio.

25d. The density of the over-fibers in the plane of the net is high enough so that the leaves, pushed upon them by air during the down-motion, stay level and don't sag between the fibers, and low enough for the over-fibers not to present a strong drag force to air as it passes through leaf elements during the up-motion, with the leaves in open position. For this reason, the diameter of the wires is kept small; or, alternatively, the cross section of plastic over-fibers is elliptical with the larger diameter perpendicular to the wing plane, in order to reach a low [resistance to air]-to-weight ratio. The density in the rectangular arrangement is equal for the two directions of over-fibers. In the oblique arrangement the density of the transversal over-fibers is higher than that of the longitudinal ones. As far as the rectangular arrangement goes 29, 30, at least (just above and) near each one of the (longitudinal, parallel between them) internal (free) bordering lines of the rectangular leaves, there are two longitudinal over-fibers, distant just a bit between them, independently of the set density: a) one, just inwards of the free bordering line (towards the leaf's center), and b) one more, just a little further inwards. And concerning the transversal over-fibers, at least one is disposed just inwards of each bordering side of the rectangular leaves. As for the oblique arrangement (31, 32), independently of the set density, one over-fiber is disposed (just above and) just inwards of each straight line constituted by the free bordering sides of the consecutive triangular leaves of (diagonally) neighbouring leaf elements.

25e. An example: For a wing with a length 150% times its width, which has square r-elements, ten longitudinal and fifteen transversal border lines, having four longitudinal and eight transversal over-fibers per leaf element, plus the additional ones near the sides as detailed above, is about fair in the rectangular arrangement. And in the oblique one, having eight over-fibers over the diagonal dimension of every leaf element on each one of the two oblique directions, plus the additional ones near the sides as detailed above, is quite as fair.

26. Definition of the Angle by which the Leaves Open:

26a. The two neighbouring leaves, belonging to two adjacent leaf elements and fastened to the 2 sides of a border, revolve or bend downwards by an angle A during the up-motion of the wing and form a dihedral angle a=180°−2A between them (22). At the starting moment of the down motion 23 the dihedral amounts air and functions like a funnel full of fairly compressed air, tending to push the two leaves apart, to revolve or unbend back to their basic position by default 25, and to remain there the whole time of the down-motion.

26b. The correct size of the angle is determined through trials: a) large enough so that the open passage, the one between the opposite leaves (of a typical quadrangular leaf element) or the one left open by a standalone leaf (of either a triangular leaf element or a 1-leaf quadrangular one), be large enough, not presenting an important resistance to air passage, which would mean an important decrease in lift generated, and b) small enough so that, given the frequency of the reciprocating motion of the wings, the compressed-air funnel of the dihedral functions adequately, even in the unpropicious case of flying high, where the surface effect does not exist.

26c. The cause of using under-fibers, disposed at the correct place under the borders with a divergence inwards to the leaf's center (cf 18e. and 18g. above), is just to control this behaviour of the two juxtaposed leaves, as has been detailed earlier (17b. above), or the leaves would give way to passing air, take velocity and come close to one another, even to meet; the angle A (21) would become larger than 90° (because the border between the two leaves has a certain width), and this conduces to the leaves being incapable to open, being blown to contact by up-moving air during the down-motion of the wing, which would be an unfavourable situation; similarly unfavourable would also be the opposite situation, when angle A stays small because of insufficient opening of the leaves: air is not fully free to pass across, and potential lift generation is not fully exploited.

27. Piezoelectric Actuation of the Wings in Unfavorable Conditions:

27a. There is an alternative way to rotate (in reality, to bend) the leaves down during the up-motion of a wing (to help open the passage, letting air pass across free) and up during the wing's down-motion (to create lift), for flight to be possible in difficult conditions, with strong winds.

27b. This way is piezoelectric actuation; each leaf is made from successive membranes of piezo-electrically active material affixed to one another and stretched accordingly in layers; the actuating method consists in supplying electrical current to the upper, then to the undermost layer in order to bend and unbend accordingly; This way secures leaf-control at every moment for the opening phase, for keeping opened, for staying in good contact with the under-fibers, and for closing back.

27c. The leaves are fastened steadily at best (cf 16b. above) and are desmodromically and fully controlled, with the option of being free to function as usual at other moments, when conditions (wind etc.) are again propitious to normal flight. Under-fibers and over-fibers are not indispensable for piezoelectric operation, but they may still exist in such an arrangement and provide extra security for control in any situation.

C3 Flight (Articles 1 to 17)
C3 1 to 2 Flight Mechanics and Commands
1. Mechanics of Flight:

1a. Flight and changes in direction succeed through the reciprocating motion of the wings in radial form in a plane which is basically vertical but may also be inclined. As detailed (C2.1a. above), the wings either move in insect-like mode, or in bird-like, in tweaked, in hovering, in floating, or in collective mode. The basic ones out of these 6 are the first and the second modes.

1b. In detail: For the insect-like mode, wings 1 and 4 move simultaneously down while wings 2 and 3 move simultaneously up, then in succession 1 and 4 move simultaneously up while 2 and 3 move simultaneously down, then again 1 and 4 down while 2 and 3 up, and so forth, i.e. each one of the two pairs of diametrically opposite wings move simultaneously down while the other pair move up, next, in rapid succession, each one of the two pairs move simultaneously in the opposite direction, next they move again in their previous direction, and so on (cf C2.4b. above). For the bird-like mode on the other hand, the four wings move simultaneously: the pair on the left side move jointly between them, as well as the two on the right side: up, down, up, down, up, . . . . (cf C2.4c. above). The insect-like mode being considered more intricate (and the bird-like one a variation on it), it is described here more in detail.

1c. The up-and-down motion of a wing (35) is the sum of two partial motions, as follows: a) A composite turn, which analyses as 2 turns: a1) A turn round a horizontal axis passing from point A (point of support of the wing to the body of the machine) and perpendicular to the longitudinal axis of the wing, (while the transversal axis remains horizontal) between two extreme inclinations up and down, at an angle b between them (33); this is the basic radial up-and-down motion of the wing for creation of lift force, rightly backed up by the further-down described parallel up-and-down motion (b. below), a) for flying in vertical direction: upwards and downwards, b) for hovering at a steady height in the air, and c) for adopting a particular movement, floating in the air, designated as floating mode, whereby the machine stays in the air without changing position (3. below). a2) a turn round the longitudinal axis of the wing; this means that the transversal axis of the wing inclines forward (meaning that its front half-axis lowers while its rear half-axis rises) or backward. Therefore, the composite a1-plus-a2 turn is in all a radial-turning up-and-down motion of the wing with its tranversal axis taking an inclined position, which conduces to add a horizontal component (that is, to fly horizontally) onto a just-floating-in-the-air phase; in essence, to move at an inclination different to the vertical. b) A parallel transfer up-and-down between the upper point and the lower one along the height of the machine (34), thanks to a suitable mechanism, resulting in the same effects as the a1 turn above.

1d. The a1 turn and the b motion can be in action one or the other indifferently, since they are concurrent, or they can act together, resulting in enhanced operation. The a2 turn and the b motion can be in action together, just like the composite a1-and-a2 turn, towards the same results, plus a horizontal component. The 3 actions, a1 and a2 turns and b motion, acting together, conduce to enhanced up and down flight with a horizontal component.

1e. It is to be noticed: the wing's support point A onto the machine's body combinedly c) allows a partial revolution round a horizontal axis perpendicular to the wing's longitudinal axis (33), d) moves up and down on a set distance along the height of the machine (34), and e) allows a swivel-like turn round the longitudinal axis of the wing. Combinations between these three (c to e) contribute to (f to h): f) making more worthy (for creation of lift force) the extreme part of the wing, near the tip C: through the a1 turn (33), not the b motion (34), that is, through the c revolution, not the d move; g) making more worthy specifically the base of the wing, but also the whole of it on an equal basis: through the b motion (34), not the a1 turn (33), that is, through the d, not the c); and h) succeeding in either floating in the air or moving up and down, and/or flying horizontally, on demand: through the 3 of them (2 turns and 1 transfer). Whenever there is reference to floating in the air, vertical flight also stands to reason. and when there is reference to a horizontal component, flight at whatever azimuth also stands to reason.

1f. In flight-turn a1 (33), greater lift is gained for a greater [turning angle b]-per-[time unit] ratio; but relatively less force is gained in the two extreme moments of the course of angle b (at the start and at the end of the down-motion of the wing) due to the wing's inclination to the vertical at those moments (specifically, due to the diminished rate of the vertical component); and this effect is more emphasized the wider the angle b is. Also in parallel motion b, greater lift force is gained for a larger [parallel transfer]-per-[time unit] ratio; but this entails a greater move along the height of the machine, finally a greater height of the machine, which goes against the important condition of inconspicuousness (C1.1d. above).

1g. In combined a1-plus-b flight (35), these 2 objections (but) (1f. above) are partially attenuated and the lift force is gained more easily due to simultaneity of the 2 actions.

1h. The combined a1-plus-a2 move yields a positive-looking flight effect: the machine flies in horizontal mode (C1.2b. above), the transversal axis of the wings is slightly inclined (close to the horizontal), the reciprocating motion is in a plane slightly inclined (close to the vertical), and the horizontal component of the lift force conduces to the drone flying horizontal, its body set in horizontal mode, not an inclined one.

2. Flight Commands:

2a. Based on the foregoing, various phases of flight and changes of flight direction are possible. Commands can be given to the different mechanisms to a) set or change the speed and the frequency of wing motion, b) or change the inclination of the wing's transversal axis, and c) actuate at a different degree the wings between them on whichever motion or turn.

2b The commands either originate in the AI unit of the machine, obeying to an inborne programme (or to a broadcast one), or are transmitted through RC. Whatever the case, the commands translate to electrical signals of measurable volume. The right volume, coordination and sequencing of the signals are found through experimental trials, taking into account the route desired, hindrances en route, winds and windshear, thermals on the rise, and other environmental conditions. An inborne expert system takes the information into the AI unit to elaborate on the signals, indulging for change and improvement in case of further specialisation of the commands.

2c. Concerning specifically the magnitude of the lift force gained at the start and at the end (1f. above) of every radial (33) down-motion of the wing (ac.a1. above), one can count 3 adverse situations: inertia at the start of the motion, incapacity to instantly stop at the end of the motion (inertia, again), and a diminished vertical component of the lift force created at the start and at the end of the down-motion of the wing. In order to alleviate this effect, a special arrangement of the time lapses of motion is determined: a short moment T before the end of the down-motion of a couple of diametrically opposite wings, the down-motion of the other couple starts: a moment-before-synchronisation effect, designated as m.b.s., engageable at will.

2d. In this way, the addition of the two moderate vertical components makes for continuity of the motion without irregularity, in case such an irregularity is not desired, for example when taking photos or video: the straightness of flight direction is iconically enhanced; while in normal flight this irregularity (i.e. iconic hiccups up and down in the motion of wings and machine as a whole) may be desired, because it enhances the inconspicuousness of the machine, the important condition (C1.1d. above).

2e. This m.b.s. effect reflects on the up-motion of the wing couples too; it makes for a more-natural looking flight, but in this it has no consequence on the creation of lift. On the other hand, the m.b.s. does not apply to the bird-like mode of flight, where the four wings move simultaneously.

2f. The duration of the m.b.s.-bound moment T is determined through trials for every possible combination of external conditions and necessities of flight; it is stored in the AI unit to be applied on demand.

2g. Notice on m.b.s. effect (2c. above) and on the notion of lift force: The lift force generated by the wing (the l.f.w.) is a force perpendicular to the plan of the wing at every moment, while the lift force acting on the machine (the l.f.m.) is the vertical component of the l.f.w., so: the m.b.s. effect tends to overlap the two extreme-moment [l.f.w.]s in order to momentarily maximise the l.f.m. and to smooth the diagram of its intensity versus time.

C3 3 to 11 Flight Phases and Modes

3. Floating in the Air:

3a. The wings move in a vertical plane, both radial and parallel (1c. above). The magnitude of the lift force, controlled as needed, equals the weight of the machine, with no surplus component vertical or horizontal for transfer or turn. This is the floating mode (cf 1c.a1. above).

3b. Micro-adjustments are made depending on perceived (through sensors) external conditions. The stability of the position also is controlled by a six-axis inertial system (designated as six-axis i.s.) and/or by GPS. If no specific requirements are imposed, the preferable flight mode for floating in the air is the insect-form one: it offers the positional stability needed for cameras etc.

3c. Floating-in-the-air is the starting phase for performing each of the flight modes and handling methods described hereafter. The floating mode, which is one of the seven flight modes (C2.1a. above), may be performed in whichever of the following three ways, or modes, out of the seven ones: insect-like, bird-like, or teaked. A particular case while floating in the air is flight in captivity, or captive mode (15. below).

4 Ascent and Descent, Uniform Motion:

4a. It is realised through controlled increase/decrease of the lift force compared with the weight of the machine; a) first, a slight lift increase for takeoff and starting flight upwards, then a moderation of the lift force in order either to keep floating in the air (at a steady position) or to keep a steady course upwards, enough for overcoming air resistance if ascending very rapidly, with no horizontal component or turn; b) then, a slight decrease in lift force for starting descent, followed by a moderation in its magnitude to keep a steady course in descending; c) finally, some slight, controlled increase in lift force (to stop descent), gradually fading for gentle landing, helped by either GPS or height sensors.

4b. The increase and decrease phases are effected through increasing or smoothing down respectively the intensity (cf 1f. and 1g. above) and the frequency of moving wings accordingly.

4c. Specifically in takeoff and final landing, proximity of the ground (or whatever the landing place may be) results in inability to fully extend the wing motion (in its lower extreme) to the same degree as it would be in the open air; so the intensification of the motion is out of question and one can only rely on increasing its frequency; it grows momentarily to even triple the regular frequency for normal ascent/descent.

5. Straight course, horizontal or inclined, uniform motion:

5a. It is realised by combining the preceding commands, for the vertical flight component, with the controlled swivel-like turn of each wing round the longitudinal axis (1c.a2. above).

5b. First, starting from a float-in-the-air phase, the 4 wings undergo a transversal inclination downwards: the transversal axis of each wing inclines downwards, with the under-side facing towards the back (i.e. the front half of the transversal axis turns downwards, and the back half upwards), and the wing motion/frequency intensifies slightly, since the vertical component of the lift force decreases due to the inclination; the horizontal component promotes forward transfer, and horizontal motion starts; then, through some moderation of the lift force and/or a slight decrease of the angle of inclination, the horizontal course is sustained. The body of the machine keeps in horizontal position (horizontal mode) and its longitudinal axis coincides with the horizontal line of flight.

5c. For a straight course on an inclined direction, the combination of the horizontal motion with an ascent or descent course of flight (4. above) results in flight at whatever azimuth. The machine is in inclined mode and the longitudinal axis coincides with the line of flight.

5d. The four wings keep moving at the same transversal inclination, broadness of motion and frequency. The active appendages (cameras etc.) and passive attachments are kept in their standard arrangement. Coincidence of line of flight and machine longitudinal axis is recommended in case of low flight (parallel to ground relief), in inconspicuousness.

5e. Changes in inclination of the ground is accompanied each time by an equal change of the line of flight, through a brief, temporary, twofold difference: in broadness of motion and/or in transversal inclination between each wing pair's two wings, diametrically opposed between them, but keeping the total amount of lift force steady; for example, to incline downwards, a brief such twofold difference between the front and the back wing of each pair is enacted, with the front wing transversally inclined downwards more than the back wing, and/or the back wing moving more intensely in broadness of motion for a short duration.

6. Acceleration and deceleration in the flight modes 4. and 5. above: It is realised through a brief twofold change, increase or decrease respectively, of the broadness and/or the frequency of wing motion, followed by a slight moderation of them, but keeping them higher than their initial value. Inclination of the transversal axis of the wings (to the front for acceleration, to the back for deceleration) also helps (C2.3. above). This is continuously controlled by the inborn 6-axis i.s.

7 Turn Round the Vertical Axis, Uniform Motion:

7a. Initiating the turn: A turn round the vertical axis, or yawing, is realised through briefly imposing an opposite transversal inclination to each one of the two wings of each pair of diametrically opposed wings, keeping each time the total of the lift force steady. For example, wing 1 (front left) inclines tranversally upwards while wing 4 (back right) inclines tranversally downwards, and the machine turns left; next, wing 2 (back left) inclines tranversally upwards while wing 3 inclines transversally downwards, and the machine keeps turning left; and so on.

7b. In reality, the longitudinal axes of the wings are not disposed parallel to the transversal axis of the machine, but rather close to oblique lines, at 45° to this axis, since the two wings on each side of the machine do not sit close or parallel to one another, but they are disposed in an "open" configuration, distant and at an angle from one another, and this is favourable for stability in flight; so, the transversal axis of a wing being oblique, the horizontal component of the lift force created by each wing is disposed at an angle to the longitudinal axis of the machine, not parallel to it.

7c. Sustaining the turn: The turn is sustained by moderating the difference in transversal inclination of the two wings of each pair, just in order to overcome the resistance of air to the turn.

7d. Finishing the turn: Through briefly imposing to each wind the opposite transversal inclination to that imposed initially.

7e. The effectiveness and the steadiness of the move are controlled by both the 6-axis i.s. and the GPS unit.

7f. In the case of bird-form mode of flight, the two pairs (left and right) of wings working together undergo the same difference in transversal inclination as described above. The four wings act as a pair of double wings. For example: To turn left, the pair at left has its two wings incline transversally upwards while the pair at right has its wings incline transversally downwards, for turn initiation, and so on accordingly for sustaining and finishing the turn.

7g. In order to look more natural, in this case the front left wing has its up-down range of motion slightly restricted, leaving the upper part of this range active, and the back left wing respectively has the lower part of its motion range active; for the right pair of wings, the inverse is valid. In this way, the 2 wings of each pair have an appearance of a continuous line of wing extremes and don't look unnatural.

7h. The restriction cited above results in slightly diminished lift force; in exchange, the frequency of the motion is intensified a little.

7i This turn takes very little energy to take place in the case of a machine in vertical mode, due to the gyro-momentum of the machine being of low value.

8. Turn round the longitudinal axis, uniform motion:

8a. Initiating the turn: A turn round the longitudinal axis, or rolling, for example to the right, has the left wing of each wing pair going up each time the pair comes to action, and the right wing coming down, and then the other pair is activated, left wing goes up, right wing down, and so on. The turn is realised through imposing a brief, temporary increase in motion broadness to the wing expected to ascend, each time a pair of wings is moving, and at the same time an equally brief decrease in motion broadness to the one descending. If the drone flies at a distance from eventual onlookers, by flying high or otherwise, the frequency of wing motion can be raised for the ascending wing and reduced for the one descending. Alternatively, the descending wing may be left idle for a while, not moving at all. In any case, the total of the lift force created by each pair of wings remains the same.

8b. Sustaining the turn: The turn is sustained by moderating the actions imposed on the wings. This phase is very brief and can be omitted.

8c. Finishing the turn: Through a brief, controlled imposition of the inverse action to that initially imposed on each wing.

8d. This turn takes very little energy to take place in the case of a machine in horizontal mode (cf 7h. above), due to the gyro-momentum of the machine being of low value.

9. Turn round the transversal axis, uniform motion:

9a. Initiation of the turn: The turn round the transversal axis, or pitching, for example forward, that is to take a descending course, is realised through imposing a brief, temporary increase in motion broadness (that is, an increase of lift force) to the back wing of each pair of wings at the moment the pair is moving, and at the same time an equally brief decrease in motion broadness to the front wing of the pair, this front wing expected to go down first. The reverse goes for the ascending manoeuvre on the machine.

9b Pitching downwards (and conversely upwards through imposing reverse commands) can be effected faster through additionally giving the command to front wings to slightly turn transversally forwards down and to rear wings to equally turn forwards up: the nose of the drone is brought down very quickly.

9c. Sustaining the turn: The turn is sustained by moderating the actions imposed on the wings. They may be of a low value, just to overcome air resistance to the turn. In any case, the sustain phase is of short in duration.

9d. Finishing the turn: The turn comes to an end through imposing to each wing the reverse of the initially imposed action.

10. Notice on 8. and 9. above:

10a. In performing the turns round the two axes, longitudinal and transversal, this is effected through brief, oblique (7b. above), blow-like turns simultaneously round the two axes, with more energy given round the longitudinal and the tranversal one, respectively; with two consequences: a) on the one hand, the important condition of inconspicuousness (C1.1d. above) keeps being observed: the wings undergo blow-like motions and turns, the appearance is natural and very similar to the one of a flying insect/bird, so inconspicuousness is maintained; b) on the other hand, this coming and going motion does not help in steadiness, and stability of the cameras and other sensitive equipment suffers; so some means for stability of the machine, or only for the camera, or just the lens, is indispensable.

10b. The inconvenience described above, the coming-and-going induced motion from the wings, can be overcome by adopting the tweaked mode in flight, described in the preceding (cf C2.6a. above): a) An articulated bend is imposed on the wing's central line ABC at point B, at an angle fluctuating at will, making it a broken line. The two diametrically opposed wings, say the pair one and 4, thanks to their bends (at the Bs) bring their two centres of air resistance towards places C1 and C2 just on either side of C', the machine's centre of air resistance (instead of at the basic position of the wings, oblique to C', roughly at a 45° angle), making the flight quite bird-like with only two wings (instead of four) being operative at any one moment.

b) Next moment, wings 1 and 4 straighten up at their Bs, and retreat to their basic postures (oblique at 45° to the longitudinal), while the pair of wings 2 and 3, sustain at their Bs an equal bend as the above, bringing their centres of air resistance unto the same points C1 and C2 as above c) And so on, wings 2 and 3 straighten back and wings 1 and 4 bend again, etc. As stated in the foregoing (C2.6c. above), the tweaked mode is useful for certain flight manoeuvres, but the configuration is not robust enough, mechanically.

10c. For this reason this flight mode is recommended for flight in straight course at uniform speed (5. above). In case it is desired to stop the straight course rapidly and convert to steady floating in the air, the tweaked mode (quite bird-form, as stated above) is interrupted and simple insect mode is adopted by straightening the B-bends of the wings and keeping ABC axes straight: the machine continues operating by pairs of diametrically opposed wings, but from now on the wings operate (not any more at their B-bended positions on both sides of the centre of air resistance, but) at their normal positions, at 45° oblique to the machine's centre of air resistance.

11. Composite turn round more than one axes, motion uniform/accelerated/decelerated: It is realised by effecting the above described actions on the wings, together as needed. Flight takes place with turns round whichever of the 3 axes, with the speed staying fixed, increasing, or decreasing.

C3 12 to 17 Commands to Change Flight Direction

12 Workings to Alter Direction:

12a Given the different abilities of the machine to initiate a course of flight and to turn round its three axes, described previously (to above), the change of direction can take place in one of the two following ways:

12a.1. The standard way: the body of the machine turns round one or more of the three axes as described in the foregoing, and the flight continues forward in the new direction and inclination.

12a.2. The rapid way: the 4 wings bring about an instantaneous change of flight course, with the body of the machine still in its initial direction and inclination, operating all 4 together, with all their 3 possibilities: radial turn up-down, transversal inclination forward-backward, and parallel motion up-down (cf 1c.a1., 1c.a2., and 1c.b. above), and with the possibility to apply commands in varying intensity to the different wings (7a., 8a., and 9a. above). After this instantaneous change of direction/inclination of the flight has been effected, the commands to change the direction of the body of the machine are applied and the longitudinal axis of the machine coincides with the direction of flight from that moment onwards.

12b. The standard way is easy to be operated and changes the course of flight smoothly, while the rapid way, complicated as it is, is recommended for pressing instances when changes need to be effected urgently.

12c. In the following, description of different detours/manoeuvres that the machine can execute to perfection, executing commands to change flight direction, is done: a) flight to escape/to survival, in 13. below; b) flight taking advantage from ascending thermal aerial masses, in 14. below; c) flight in captivity, in 15. below; d) flight low, in 16. below; and e) obstacles avoidance en route to target, in 17. below.

13. Flight to Escape/to Survival:

13a. In case a sudden blast of wind occurs, the drone may take a turn round one or more of its 3 axes, or may stall or fall into a spin; or may enter whatever other condition of loss of balance and of control. This can also result from launching a small weight in the course of certain missions, or from receiving a blow.

13b. Such an instance is perceived by the inborn 6-axis i.s., and through some suitable software commands can be given to cope with the loss of control: a) to take composite, opposite turns to those the six-axis i.s. detects, and b) to lift the four wings to a position higher than their standard one, the highest in the range of their possible motion (C2.7c. above), in order to function like a parachute and to self-redress.

13c. The self-redress command is granted priority over the other commands and ceases function as soon as the six-axis i.s. detects restoration of balance. It is quite instrumental in some circumstances, to restore lost or just disturbed horizontality (cf C6.5e. below). The sensors of the inborn AI unit measure the parameters of flight, to be fed to the system, with enough frequency, not less than 5/sec in regular conditions; in case of perceived instability, the frequency rises to no less than 25/sec, then, after balance is restored, comes down again to its regular rate.

13d. In case of bad weather or a perceived danger whatever, the drone flies low, using the GPS unit, with satisfactory inspection of the surroundings. The relief of the ground and the height of the course of flight are fed to the system with enough frequency; the relief may be broadcast to the inborn unit as it passes from a region to another, or it can be fed in advance for each region the respective mission will delve in.

13e. In this way the machine can survive an adverse situation by overflying a torrent, a ravine, a river's or a valley's bed, or a clearing in the woods.

13f. In case 2 flying units, e.g. a machine and another flying unit whatever, follow same-altitude flight courses converging, shortly to cross, a command is given for flight by priorities, following regulations in power, changing course well ahead of course intersection.

13g. In case of frontal (or quite) encounter with another flying unit, trial commands are given to the wings for escaping collision through diverging the flight course: the software, a much lighter version to TCAS, composed for drones, gives random directions to point to low right, straight ahead, front up, just left, etc., with rapid feedback as of the reactions of the incomer, and corresponding reply move. There may also be a relying intervention from a terrestrial control centre to take over following the regulations: a sense-and-avoid system, created for drones.

14. Flight taking advantage from ascending thermal aerial masses: A thermal mass is detected by an infrared sensor and a suite of commands is determined either automatically or by RC and given to the wings in order to approach and use the ascending mass for economy in consumption. In following successive thermals, situated on the course of the machine, quite important savings can be achieved at these moments, particularly if the motor stays idle during these and only starts operation in the moments between them.

15. Flight in captivity: This is the captive mode. It is realised when there is a tie (a rope, a special fiber, or a wire)

connecting the machine to a base. It may be either floating in the air (3. above), in a steady place in relation to the ground and the surroundings, or flying parallel to the base, accompanying it, in which case it is sort of floating in relation to the base. The tie may transmit data by itself, or may have a transmitting medium wound over it; it may connect either to the ground, whatever the ground base may be, or to a navigable vessel, even to a machine of the present type floating on the water. Flight in captivity is dealt with at the chapter on applications (C6.6. below); the particular case of a drone flying captive to a boat or a submarine is included there (C6.6c. below).

16. Flight low: When flight in low height is needed, following the relief of the region (cf C6.4j. below), the commands described in the foregoing (13d. above) are to be considered. They are valid for flight on straight course, horizontal or inclined, uniform motion, already dealt with (5. above).

17. Obstacle Avoidance En Route to Target:

17a. A drone flying towards a target is likely to detect an obstacle whatever (an object, a mass, or a wire) that stays still, does not constitute a target, and must be flown around in order to continue as desired.

17b. The existence of the obstacle on the line of sight of the sensors may be due to the fact that the machine is carried away from its initial course due to a sudden blast of wind or whatever other cause.

17c. Sensors detect the presence of the obstacle and determine the largest dimension of its mass, its length; a suite of commands is given to the wings in order to deviate from the course of flight and fly around the obstacle in a plane perpendicular to the length detected, at no less than a set distance from the obstacle, and then to go on following one of two alternative courses:

17d. either perform (approximately) a quarter of a circle round the obstacle and then, after focusing anew on the target, continue flight course towards it, its orientation and azimuth being slightly altered due to the deviation performed, 17e. or perform half a complete round about the obstacle and then continue on the initial route (orientation and azimuth) towards the target.

17f. The first alternative weighs better in case the way to the target is anticipated to be free of other obstacles, while the second one is preferable in case many obstacles are detected in the vicinity and insecurity rules on whether the target stays visible after the deviation.

C4 Approach and Adhere (Articles 1 to 11)

1 General:

1a. The machine is designed for operating and performing work at every place, every moment. Not only at the time of flight or while in adherence at a place, but also while approaching an object or a surface to adhere to and to stay still on it, and while disengaging and pulling off the place. This ability makes the machine instrumental and unique, able to perform work in situations no other flying machine can confront. Applications described in a subsequent chapter (C6. below) are only possible thanks to the machine's ability to bring about such difficult technical operations.

1b. Potential objects and surfaces for adhering or clinging onto are considered, and the following case-specific procedures are detailed at the following articles: the ground (horizontal or inclined), at 2. below; water surface and underwater, at 3. below; wall of a building, at 4. below; corner of a building, at 5. below; other vertical surfaces and objects, at 6. below; branch of a tree, at 7. below; wire, horizontal, at 8. below; and wire, vertical, at 9. below.

1c. According to conditions and needs, some corresponding equipment is attached round the body of the machine, taking care to keep it out of the way of flying apparatus (wings) and of camera vision. Equipment may be appropriate for one or more adhering cases, for simplicity's sake not for many of them, in order to save on weight, bulk and complication.

1d. Care is taken during the approach and the adherence procedures, not to let motion irregularities ("hiccups in flight", C3.2d. above) spoil the steadiness of the flight; for this reason the m.b.s. (moment-before-synchronisation, C3.2c. above) comes into effect.

1e. After approach, adherence and immobility, a mechanism folds up the wings, in order to contribute to inconspicuousness and to stay out of the way of cameras and mission-specific equipment (taking care not to let them get entangled with any attached peripheral protective devices, cf 7d. below); possible ways to fold up are upwards, down, or sideways: the wings coupled by pairs, the two on the left bound closely at their length, also the two on the right. Next and last, the supporting elements, having kept space free for wings to move, retract to minimum dimensions to upgrade adherence (by minimising the bending moment) and to help in inconspicuousness.

1f. Ultimately, the disengagement phase takes place: first, support elements (legs, horizontal pistons, etc.) extend to adequate size for conferring free space to the wings, next the 4 wings unfold to operative horizontal position (paying attention: clear of support elements and potential peripheral protective devices), then flight starts (in captive mode in the beginning), the case-specific genuine process of disengagement (described in the case-respective ten following articles two to eleven) is activated, the flight turns floating and not captive anymore, and finally the drone flies away free.

1g. A first estimate of the time it takes to complete the adhering procedure is 20 sec, for caution's sake, but disposing bespoke elements of the equipment described in the following articles, and keeping a tight timetable, it can come down to almost 1 sec. As for the time it takes for disengagement, a first estimate is 3 sec, but keeping a tight timetable will help reduce it to 0.3 sec or just a little longer. A specially prepared set of elements can help accomplish the first time reduction: the machine disposes telescopic, flexible legs extending towards the place to cling to, for achieving a smooth impact; also other adhering material like magnets and glue, ready on impact to instantly secure adherence (cf C6.4e. below), prior to activating the case-specific processes described in the following articles.

1h. The following articles two to eleven refer to the various approach/adhere modes.

2 Ground:

2a. The machine approaches vertically or on inclined course towards the landing point, decelerating as described in the foregoing (C3.6. above), corresponding to the decreasing height over the ground, and taking care not to hit the ground but to land gently in the final touch.

2b. The equipment carried on in the circumstance may be bulky and eccentric, resulting in unsteady rest, non-horizontal. To mitigate, 3 adjustable-height telescopic legs are attached underneath, to stand horizontal on any ground inclination automatically or through RC (cf C9.4. below). If landed on pasture-land, the legs are settled in height just above the grass or eventual obstacles so that camera vision stays free.

2c. In the case of high inclination of the ground (in case of a cliff), at the moment that the machine approaches, still flying, an arrow is shot perpendicular to the surface; it is connected to the machine by some filament let off from an inborn spool, which rolls off as the machine is free to fly down to the desired height along the ground (the cliff), where it stops, it unfolds 3 telescopic legs stretched perpendicular to the surface, and stops flying, staying idle but fully functioning.

2d. In case of landing on moving sand, the 4 wings lay horizontal in order to avoid going down. For liftoff, the observation (C3.4c. above) about imperfect functioning of the wings just over the ground does not hold here; due to a mild resistance from the sand, at the first ascent-descent of a wing pair, the other pair staying on the sand, lift force is easily created and ascending flight takes place.

2e. In case a wind blow overturns the machine on the ground, a programmed, highly rapid (knock-like) shaking off of the two wings of one side of the machine can help it stand upright and regain horizontality (or an alternative, equally rapid shaking off to one side the 3 telescopic legs presented above, now standing upright, at the same time gathering together to shrink their length and transfer their momentum to the machine's body, can help attain the same effect).

3 Water Surface and Underwater:

3a. The machine lowers in flight till touching the surface (cf C6.4d below), the body is sunk to a degree, kept from sinking by its buoyancy, the upper part staying out for the camera(s) to work. Buoyancy is secured by 3 small balloons annexed in the perimeter, which inflate at the opportune moment in order not to be visible in other times, in flight. The upper surface of the machine is coloured slightly blue. To mitigate instability due to waves, attachments operating in the air connect to the body through a gyroscopic or other inertial mechanism.

3b. In case the machine is meant to operate motionless on moving water, for example on a stream, two actions are performed, for stabilisation and for anchorage respectively: a) the command is given to the 4 wings to operate in a way to keep horizontal, the currents in the water notwithstanding, courtesy of the six-axis i.s., and b) an arrow is shot down to reach the stream bed, the drone still floating in the air over the water; it is connected to the machine by some filament let off from an inborn spool, equal to the one described in the foregoing (2c. above), which unrolls as much as needed to keep the machine captive in the desired place and secure at the surface; after that, the machine can stop flying and stays inert on the surface.

3c. In case the machine operates at the surface of a different liquid, specifically lighter than water (e.g. petroleum), the low density is taken into account to determine the volume of the balloons.

3d. In case it operates at the bottom of a volume of water (at sea, a stream, a water tank), provision is made for a suction cup (either a passive one or a small centrifugal water-sucking one) to secure adherence to metal or stone, and for a hook or an arrow to hold on sand surface at the water bed.

3e. If expected to operate while swept away on the water, the machine has an RFID or other localisation unit to be retrieved in time; if not successfully, or if not thus programmed, the machine, after its work is done, destroys itself by making use of the inborne charge.

3f. For take off and fly airborne, starting from maneuvering inside a volume of water, a) the machine heads towards the surface using a smooth movement of the four wings, b) once at the surface it inflates the balloons to stabilise itself, c) next the balloons inflate more than regular and the body of the machine rises enough for the wings to fully operate and lift off the water, d) then once in the air the balloons deflate (cf C6.5b. below).

4 Wall of a Building:

4a. The machine, disposed in vertical mode (6), approaches in decelerating flight and flies in floating mode close to the wall 39.

4b. In its upper part, it has a thin horizontal, passing through, metallic piston (42) with a mechanism to extend it backwards and forwards on demand; at the piston's rear tip (the one towards the wall) there is a small receptacle (43) with a) a quantity of glue material, b) a heating device for the glue (46), and c) a mechanism for a small drop of the glue to flow out under pressure from the lower end of the receptacle into a slim, horizontal, bored-through needle (44); the needle disposes a) a washer (45) at its rear end, holed at its center, with its rear surface parallel to the wall, b) a heating device for the needle (47), and c) a heating device for the washer (47').

4c. In its lower part, the machine has two thin horizontal metallic pistons on its two sides (48), each with a mechanism to extend it forwards and backwards on demand. (Alternatively, instead of the two pistons there may be two thin metallic legs, each on one side of the machine, revolving round its support on the machine's body in a horizontal plane. The two legs are part of the three-leg system described in the foregoing, 2b. above, for supporting the machine on the ground.)

4d. At their backwards-extended place, the 3 pistons (the one on top, the other 2 on the lower part) constitute a 3-point (triangular) support base for leaning on the wall, (Alternatively, the upper piston and the 2 legs lower down constitute a similar triangular support base.) In order to hold firm the weight of the machine while it being "hung" in a way from the glued point at the upper piston's needle tip (the other 2 supports, the lower pistons/legs, being simply compression rods), the compound fixture of the upper piston and needle, a cantilever in essence, is sturdy enough to withstand the bending moment at every point of its composite length, and particularly:

A at the base of the needle (44'), where the cross section of the needle is expected to withstand the local bending moment: the total weight of the machine (body, mechanisms, and accessories) times the length of the needle (44), and B at the supporting point of the piston (the rear side of the body) (42'), it being in its extended position, where its cross section is expected to withstand the local bending moment: the total weight of the machine times the composite length of the piston extension plus the needle (42, 44).

4e. Once the approach has taken place, for adherence to be effected, a) the machine approaches closer to the wall (39), b) at the same time the upper piston (42) is driven backwards, so that the washer at the tip of the needle (45) comes with all its surface in contact with the wall, and c) the two lower supports (pistons or legs) (48) also are driven backwards to get contact with the wall.

4f. Right after this, a) the heating devices (43, 47) warm the glue receptacle (with the glue material in it) and the needle; b) the pressing mechanism squeezes a drop of the (now warm) glue material to pass through an orifice at the lower part of the receptacle (44') into the needle-long bore and through the hole of the washer (45), and to spread between washer and wall, in all the washer's surface, where c) the small quantity of the warm glue material cools instantly and solidifies, due to the low temperature and the mass of both the washer and the wall of the building as a whole, d) finally, the machine finds itself leaning on the wall in a stable three-point configuration, with the washer firmly keeping it glued to the place, preventing it from falling off; the drone adheres steadily on the wall and the motor ceases flight e) Subsequently, the four wings (10, 11) move into their folded position (49), the three supports (upper piston and two lower supports, either pistons or legs) retract a bit, and the machine finds itself in idle position closest to the wall, inconspicuous, and firmly glued in place.

4g. Disengagement and leaving the place, after the mission is completed, is again a composite action:

A) The 3 support pistons/legs extend a bit forwards (away from the wall), till attaining their maximum operational length, the body of the machine finds itself at a convenient distance from the wall, the 4 wings unfold to their regular extended horizontal position (10, 11), and the motor starts flight in floating/captive mode, B) the heating devices (47, 47') heat the washer and (additionally) the needle, so that the glue warms and mollifies, C) the drone flies away free, the upper piston (42) is retracted in from its backward position, and the 2 lower pistons (48) are equally retracted forwards (or the 2 legs revolve horizontally to their idle position).

4h. Alternatively to the B part above, for an instantaneous disengagement/departure, the rear tip of the upper piston, firmly bound to the machine, detaches from the compound outfit [glue receptacle-needle-washer] (43, 44, 45), leaving it in place with a small charge for eventual self-destruction, and the drone flies away, subsequently retracting piston(s) and/or legs (42, 48).

5 Corner of a Building:

5a. The machine is well prepared for approach and adherence onto a right-angle corner of a building, which is a particular case of adhering to a building's wall. In this case the drop of warm glue material, through the needle-and-washer fixture, is either a) applied to the corner exactly, the washer being of an angular form, folded (at its vertical diameter) to a right angle facing the building's corner, the angle's edge being vertical so that it adopts the vertical edge of the building, or b) applied to one of the corner's sides, at a point closest to the edge of the building, the washer being flat, at an angle to the needle accordingly.

5b. Adherence to a building's corner offers a double advantage over the wall-adherence case: a) The machine being in vertical mode (6), the four wings extend from the body at approximately right angles between them, for not interfering between them, and for contributing to stability in flight; given this, when approaching a building's corner, the wings don't hinder the body from coming closest to the corner, so helping inconspicuousness to take effect, the important condition (C1.1d. above), at the same time keeping short the upper piston (42) and the two lower supports (pistons or legs) (48), while, when approaching a wall (the general case), the three supports (42, 48) have to be longer and undergo the retract-extend process, for the wings to dispose vital space to move. b) The machine has a wider field, close to 270°, for the camera to watch, instead of about 180° in adhering to a wall.

5c. The corner of the building may be wider than the former case, for example a 120°-angle corner in a hexagonal building, in which case an equal angle is anticipated for the configuration of the two lower supports: either a) the two revolving legs are adjusted to surround the corner, or b) the two pistons (48) are arranged for adopting an angle of this value. As for the upper piston, similarly to the right-angle case (5a. above), the washer at the tip of the needle: is either a) of 120°-angular form, for the exact-at-corner application of the glue, or b) flat, at an angle to the needle, for the close-to-the-edge application of the glue.

6 Other Vertical Surfaces and Objects:

6a. In case of adhering to a surface where application of glue is not advisable or at all possible, a suction cup is used. In case the passive (static) suction does not work, due to rough surface for instance, a small vacuum device for aspirating suction enters service.

6b. In case of adhering to a post, to a pillar (from iron, wood, or other material) with a smooth surface, the same procedure as that for a wall takes place. Specifically for vertical objects from wood 40, at the tip of the upper piston 42 there may be a perforating device (50, 51) instead of glue and needle, for better effect.

6c. In case of an iron post or column, or other vertical surface made of iron, the glue-drop method put aside, adherence can be effected by activating an electromagnet, though this consumes a certain current in order to magnetise (cf C8.3. below).

7 Branch of a Tree:

7a. The approach to branches' or trunks' vertical surface is effected quite like in the previously described variations (4f. and 6b. above); another method is described in the following (8g. below) for hanging from thin and dense flora elements. Here is an integral method to adhere to a horizontal branch, starting by flying to a point above the side thereof and, once there, flying in floating mode. From the lower part of the machine a length of ribbon unspools and is let down with a small weight at its tip; the ribbon's side, facing the branch, is coated with a gluing gel (which is being let free from a muzzle, as the ribbon unspools, to coat it) for adherence through its anchoring effect on the branch side's rough points. (Alternatively, a ribbon with accordingly coarse, high-friction surface can be used.)

7b. Next, the machine sets in horizontal flight, crossing the space above the branch to a position over the other (the second) side of the branch, and lowers to a position level with the convex part of this second side, appropriately unspooling the ribbon to (partly) embrace the branch's perimeter, and flying in floating mode close to the side of the branch.

7c. So, the lower part of the machine stays captive to the upper part of the branch through the extended ribbon (at an oblique position). The machine disposes a triangular support configuration: three horizontal pistons (one in the upper part, in central position, with glue, needle and washer, and two in the lower part, on the two sides) protracting towards the branch, as in the wall-adherence case (4b., 4c. above), with this difference: the washer on the tip of the upper piston rotates freely at the tip of the needle to adopt the inclination of the ribbon; it touches the back side of the ribbon, and the squeezed-out drop of warm glue cools and solidifies as soon as contact occurs between the ribbon and the washer). The resulting support configuration details as 3 horizontal supports, of which the upper one is under tension and the two lower ones are under compression, plus one more tension (the ribbon) in oblique position, completing the lattice work for resistance.

7d. Next, the motor ceases flight: an inconspicuous drone adheres ready for operation. A dodecahedral device, assembled to protect helmet-wise 360°-round and keep clear of the foliage, then shrinking expertly to free the camera's vision range, can prove helpful.

7e. To disengage from the place, the drone starts flying captive, floating; it heats the glued washer, retracts the 3 supports, flies in reverse to the previous procedure round the branch, sweeps/unclings the ribbon from the rough surface, winds it back on its reel, and flies free away.

Alternatively, for an instantaneous disengagement and departure, a) the unspooled length of the ribbon is cut off (making use of a cutting device at the lower part of the machine), b) the rear tip of the upper piston, bound to the body of the machine, detaches from the compound outfit [glue receptacle-needle-washer], leaving it in place with a small charge for eventual self-destruction (cf 4h. above), and the drone flies away, subsequently retracting pistons and/or legs.

7f. In case the drone approaches a vertical branch or a tree trunk to adhere to, a) either its surface is smooth, and the procedure of adherence to a wall (4. above) is followed, b) or it is rough, and the procedure of adherence to a wooden post (6b. above), using a penetrating device at the tip of the upper piston instead of the glue receptacle with its ensuing attachments, is followed.

8 Wire, Horizontal:

8a. Set in horizontal mode (5), the machine flies below the (horizontal and stretched) wire (58) and approaches it from the underside, where it sets in floating mode just under the wire, at a vertical distance such that the wings remain free to fully operate, and at a small distance horizontally as to diverge slightly from a just-under-the-wire position.

8b. It disposes in its upper part an upright passing-through piston (59), with the direction of its stem passing through the machine's centre of gravity, and a mechanism to protract it upwards. At the piston's upper tip there is a four-point hook (60): it has four oblique, reverse-directed needles (56), folded around the piston stem, which deploy by revolving round the piston tip towards positions at 60° angles between them and inclined each at 45° to the piston. The form of the contraption is one of a quadrilateral pyramid (56), in horizontal posture, with the tip of the piston in the role of the pyramid's height; or again the form is that of a half-octahedron.

8c. For hooking onto the wire, the 4 oblique reverse needles (56) are moved by a mechanism to their deployed positions, and the piston is pushed upwards till the oblique reverse needles find themselves (their own tips) just above the wire (controlled by a sensor which measures distances) (60'), in which moment the machine performs a short horizontal flight towards the wire, to touch it with the hook's stem. (The crosswise touching act between the horizontal wire and the vertical hook stem is detected by a mission-specific sensor; a thin and short metallic cylinder is set round the hook stem, not touching it, having elastic supports at its 2 ends which secure its non-touching configuration; when the stem-to-wire touching takes place, the cylinder is pushed into contact with the stem of the hook, and some electric wiring helps detect the fact.) Next, the machine is let fly vertically down a little, till one or two of the reverse needles hook deep onto the wire, up to the angled tip of the hook, and the fact is detected by another sensor. In this way the machine finds itself clinged to the wire and the motor ceases flight.

8d. In case of approaching electric current-carrying wires running in vertical superposition, the hooking is done onto their lowermost one, taking care not to let any part of the contraption touch the next wire above (cf C8.3. below). In such case, the connection between piston (59) and hook (60) is insulated.

8e. To unhook, the motor starts flight in captive mode (the piston still remaining hooked onto the wire), then the machine with the piston rises a little till the tips of the oblique reverse needles find themselves (again) just above the wire; next, the machine performs a short horizontal flight to disengage from the wire (by taking away the vertical hook stem from the horizontal wire), and the 4 needles fold back into their contracted positions round (and parallel to) the piston. The machine is then free to fly away.

8f. Alternatively to the preceding process (the unhooking part of it), for instantly disengaging/leaving the place, the machine's body (5) detaches from the vertical piston (59), leaving it in place, and starts uncontrolled fall (vertical), then it starts flight and resumes horizontality (C3.13b. above), undergoes a further short controlled fall due to inertia, and continues in controlled flight to any direction, free.

8g. The above hooking method can also be applied in the case of discreetly adhering to dense and thin flora elements (small branches etc.) sturdy enough to carry the weight of the machine, as an alternative method to the preceding process (7. above): The up-protracting piston (59) passes through the body of the machine (5) and can protrude quite enough from below into the canopy of a forest to hook onto a small branch or onto a twig at its point of branching out. Trial down-pulling motion (through vertical flight) informs about a firm hooking, then the motor stops flight, the 4 wings fold in, and the retracting mechanism draws on the piston in order to set the machine at the desired height, to operate unseen among leaves and more. The hook is a large version in order to catch well. To unhook, either the above described instant disengagement method is followed (8f. above) or the hereafter detailed method of revolving-free reverse needles (9j. below), depending on the mission.

9 Wire, Vertical:

9a. The approach process is similar (with a certain variation) to the one described in the previous case, approaching a horizontal wire (8. above), only at an azimuth differing by 90°: The machine, set in vertical mode (6), flies in floating mode close to the wire (41); it possesses on its back side, facing the wire, 2 thin metallic pistons (the top piston and the lower one) (55, 42), both horizontal and passing through the body, driven backwards and forwards by 2 respective mechanisms:

9b. In the upper part of the machine's body, the piston (the top piston of the 2) (55): a) has at its rear tip, the one facing the wire, four folding-unfolding reverse needles, pyramidal-wise at their unfolded position (56), similar to those described for approach to a horizontal wire (8b. above), and b) has a mechanical arrangement to slightly revolve horizontally (radially) to the left and to the right so that it can diverge a little from pointing to the wire as needed, while the body of the machine remains at a stable upright position (6) in front of the wire (41).

9c. In the lower part of the body, the lower piston (42) has at its rear tip, similarly to the wall-adherence case (upper part, 4b. above), a small receptacle (43) with: a) a quantity of glue material, b) a heating device for the glue (46), and c) a mechanism for a small drop of the glue to flow out under pressure from an orifice in the lower end of the receptacle (44') and into a slim, horizontal, bored-through needle (44). The needle disposes a) a washer at its rear end (54), holed at its center, folded to a right angle at its vertical diameter (with the angle facing the vertical wire (41), in order to sort of embrace it), its edge being parallel to the wire (cf 5a. above), b) a heating device for the needle (47), and c) a heating device for the washer (47'). [note: in FIG. 15, the washer (54) is shown turned by 90° for better understanding of the mechanics]

9d. To hook onto and cling to the wire, the machine, in floating mode, performs a series of moves and arrangements: a) it extends the top piston (55) backwards and revolves it slightly to one side, for example to the left, so that while moved backwards, towards the wire (in the next phase), the hook stays clear of the wire, b) flies a short horizontal distance backwards, roughly towards the wire, so that the hook at the tip of the piston passes clear of the wire, on its left in this example, till the needles' tips themselves arrive past the wire too, (a fact detected by a distance-measuring sensor), c) performs a short horizontal flight (transversal for the machine), to the right in this example, towards the wire, to touch it with the hook stem (52) (a fact detected by another sensor, peri-piston-stem-wise one, similar to the one described in the previous case in 8c. above) d) performs a short horizontal flight forwards, away from the wire, hooking-wise, till one or 2 of the reverse needles (56) hook deep onto the wire, up to the piston-to-needles articulation, and the fact is detected by another sensor.

9e. At that moment, the machine being from now on in captive flight due to the wire being hooked, from the lower part of the machine the lower piston (42) is also driven backwards, so that the folded washer's angle edge (54) comes to contact with the wire (41), parallel to it. Subsequently, a) the heaters (46, 47) warm the receptacle (with glue material in it) and the needle, b) a drop of warm glue is squeezed through the orifice of the receptacle (44') into the bored-through needle (44) and further to the washer's hole (54), it spreads between the washer's vertical edge and the vertical wire (41), it cools there instantly and solidifies (cf 4f.C. above).

9f. After that, the motor stops flight, the wings (10, 11) fold (49), the 2 pistons (52, 55) retract as much as possible (the same length between them), and the machine stays immobile, clinging to the wire.

9g. In order to hold firm the weight of the machine, while it being "hung" in a way from the glued point at the lower piston's needle tip (54) (the other support, the upper piston's hook (53), being simply a tension rod), the compound fixture of the lower piston and needle (42, 44), a cantilever in essence, is sturdy enough to withstand the bending moment at every point of its composite length (cf 4d. above), and particularly: a) at the base of the needle (44'), where the cross section of the needle is expected to withstand the local bending moment: the total weight of the machine (body, mechanisms, and accessories) times the length of the needle (44), and b) at the supporting point of the piston (the rear side of the body) (42'), it being in its extended position, where its cross section is expected to withstand the local bending moment: the total weight of the machine times the composite length of the piston extension plus the needle ((42, 44).

9h. To unhook and leave the place, after the mission is completed, a twofold action takes place (cf 4g. and 8e. above) concerning the two pistons (55, 42): a) The two support pistons (55, 42) extend a bit forwards (away from the wire), till attaining their regular operational length, the body of the machine finds itself at a convenient distance from the wire, the 4 wings unfold to their regular extended horizontal position (10, 11), and the motor starts flight in floating mode, remaining captive due to the upper piston staying hooked onto the wire, b) the heating device (47') at the tip of the lower piston's needle heats the washer and (additionally) the needle, so that the glue warms and mollifies, and the lower piston (42) retracts to its normal (idle) position, c) the machine moves slightly towards the wire until the tips of the oblique reverse needles find themselves past the wire (53), then the top piston (55) radially revolves slightly to the left (in this example) so that the hook is free to retract clear of the wire, d) finally the drone flies away free, the top piston (55) turns back to the right to its normal position at the rear of the body, and the two pistons (top and lower) (55, 42) retract in from their extended (backward) positions to their idle positions close to the body.

9i. Alternatively to the B, C and D parts above, for an instantaneous disengagement/departure, the 2 following actions take place at the same moment: a) the rear tip of the lower piston (42'), firmly bound to the machine, detaches from the compound outfit [glue receptacle-needle-washer] (43, 44, 54), leaving it in place, eventually together with a small charge for self-destruction, and b) the machine's body detaches from the top piston (55) and the hook (52) at its tip, as described. Then the drone flies away, subsequently retracting to normal position the top piston (55).

9j. An alternative mechanical arrangement is feasible concerning the support of the four inverse needles (56) on the hook's tip, to provide for instantaneous unhooking: Each needle is articulated to the piston, free to revolve, from the inverse inclined (hooking) position at an angle of 45° to the hook's stem (52), to a position on the extension of the stem, by turning by an angle of 135° (56'). In this way the four needles in their new position constitute a straight continuation of the piston (55) and hook stem (52), and the disengagement becomes easy: there is no need to resort to the radial horizontal revolving of the top piston (55) as described previously (9h.C. above), nor is need to abandon the piston-hook fixture for an instantaneous disengagement like in the previous horizontal-wire-adherence case (8f. above).

9k. The instantaneous unhooking arrangement just described (9j. above) can also be adopted in the previous case of disengaging from horizontal-wire adherence (8e. above).

10 Notice on 4., 8. and 9. above:

10a. The processes of approaching/adhering to horizontal and vertical wires (8. and 9. above respectively) are applicable for adhering to every object, horizontal or vertical, with an accordingly small cross section.

10b. A multi-mission version of the machine is possible, adaptable for adherence to a wall of a building (and to a corner, for that reason) and to a wire, be it horizontal or vertical, if the need arises. The version disposes: a) a mechanism for transferring the compound fixture [piston-receptacle-needle] to the upper rear part of the body (for wall and corner) or to the lower one (for wire), as needed for the mission in sight (the piston getting pulled out of its guide-tube, transferred, and retracted into the guide-tube in the new position) (42, 55, etc.), b) an articulation on the needle's tip, permitting to bring an angled washer (for corner and wire) or a flat one (for wall) in front of the holed needle (45, 54), c) a mechanism similar to the above a one for transferring the piston-and-hook rig from the upper rear part of the body (for vertical wire, the body being in vertical mode) to the point guiding the piston through the gravity centre of the whole machine (for horizontal wire, the body being in horizontal mode) (42, 59, etc.), d) and the regular two pistons (48) (or legs, as the preference goes) at the lower part (for wall and corner of a building), everything so arranged as not to interfere (either idle on in active phase) with the transferring mechanism. Each one of the two piston-transferring mechanisms a and c, functions as a means to protract its piston all the way to the rear, out of the body, to transfer it to the new position, and to retract it into the waiting passing-through conduit-tube there.

11 Adhering to another drone, or an aircraft: This action is dealt with in the following (C6.4e. below), in the Applications chapter.

C5 Motor and Energy (Articles 1 to 4)

1 General:

Motion of the different parts of the machine is derived from the motor unit, the engine; it is transmitted by various mechanisms. The engine is fastened on the inside of the body, with ties elastic enough, absorbing vibrations, protecting the sensitive parts of the drone. Depending on drone size and on mission type, different engine types can be used but their suitability may vary widely.

2 Engine Types:

2a. Electric for district current, brushless, disposing a relay to reverse the motion up to twenty times per second (=2×10/1") to provide for the reciprocating motion of the wings, with a condenser in order to avoid thermal shocks and overheating. It is suitable for very small versions of the drone: it works silently and consumes lettle. Current is stored in a battery and/or in a condenser.

2b. Electric for district current, common type, suitable for a little larger versions. It is stronger and can stay in operation hours long, as long as the battery supplies current. Motion reversal to the wings is performed through a dedicated mechanism.

2c. Internal combustion 4-stroke gasoline or kerosine type, with a double muffler. Suitable for larger versions, flying close to the ground, whereby the surface effect assists horse power.

2d. Internal combustion two-stroke gasoline or diesel, separately lubricated, with a simple (even rudimentary) muffler. Suitable for large versions, flying high, in open-accessibility operation, where noise is not an issue, for long periods aloft, carrying plenty of fuel due to high consumption. Its high horse power to weight ratio is a criterion for choice. It is the type most commonly used in aeromodellism.

2e. Hybrid, in both small and large versions: the electric part (district-current type) offers a quiet flight, and the internal-combustion part is diesel type, revving at constant rpm for reliability in charging the electric one; the diesel's muffler engages when in proximity to humans and facilities, and has an electric device embedded (with air side-input) which makes for complete burning of exhaust gases and, so, for minimal optical trail.

3 Mechanics:

3a. Internal combustion engines work around their optimum rpm range, with a bespoke set of gears for transmitting to mechanisms/actuators. The muffler makes for increased consumption, but on the other hand it reduces the noise produced and can reduce the thermal track of the engine.

3b. Castor oil and/or bio-oil can replace regular fuel in accordingly arranged engines. Vibrations are reduced if a 2-cylinder engine replaces a monocylinder one of same displacement, or counterbalancing weights are fixed onto the crankshaft (unfortunately, adding to weight).

3d. In an internal combustion engine, double conversion of a piston's reciprocating motion to circular (in the crankshaft), and back to reciprocating for the wings, is detrimental to the horse power finally being transmitted to the wings; for this reason a mechanism is annexed (replacing a normal transmission) to the common 2-stroke engine or, preferably, to a modified Sterling-type one, transmitting reciprocatively with pistons throughout to the wings (which are considered as $3^{rd}$-type levers.

3e. A small jet engine of very low thrust, available in the niche commerce, can also replace a common 2-stroke engine: its plus, the high thrust to weight ratio, its minus, high consumption. Instead of using thrust from combustion gas, or a rear (or a bypass) propeller, the rotation of the main shaft transmits to pistons, pushers and actuators to produce the reciprocating motion of the wings.

4 Further Engine Possibilities:

4a. Electric, for district current produced from energy transmitted wirelessly from the ground, received by an annexed rectenna; transmission may also come from another drone, for instance in the case of collaborating (serially positioned) successive machines, highlighted in the hereafter detailed applications Penetration (C6.3. below) and Local GPS (C6.5i. below). It is suitable for long-duration staying and operation at inaccessible places and for long-duration flight of the machine, in a light version. No battery is needed as a principle, but one can be of use in case of intermittent energy transmission, for inconspicuousness, in which case the (large, as needed) rectenna folds out of sight during the idle times.

4b. Electric, for district current produced from photovoltaic cells, which can be installed far from the machine, out of sight. A battery is needed for operation during overcast and night times (no battery if no operation at these times). Similarly to the previous case, suitable for long-duration staying or flying.

4c. Electric, for district current originating in piezoelectric cells, sonoluminescent ones, etc., additional to the units 2a. and 2b. above, as an auxiliary source economising in storage of electricity, in case a) said units are not voluminous, and b) there is plenty of the resource (vibrations, noise) on-site.

4d. Batteries are lithium ions or similar type due to high charge to weight ratio; they are the version enduring vibrations, UV light, rain, and are capable of high numbers of recharges. On both the inside and out of the machine's body, every part and every appendage of suitable chemistry can contribute to storage of electricity as a condenser, even the support layer of the photovoltaic cells.

C6 Applications (articles 1 to 6)

1 General:

1a. The following description of applications highlights the functionality and the usefulness of the machine. Among these applications, several are already being carried out by existing types of drones, but the sought requirements (A3. above) are not fully met; especially, the important condition of inconspicuousness (C1d. above) is not truly implemented. The present machine though offers an added value through the suitability of its inherent capacities for these applications. It is its packet of specifications concerning construction and flight, and most of all its very low observability.

1b. These aside, on the other hand, some other of the applications are becoming feasible solely based on the existence of the present machine. In some of them, one machine operates unaccompanied, in some others many machines operate in coordination; but in all of them, the intrinsic qualities of the machine makes it exceptional in performing them.

1c. It can rightly be said that the present machine is exclusively suitable for executing said applications, since practically no other drone (or other flying unit for that matter) is up to coping with the situations met during their execution. Its AI unit can cope with complex situations, perform work at perfection, and conduct functions thanks to its analytic and computational capabilities; its mission-specific attachments and tools also can meet every requirement: conditions, precision, time. And conversely, the applications described in the following are in a sense exclusively executable at perfection by the present machine.

2 Triangulation:

2a. Triangulation has regularly been performed in 2-dimensional space, on a horizontal plane, for instance for locating the origin of a sound, a clatter, an electromagnetic signal (data transmission, video signal, etc), or some other technologically localisable signal or phenomenon, whereby three machines suffice, positioned in three points, the triangulating points, lying on said plane, the best configuration being to have them located at the angles of an equilateral triangle. By such triangulation, the point of origin of a sound, for instance, is determined on an upright line situated at distances (from the three triangulating points) observing three relations between them; this means any point on this line, but not a unique point (or even two points, symmetrical to each other by means of the three-point plane).

2b. To locate with certainty a unique point, four triangulating points are needed, not belonging to the same plane all four of them. Their best configuration is for them to lie at the four apexes of a regular tetrahedron; in reality, also putting detecting devices close to (not exactly at) the four apexes of a regular tetrahedron produces satisfying triangulation results (regardless, the correct term would be "tetrangulation"). Triangulating from four points thus arranged gives highest certainty for detecting places lying inside the tetrahedron's expanse, even extending the range of localisable places with satisfying certainty to distances outside the virtual tetrahedron, distances attaining 5 times the mean edge of the tetrahedron.

2c. The present machine can serve as triangulation point while being least observable. Four of them can perform a satisfying triangulation session, remaining (quite) unseen, and instantly locating a sound, a signal, in the environs: either a) staying in four fixed points defining a regular tetrahedron, or b) flying all four of them in floating mode, forming a regular airborne tetrahedron, or c) staying 1 or more of them in fixed points and the others flying in floating mode, the four of them lying at the apexes of a more or less regular tetrahedron, or d) finally flying in a formation approximating a regular tetrahedron, as when escorting a vehicle or a convoy.

2d. For instance, possible 4-point cases (having known points and seeking the rest) are: A) three known points on the ground, seeking the $4^{th}$ point in the air to install a drone, and B) 3 known points in the air, seeking a $4^{th}$ point higher in the air, and possibly a second candidate "$4^{th}$" point lower, either in the air or on the ground. C) Conversely, one known point (conveniently selected) on the ground, seeking three more points in the air, possibly one or two of them on the ground, and D) one known point in the air, seeking three points in the air and/or on the ground. E) two known point on the ground, seeking two more points in the air, possibly one of them on the ground, and conversely F) two known points in the air, seeking two more points in the air and/or on the ground G) two known points on the ground and one point overhead (either flying or at a fixed point) and seeking the $4^{th}$ point, and conversely H) one known point on the ground and two known points overhead, and conversely, two known points on the ground and 1 known point overhead, seeking the $4^{th}$ point I) one known point on the ground and another one in the air, either above it or farther afield, seeking two more points in the air and/or on the ground.

2e. The process of determining the four points A, B, C and D in 3D space to be occupied by drones (either flying aloft or clinging stationary on objects, as needed or as available) is done through thoroughly applying the following 8 geometric relationships:

[1] a tetrahedron has four facets (equilateral triangles); 4 apexes; and 6 straight edges, all 6 of them equal in length, e.g. length AB is equal to length BD;

[2] each combination (out of 3 in all) of 2 non-meeting edges (i.e. not converging to a common point, not having any common point) are vertical to one another in space, e.g. straight AB is vertical to straight CD;

[3] the length between the middle points of such a pair of non-meeting edges (e.g. K is AB's middle and L is CD's middle) is vertical to each one of these 2 edges and equals 0.7071 (the square root of 0.50, practically 0.70) times their common length: KL=AB×0.7071=CD×0.7071; e.g. if edges' length is 17 m their middles are distant by 12 m, if edges are 27 m the middles' distance is 19 m, and if edges are 41 m the middles' distance is 29 m; and inversely, starting with a known middles'-distance KL, edge length AB is inferred being equal to KL times 1.41 (the square root of 2, practically 1.40);

[4] each combination (out of four in all) of one of the apexes versus the remaining 3 means that the 3 points form an equilateral triangle and the fourth point lies on the vertical (to the triangle's plane) drawn from the centre of the triangle (i.e. the medians' meeting point) at a distance from this centre equal to edge length times 0.8165 (the square root of ⅔, practically 0.8); i.e. if N is the centre of the triangle ABC then DN=AB×0.8165, e.g. if AB=25 m then DN=20 m; and inversely, starting with D apex's known distance DN from triangle ABC's centre N, the triangle's side and the distances of D from the other three apexes equal DN times 1.225 (the square root of 3/2, practically 1.25); [5] the centre of the equilateral triangle (the facet) formed by any combination of three apexes is distant from any of these three points by 0.70 times its distance from the fourth apex, equal to the triangle's side times 0.577 (the square root of ⅓, practically 0.60); it is also distant from any of the three sides of the triangle (i.e., from any of the 3 middle points of the sides) by half that distance from the three points, that is 0.577/2=0.289 times the triangle's side; [6] in each one of the four equilateral triangular facets of the tetrahedron, e.g. in the triangle ABC, the median's length (from any angle-point to the middle of the opposite side), e.g. the distance of C from the middle K of the side AB, equals AB times 0.866 (the square root of 0.75, practically 0.85); otherwise said, it is the sum of the two distances 0.577 and 0.289 of the previous, fifth relationship; [7] the angle between two facets whichever of the tetrahedron is approximately 70° 30'; [8] the angle between an edge converging to an apex and a plane parallel to another edge converging to the same apex which plane passes from the edge non-meeting the second edge, is 45°; otherwise formulated, an envisioned edge's two tips also belong to two juxtaposed non-meeting edges respectively, designated first edge and second edge for this reason, and the plane passing from the first edge and parallel to the second edge is at an inclination of 45° to the envisioned edge; for example, edges AC and CD converge to apex C, and edges AB and CD don't meet; from edge AB we consider the plane parallel to edge CD; edge AC is oblique to this plane, at an angle of 45° to it, and the same stands for all the other edges converging to A or B, i.e. edges AD, BC and BD (i.e., all the edges except the juxtaposed 2 non-meeting edges of this example, AB and CD).

2f. Given a number (up to three) of detectors located at known points on the ground (or, depending on the case, having drones suitably equipped fly unobserved and settle on the chosen points on the ground), the rest of the (four in total) places are sought overhead, to install drones at: vertical posts, branches of trees, walls of buildings, even hanging from wires. In case there is no fixed object or surface at any such point overhead, a flying drone in floating mode is installed at the point, taking care to use flight commands and expert programming such as not to risk being carried away by the wind or by wind bursts; securing such effect is done through continuous adjustment (at a frequency not less than 10/1"), facilitated by installing on the ground several auxiliary (drones disposing) transmitters for the desired adjustment: three units in total are needed at fixed points on the ground, of which either one, two, or all three can rightly be drones for the intended triangulation, the remaining (if any) being auxiliary. In case a fixed object lies close to (but not exactly at) one (considerably convenient) of the selected overhead points, the other three points, either overhead or on the ground, may be slightly transferred to accommodate: the process starts again, considering the new points lying a little to the side of the originally selected ones, then performing anew the 4-point establishing procedure.

Figure 28:
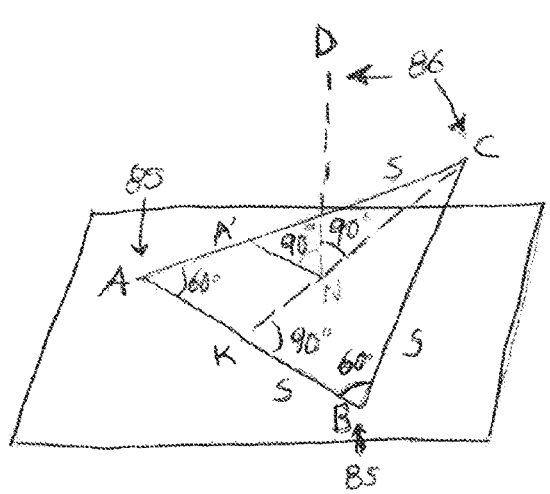
FIG. 28 is a Triangulation diagram: given 2 points on the ground, 2 more are sought in the air, at different heights, one by one.
Figure 29:
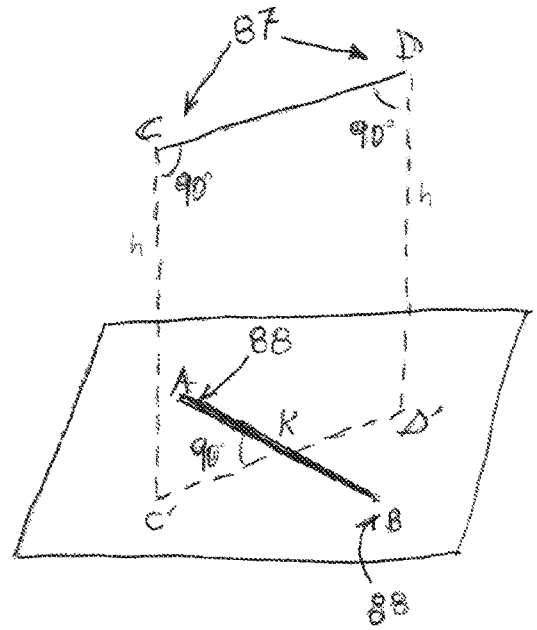
FIG. 29 is a Triangulation diagram: given 2 points in the air, 2 more are sought on the ground, simultaneously.
Figure 30:
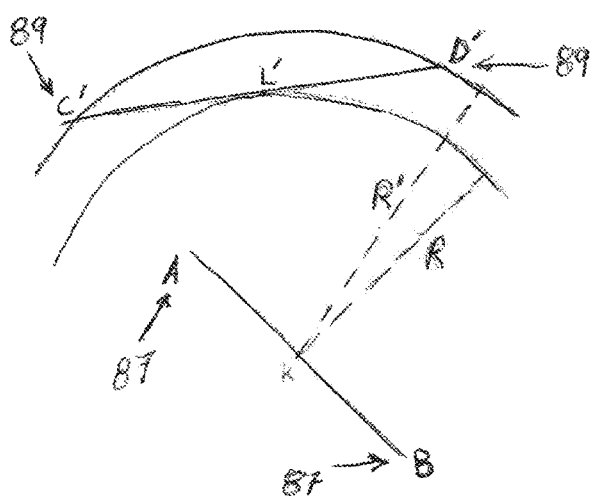
FIG. 30 is a Triangulation diagram: given 2 points in the air, 2 more are sought in the air and/or the ground, many candidate pairs being possible.
Figure 31:
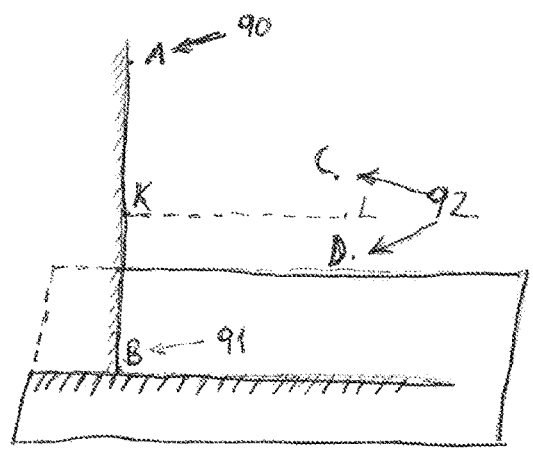
FIG. 31 is a Triangulation diagram: given one point in the air (e.g. on a wall) and one on the ground just below, 2 more are sought in the air simultaneously, disposed at median height.
Figure 32:
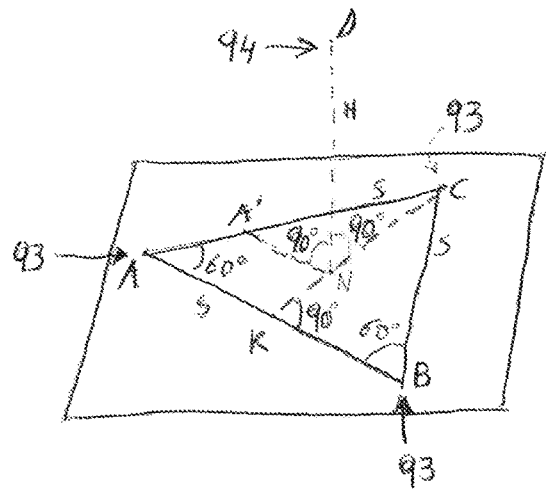
FIG. 32 is a Triangulation diagram: given 3 points on the ground, 1 is sought in the air.
Figure 33:
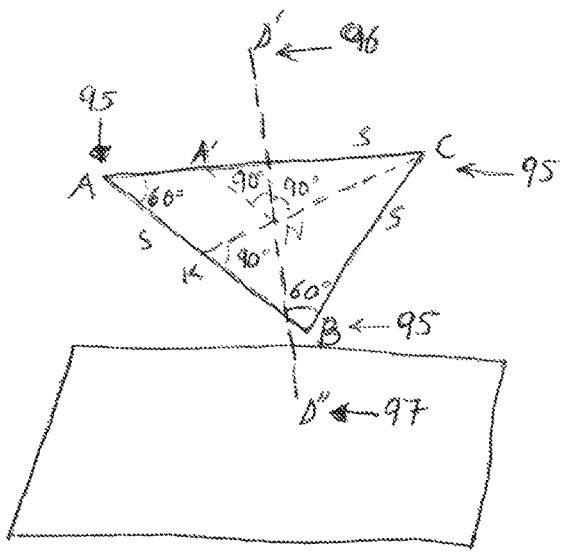
FIG. 33 is a Triangulation diagram: given 3 points in the air, 2 candidate "4$^{th}$s" are sought: one in the air higher, and one lower in the air or possibly on the ground.
Figure 34:
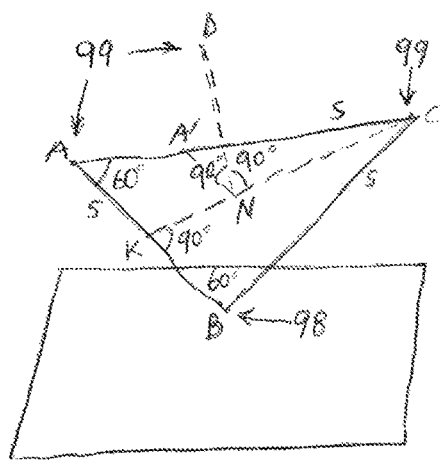
FIG. 34 is a Triangulation diagram: given 1 point on the ground, 3 more are sought in the air.
Figure 35:
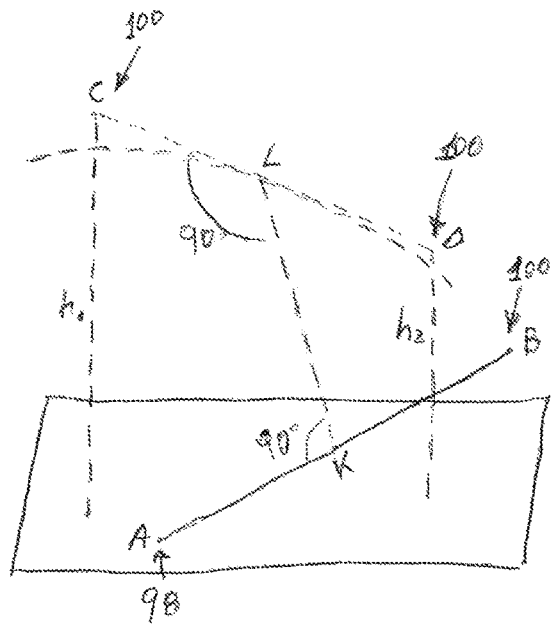
FIG. 35 is a Triangulation diagram: given 1 point on the ground, 3 more are sought in the air, many candidate combinations being possible.
Figure 36:
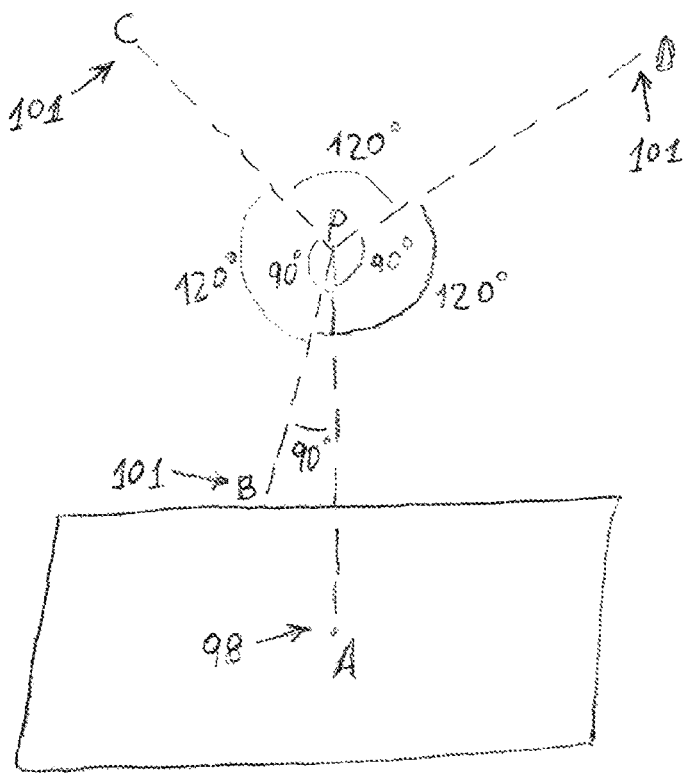
FIG. 36 is a Triangulation diagram: given 1 point on the ground, 3 more are sought in the air, simultaneously, disposed radially.
Figure 37:
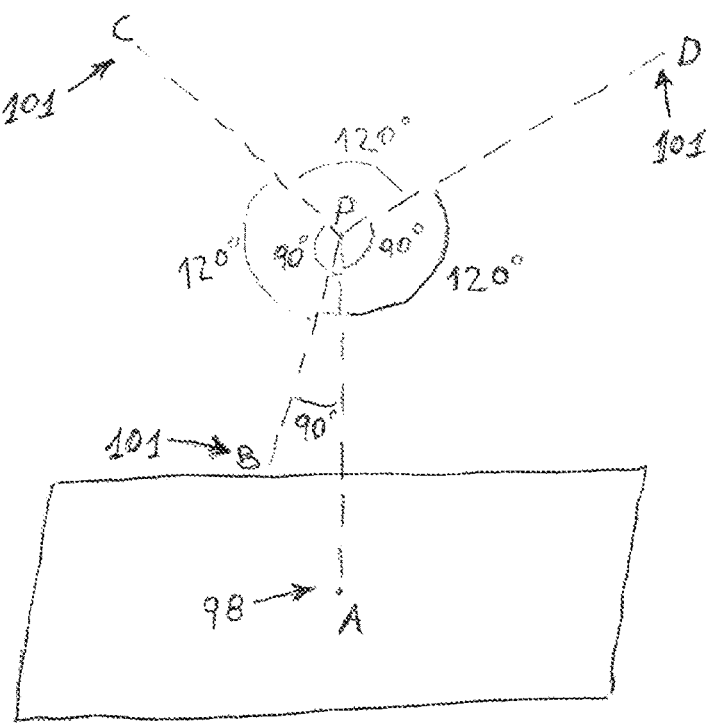
FIG. 37 is a Triangulation diagram: given one point in the air, three more points are sought in the air and/or on the ground, disposed radially, many candidate combinations being possible.

2g. Definition of the four places can be done in various ways, each one more fit for application depending on the case: there is from the beginning a varying number of given points (places) having already been selected on the ground or in the air for being suitable to install drones at, and it remains in each case to seek a further number of suitable points to complete the total of four. Each case makes use of one or more of the given geometrical relationships (2e. above). A number of cases are demonstratively put forth in the following twelve examples, and the relevant figure highlighting each case is cited: example 1: two points given on the ground, two points sought in the air, FIG. 26. Ex. 2: two points given on the ground, two sought in the air, FIG. 27. Ex. 3: two points given on the ground, two sought in the air, FIG. 28. Ex. 4: two points given in the air, 2 sought on the ground, FIG. 29. Ex. 5: two points given in the air, two sought in the air and/or on the ground, many candidate pairs, FIG. 30. Ex. 6: one point given in the air and one given on the ground, two sought in the air, FIG. 31. Ex. 7: three points given on the ground, one sought in the air, FIG. 32. Ex. 8: three points given in the air, two candidate $4^{th}$ apexes sought higher and lower, FIG. 33. Ex. 9: one point given on the ground, three sought in the air, FIG. 34. Ex. 10: one point given on the ground, three sought in the air, many candidate combinations, FIG. 35. Ex. 11: one point given on the ground, three sought in the air, FIG. 36. Ex. 12: one point given in the air, three sought in the air and/or on the ground, many candidate combinations, FIG. 37

2h. Example 1: Given two detectors (85) already being installed on the ground (or two drones suitably equipped, as above, approaching and settling on the chosen two points on the ground), two more points are sought overhead, to install drones at; an empirical process is put forth: Designating A the point close to the operator, located on the right side in this example, and B the one farther afield and on the left, we consider from A an imaginary (virtual) oblique line, ascending at a 45° angle from the horizontal (conforming to the eighth relationship, at 2e above), to the left in this example, to an imaginary point C, and from B another equally oblique one to the right, to imaginary point D, where AC and BD are (quite, by sight) equal to AB, and hopefully (quite, again) CD=AB. It is preferable, through experience on the field, to bring-consider AC a little towards the operator and to push-consider BD a little towards the depth of the field, so that CD be quite horizontal, quite vertical to AB, and at a height equal to AB×0.70 (the third relationship above), and the distance between straights AC and BD be quite equal to that height. The imaginary points C and D (86) are the places to install drones at, in order to proceed in triangulation: first, calibration takes place, then the system is ready to detect-triangulate. Based on the arithmetics above, if for instance the distance AB and possibly the (horizontal) imaginary straight CD are a little more then 40 m, then CD lies at height h, a little less than 30 m (around 40 times 0.70). If AB is just over 20m, then h is just short of 15 m. This is an on-the-field approximation; the correct numbers would be: 41 m, 29 m, 20.50 m and 14.50 m respectively, and can be brought to any scale.

2i. Example 2: Given two points A and B on the ground (85), the remaining two apexes C and D are to be defined in the air. From the middle point K of AB the vertical (imaginary) length KL is drawn equal to 0.70 times the length AB (the third relationship); at point L a horizontal (imaginary) length CD is drawn overhead, its direction being perpendicular to AB (again, the third relationship), with a length CD equal to AB (the first relationship), having the point L at its middle; points C and D are the 2 missing apexes (86). This method produces two apexes at the same height h overhead, to be found simultaneously.

2j. EXAMPLE 3: Given two points A and B on the ground (85), the remaining two apexes C and D are to be defined in the air (differently to the above examples 1 and 2). A suitable point C overhead is selected on a firm object (a wall, a tree, etc.) at a distance from the middle point K of AB equal to length AB times 0.85 (or slightly more, KC=AB×0.866, satisfying the sixth relationship above, especially if CK is perpendicular to AB), then the fourth point overhead is sought. From an imaginary point N of the length CK, at a distance NK equal to CK/3 (the second part of the fifth relationship), the imaginary vertical is drawn to the triangle ABC (and to its median CK) with a length ND=AB×0.80, or slightly more than this (ND=AB×08165, the fourth relationship); points C and D are the third and the fourth apexes sought. It is noted that this method produces 2 overhead apexes of unequal heights, of which one is located on a firm object already considered suitable from the start. It is noted that the triangle [ABC] is equilateral, which translates into A=B=C=60° and AB=BC=AC=s; verticality of ND to this triangle is secured by drawing the straight ND vertical both to AK and to NA', whereby the point A' belongs to AC and AA'=AC/3, which means that A'N and AB are parallel to each other.

2k. Example 4: Given two overhead points C and D (87), both at height h, suitable for drone installation, two more points are sought on the ground (case converse to preceding Examples above). The vertical projections of C and D on the ground being C' and D' respectively, the points A and B sought (88) must be so located as to have the straight AB cross at 90° the straight C'D' and their intersection be the middle point of both AB and C'D'; in this way the quadrilateral AC'BD' will be a square. In detail (for geometrical consideration only, not for on-the-field contemplation): We consider at the middle K of the length C'D' the horizontal median and on the 2 sides of the C'D' we define (on the median) points A and B such as the 4 straight sections KA, KB, KC', and KD' be equal. In reality, it is easy to appoint two points additional to the two projections so that the four points on the ground form a square. But in case the height of CD is not nearly equal to 0.70 times its length, the tetrahedron [ABCD] is not regular; if it is less, inevitably the points A and B lie on the ground, or the original points C and D can be shifted a little upwards; if it is more, at best the points A and B can be defined a little high above the ground, or even the original points C and D can be selected to be distant more than their original distance from one another.

21. Example 5: Given two points (or apexes, or drones) A and B in the air (87), two more points C and D are to be defined in the air or on the ground following the procedure of Example 2 above, but first comes a preliminary process to cover all potential couples of C and D. Given the middle point K of AB, an imaginary circle is drawn on the plane perpendicular to AB at K, having K as centre and a radius R equal to AB times 0.70 (the third relationship); now, following the procedure of Example 2, from a peripheral point whichever (designated as L') of the circle [K, R] a straight length C'D' equal to AB is drawn perpendicular to AB (tangential to the periphery), having L' as its middle point, and so, every possible couple of points C' and D' is candidate as the desired couple of apexes C and D to be defined. Alternatively, an imaginary circle is drawn on the same plane (perpendicular to AB at K), centred at K, its radius R' being equal to AB times 0.85 (the sixth relationship), and on its periphery every couple of points C' and D' distanced C'D'=AB is candidate as the desired C-and-D couple (89).

2m. Example 6: Given one point A high on a wall (90), suitable for a drone to adhere to, and one more point B on the ground just below (91), two more points are to be defined at median height, on objects (posts, trees etc.) spotted across a street. This case, the last of the here-presented cases with two given points and two sought, is a typical situation in the field and it is easy to grasp the particularities of its theory (geometry). From the middle point K of AB a horizontal length KL=AB×0.70 is idealised, leading to positions on the other side of the street, situated just opposite the pair of given positions and deemed strong candidates to host the two sought points C and D. From point L, two horizontal perpendiculars of equal length LC and LD are drawn on both sides of KL, such as kCD=AB; points C and D are the two sought points (92), apexes of the envisioned regular tetrahedron along with the two given points A and B. If suitable candidate positions for C and D can only be found at greater distance from K than the one described above, then point A is selected a little higher than originally, to accommodate; the horizontal KL, slightly longer now, is shifted a little higher accordingly, and the process defining C and D is done again. In the opposite case, candidate positions for points C and D only existing closer, then point A is selected a little lower accordingly, KL gets shorter and at lower height, and C-and-D-defining process is done anew. All this is about geometrical correctness, but also points slightly distant from a regular tetrahedron's theoretical apex positions will do quite well.

2n. Example 7: Given three points A, B and C on the ground (93), preferably forming an equilateral triangle, the $4^{th}$ point D is sought overhead. The equilaterality of triangle (ABC) is assured by either selecting points that create 60° angles between them, or points distanced equally between them in pairs (three pairs in total): distanced by the common length s of the 3 sides (similarly to the comment in Example 3). The desired point D (94) is situated above the centre of the triangle (the intersection of the triangle's three medians) at height H equal to 0.8165 (the square root of ⅔) times side length AB, practically H=0.80×AB (the fourth relationship): that is, from the medians' intersection the vertical is drawn and the point D lies on it at height 0.80×AB. In detail: K is the middle of AB, N lies on CK where NK=CK/3 (=CN/2), ND vertical to CN (and vertical to [ABC]) and ND=0.8165× AB. This consideration also helps in case the three points are situated overhead, at the same height in the air: the 3 drones installed at them may be clinging to objects/surfaces, or may fly in floating mode (immobile in the air) as strictly as possible, and a $4^{th}$ point D can always be determined above them, as described above. An extrapolation of this case, the three given points being in the air at differing heights whatever, is dealt with in the following Example 7. In the particular case of these three points positioned high enough in the air, higher than 0.80 times side length AB, a second "$4^{th}$" point can be determined below them: normally in the air, but especially on the ground if the 3 points are situated at height 0.8165×AB (cf Example 7 below).

2o. Example 8: Formulated conversely to the previous Example 7, given three points (or apexes, or drones) A, B and C in the air (95), a fourth point D is to be selected, either on the ground lower, or in the air higher than the triangle formed by the three points. The same procedure as in Example 6 is followed: The three given points should be so disposed in the air as to form an equilateral triangle or thereabouts; from the centre N of this triangle the perpendicular to the triangle's plane is drawn to both sides of this plane and on these two half-straights two lengths are measured, both equal to the triangle side's length times 0.8165 (or practically 0.80, the fourth relationship): one, length ND', upwards and the other, ND", downwards; the 2 points D' (96) and D" (97) are both suitable candidates to be the desired fourth apex D. In case the triangle ABC is located close enough to the ground, the point D" cannot be and only the (upper) point D' (96) is suitable to be the desired apex D.

2p. Example 9: Given one point B on the ground (98), the remaining three apexes A, C and D are to be defined in the air. An overhead point A is selected on a firm object (a wall, a tree, etc.) and the ensuing process is the same as in Example 3: first, from AB length's middle K a perpendicular (out of many candidate ones) to AB is drawn to a (possibly) suitable overhead point C on a firm object so that KC=AB× 0.85, then from a point K' of the median CK, such as K'K=K'C/2=CK/3, the vertical K'D to the triangle is drawn such as K'D=AB×0.80 (the fourth relationship); apexes A, C and D are the sought ones (99). Similar to the commentary in previous Example 5, a great number of B, C and D apex combinations are possible, depending on selection of B, an on inclination of KC.

2q. Example 10: Given one point A on the ground (98), the remaining three apexes B, C and D are to be defined in the air. A suitable overhead point B on a firm object is selected, and C and D are sought just like in Example 5: first, from AB length's middle point K a befittingly selected (out of many candidates) perpendicular to AB is drawn up to an overhead point L such as KL=0.70×AB (the third relationship), then a length CD perpendicular both to AB and to KL is drawn so that CD=AB and the point L be the middle of CD; apexes B, C and D are the sought ones (100). It is noted that, just like in Example 5 above, there exist a multitude of such perpendiculars; they are the radials of the circle [K, 0.70×AB] lying in the plane perpendicular to AB at K. And from the start, there is a great number of possible points B to begin with and determine the perpendicular plane and the radial of the circle.

2r Example 11: Given one point A on the ground (98), the remaining 3 apexes B, C and D are to be defined in the air. An imaginary (virtual) upright length AP is drawn from A upwards, of whatever length, and around point P, three points B, C and D are sought, all three of them being at the same height with P more or less, at distances from P equal to AP×0.70 (the fifth relationship) all 3 of them, and disposed radially round the point P at angles 120° between them (forming a horizontal triangle, the equilateral BCD); apexes B, C and D are the sought ones (101). That is, the operator spots three candidate points overhead, of equal heights, forming an equilateral triangle or quite, and the optimum case is, the triangle being at a height equal to its side times 0.8165 (or practically 0.80, the fourth relationship). In case convenient candidate positions exist higher than that, the drone earmarked for the point A on the ground can rise overhead to suitable height, flying in floating mode, or rather the equilateral triangle can be expanded horizontally, radially outwards, to accommodate, on condition that the operator spots other candidate points further afield. And if the initial point A on the ground is not just below the candidate triangle's center, the detecting unit (the present machine or any type of detector on the move) can move horizontally accordingly. Extrapolation of this Example's method is possible, seeking three points B, C and D in the air at different heights, forming an equilateral triangle from whose centre N the perpendicular to the triangle's plane passes from A, and such that AN=0.80×BC (the fourth relationship) or AB=BC (the first relationship).

2s. Example 12: Given a point (apex, drone) A in the air (102), three further points B, C and D are to be selected in the air or some of them on the ground: Normally, at most two of them on the ground; and exceptionally, all three of them, if the line to be drawn from A in the beginning is the vertical drawn downwards. This is the converse case to the previous Example 11—extrapolation; its procedure is followed, extrapolated to random inclinations: An imaginary length whatever AP is drawn from A, either vertical (upwards or downwards, the converse case to previous Example 11—basic) or disposed at random inclination and orientation, and at P the plane perpendicular to AP is visualised; on this plane, every possible combination of envisioned points B', C' and D', 0.70×AP distant from P, forming any of a multitude of homocentric equilateral triangles (the centre of the triangle being P, the concrete variables being triangle size and triangle's orientation on the plane), are candidate to be defined as the desired points B, C and D (102). Now, the many perpendicular planes, and relevant quantity of such triangles, whatever the length, inclination, and orientation of AP, apply for such candidacy, as long as the operator can perceive points having such geometry and being suitable for drones to hold/adhere on.

2t. In case 4 drones accompany a running vehicle or a convoy, security-wise for an eventual triangulation session, one of them can attend at some distance behind and at a certain height overhead, flying almost unseen, and the other three fly higher in triangular formation, all four of them hopefully forming a regular tetrahedron in transit. Upon detecting a sound, an intense defuse, or other detectable phenomenon, the four drones stop flying, stay immobile in the air, and perform the triangulation. Subsequently four reserve drones, flying in formation higher, fly lower and enter service in tetrahedral formation, replacing the original four drones. A mechanical prerequisite is for the motor units of the drones to be strong enough to be able to escort at traffic speeds.

2u. In the previous case of drones escorting a vehicle, additional provision can be made for eventually detecting a phenomenon originating in another vehicle inside the traffic: two sets of four-drone triangulators are assigned, one to stop upon detection, as above, the other one keeping on flying with the escorted vehicle (and similarly triangulating).

3 Penetration:

3a. A sequence of drones is put in service for collecting information and video from otherwise inaccessible places and transmitting them back from drone to drone in succession in inconspicuous ways, otherwise impossible due to modern detection technology, ultimately to inform headquarters behind the lines. The drones remain least observable while flying to approach, while being inertly adherent to their respective places, and during the phase of their disengagement; and they are undetectable while transmitting, thanks to strategically occupying positions and to inconspicuously operating.

3b. With this method, the operator's virtual presence in inaccessible places is met with success. Every drone in this sequence can transmit (secondarily) commands to the next one in front and (primarily) audiovisual 3D to the next one behind: either footage from its environment, disposing a specially equipped camera or 2 such cameras front and rear (or using two cameras on two distinct drones for 3D shooting of a wider scenery), or footage received from the next drone in front. The machines can receive and transmit signals, information and audiovisual using antennae with narrow transmission/reception angles. Transmission is split into multiple coded channels and use is made of proprietary spread-spectrum software; (but the technology is widely used and can be detected, hence) also the following optical method is adopted.

3c. Transmission is translated to optical signals in compressed, spaced out packets interspersed with irregular idle moments, jumping from infrared channels to UV ones (offering a greater bandwidth) and inversely from UV to infrared, in frequencies: a) both quite close to optical ones in order to be readily reflected on mirrors, and b) far from the optical frequencies in order to remain undetectable. Standards to abide by are maser/UV-laser frequencies, compression, and angle narrowness.

3d. Each and every drone in the sequence disposes a flat mirror (61) with a small device to micro-adjust its angle of incidence (once the drone is installed in position), such as to have the two beams, one towards the drone behind (62) and one towards the drone in front (63), be symmetrical to one another by means of the vertical (64) to the mirror's plane (61); in other words, the plane defined by the two beams (162, 63) is vertical to the mirror's plane (61), and also the bisector (64) of the angle they form is vertical to the mirror's plane (61).

3e. Each machine assists with the installation of the next one in front and, next, is serviceable in detecting the drone behind and the one in front in order to calibrate the position of its own mirror, and in arranging the antennae; then the particular drone is ready for operation. Successive transmissions cause some loss of signal strength, so amplifiers are annexed to drones at due intervals.

3f. Disengagement of the drones takes place after a mission finishes in order to withdraw from their places, starting from the one most in front; each one is helped in this task by the one just behind, optically and by RC: control of the environment and immediate flight back, one by one in succession back to the drone most behind, up to complete withdrawal of the sequence of drones towards secure premises. In case one drone can not disengage, withdrawal of the rest continues as normal and the particular drone either disengages later at an opportune moment, or uses the inborne charge to self-demolish.

3h. A variation to the described process is to have a mother drone release in flight the daughter machines (cf 5a. below) one by one in succession not far from the place each is meant to adhere to and work at (cf 5h. below), and at the end draw near again to collect them one by one (cf 5g.A3. below) and fly away.

4. Solitary:

4a. One machine of the present type can inconspicuously perform work which is impossible to execute inconspicuously while using flying machines of existing types. Operation can be done in 2 ways: a) by direct RC, executing video survey for reconnaissance etc. b) as the most in front unit in a succession of drones in the previous case (3. above).

4b. The machine, flying over an inaccessible place with plain visibility, e.g. a hill's top in the middle of dense flora, and carrying a specific, small apparatus to land onto the place, a) can let it fall on the place in such a way that an eventual_observer only spots a flying bird letting excrement fall, or b) can land smoothly (cf C4.2. above) in order to leave the apparatus on site and then fly off, in such a way that an eventual observer only spots a bird either landing to take a short rest or letting heavy prey fall.

4c. It can also land and, making use of a telecontrolled arm, grasp firmly an object (formerly put there in awaiting state) and fly off without leaving time to an eventual observer to realise that it was not a predatory bird snatching at food; particularly if the object is covered with variation material in the intention to deceive, with specific appendages lending the appearance of a small bird or a fallen prey. The machines are graded, and their motor units too, according to the weight they can bear (cf C1.4d. above): starting from a few grams, up to a couple of kilograms or more.

4d. In a way of last boundary crossed, the machine can operate underwater (cf C4.3d. above): starting with approaching flight in the air towards water surface in acute angle and deceleration (cf C4.3a. above), and going on flapping the wings underwater for control, offering the appearance of a bird lowering to snatch food, while performing work, caring for: fishing policies, oceanography, environmental or other purposes, a) sailing either at the bottom, anchored in a place, or b) just under the surface, either carried away by a current or captive to a tie (cf C3.15. above).

4e. In the air, the machine can either fly high and serve as an airborne relay and exchange point with good visibility for television and mobile telephony, or fly low and carry a small, undetectable, short-range detecting apparatus for local transmissions, the only flying-unit solution suited for such tasks.

Besides, It performs aerobatics (acrobatics in flight) of a novel kind, or flies for demonstration, for advertisement, and for professional purposes (inconspicuous, in private): surveying, town planning, GIS, transfer of medicines, mail, etc. —It is also in position to play an out-and-out role by approaching/adhering to an incoming drone or to a larger aircraft, under the guise of either a destroyer (anti-drone unit), or a last-chance saviour in case of utmost emergency: The machine flies unobservable towards the anticipated course of the incoming unit which approaches at a comparatively high speed, and keeps flying in this same course ahead of the incomer, at its own comparatively low speed, until the incoming drone/aircraft catches up; the machine disposes telescopic, flexible legs extending backwards, towards the incoming flying unit (making for a smooth impact with the incomer), and magnets and glue (or whatever other adhering material) attached on the back side of the body, ready at the moment of impact to secure adherence onto the incomer, in order to carry through the operator's intentions: A. either establish/maintain a close acoustic/electronic watch through the drone's/aircraft's metallic or plastic skin (a particular case of the airborne-relay role cited above), B. or demolish (having inconspicuously kept flying on the exact course of a motor of the incomer and having adhered to it) making use of a small inborne explosive charge (C1.3a.B. above) whose detonator (electronic and sensitive to acceleration) fires off at the moment of the impact due to the huge acceleration it undergoes. (Alternatively, at an opportune moment just prior to impact, a command is given for firing off the charge).

4f. A quite similar capability is that of tagging an object or a vehicle (67) with a small transmitting device (RFID type or other, with flexible legs and magnets like in the previous article, 4e. above) or with a drop of a liquid (66) radiating at a specific frequency, to subsequently monitor the vehicle's progression or the object's transfer, while flying at a safe distance, unobserved. Putting in place the liquid drop can be done in various ways: A. either injecting or insufflating it from close enough at a controlled angle, Blaunching with a piston, C. or letting the drop fall from to the vehicle's top from very low height. The insufflating procedure is enacted in 3 steps: D. The drop (or droplet for that reason) of polyethylene glycol, with a small percentage of a substance radiating at a known frequency and another percentage of plastic glue resin, is enclosed in a protecting membrane which either encompasses it at the moment it exits the launching device, or prior to this, inside it. E Drops are stored, either as such or in a raw liquid form (in bulk), in a hopper-form container cupped from above, holed at its narrow end below, sitting on a small horizontal barrel, behind which a short piping system with a safety valve and further back a small metal pressurised cylinder containing compressed gas (common air) are disposed; on pulling a trigger, a drop is fed from the hopper to the barrel, the valve opens, and air under pressure launches the drop through the barrel, aiming at the object to be tagged (66). F. At contact (violent due to falling from a height) onto an object or the roof of a car (67), even onto a put-on hood or the hair on a person's head, given the instance, the membrane breaks and comes off and the drop(let) spreads unobserved (67). Terminating the operation can be done as follows: in the case of a sticking drop of radiating substance, radiation either ceases with time, deactivated through vaporation or absorption, or is discontinued through beaming a specific ray onto it; in case of an RFID-type device, a deactivating signal is sent, or a self-demolition command.

4g Various technologies recently (most importantly, Oculur Rift) come to help veterans in the psychological terrain so they can get over their metatraumatic disorders (functional, mental, stress, anxiety, phobia: PTMD, PTSD etc.) through the use of devices facilitating their virtual presence in battlefields (either long-past, recollected, or famous historic ones) under controlled conditions (sort of exposure therapy), with digital representations and scenery, with avatar characters, under expert medical supervision, whereas:

The present machine flies literally to assist psychotherapy, tailored to and differing between conditions, indulging with immersion, creating empathy, certainly in parallel with drug therapy, offering a value added in such circumstances of augmented_reality: no need of virtual scenery and avatars in bringing the patient to live anew the conditions prevailing in past battlefields, since the machine can fly and manoeuver inside real scenery (jungle, derelict towns, stranded ships, etc.) and their comrades can play roles in it. —The patient can see and hear through the microphone and the camera of the machine (or through 2 fish-eye cameras of 180° each front and rear, or more ones on the perimeter, zooming for circular covering) and can be seen and heard through the amplified earpiece and the screen annexed onto the machine (or a larger screen if needed). —He can even intervene, in ways afforded by the technology, in real circumstances, or in digital scenery, of augmented reality. The machine offers the advantage of getting close to various scenes without being given attention prior to intervening.

4h The machine can be used in a similar way in various cases:

in gaming, thanks to its AI capabilities and special flying abilities: bird-like flying units manoeuver in natural scenery or in one set up for the needs of the game, representing the gamers. —To oversee/control natural environments, keep a watch on herds, logging off and recording events, protection from poachers, and plenty of other, similar cases where the presence of such flying apparatus does not affect the flow of events. In such a case, using special sounds can serve a good purpose: the machine records various single sounds from the environment through a tele-microphone, makes use of a sound processing programme and of archives of sounds, works in processing the whole and reproduces the modified sounds (either through loudspeakers previously scattered and hidden in the environment, or) from its inborne loudspeaker, at irregular repetition rates and intensities, under audiovisual supervision from the base, dodging poachers, taking care not to arouse excessively the attention of wrongdoers (or they may go for extermination or just capture of such a novel "living" specimen). —To induce a controlled advance-avalanche on a snow-covered mountain slope, through generating a loud sound or a detonation, for the safety of skiers: in the same way a flying bird causes an avalanche by screaming. —To help detect noxious fumes and gaseous leak concentrations as well as microparticles suspended in the air in quarries, fracking works, landfills and other problematic situations and sceneries, while flying inconspicuously in the background a laser or lidar beam is shot towards a suspect space or a questionable works surface, which beam reflects back, lessened in intensity by the percentage absorbed by said material or gas; the effect is detected by a sensor and measured by the AI unit with suitable devices. 4i It also renders service in fire detection and warning, as well as in fire surveying, in close team operation with the supervisor/operator, based at headquarters, who also supervises a host of other machines similarly operating elsewhere (they make use of cloud computing, disposing a virtual cloud for the moments they cannot attend multiple emergency calls, simultaneously coming from different areas); it flies high over villages, expanses of land, forests (for fear of forest fires and arsons), hills and massifs, making use of thermals for repeated high and low hovering; it first makes some reconnaissance work (initial aerial scan-like work to archive potential hot spots), then carries out an ensuing regular inspection (passing from the same places every 10 or 15 min and transmitting a video signal to headquarters or to a patrolling vehicle) for tracking down any eventual appearance of smoke, fire, explosion etc.; it describes a raster scan fully covering land under inspection, i.e. in a rectangular to-and-fro flight pattern, and safely following the ground's relief from a height as dealt with previously (C3.16. above), with assistance from GPS; taking advantage from the fact that a "bird's" innocuous presence aloft does not provoke.

The machine flies on automatic, describing said raster scan. It disposes:

2 cameras, optical-light one and infrared, fully RC-able, with stabilisation and strong focus-while-filming, highly sensitive sensors, burst shooting to save on bandwidth, the normal one having 3D configuration;

a highly potent tele-microphone; an electronic sensor to detect e-m busts;

a piece of software for pattern and signal recognition; and an archive of hot spots (registered in the past), of other potential hazards in the area inspected, and of their nature: chimneys are candidate points in the winter, just questionable in other times. The idea is to create a perceived safety map of the area, with the double scope to easily spot points of emergency and (helped by pattern recognition SW) to safely exclude false alarms: an animal's motion, noise from rustle of leaves-branches, etc. As soon as a genuine warm spot shows up, (a hot spot in reality, but the notion of "hot" dilutes to "warm", due to the distance), a preliminary alarm goes off: The machine heads towards the spot, at the same time warning the operator at the base and reverting to RC, as stated earlier (C1.5a. above); the camera zooms in on the spot which remains in focus during this combined approaching and zooming process. Alarm often proves false at close inspection, e.g. when hot solar light reflects off a discarded bottle or a piece of glass (but the camera has to get close to certify) and then (the light) tarnishes when the machine randomly manoeuvres out of the reflected rays; in such a case: —the operator gives a command to revert to automatic flight, to continue as normal on the programmed route from the point where the incident sparked alarm, courtesy of the GPS connection, and —the position of the false-alarm object enters the machine's memory so that no other alarm comes out from it. If the alarm proves genuine and there is an open, steady flame or smoke with sparks (appearing warm in the camera's sensor from a distance, but turning up hot from close), identification of the fire scene takes place, meaning to measure/take in account: A. the temperature at moments from afar while the machine approaches to the point, B. the duration of the outburst and the valuation of its regularity, and to infer from the degree of its (un)steady/growing character; identification sounds positive if these exceed a set threshold: e.g., 200° C., a number of seconds, rapid spreading of burning area, not a chimney fire (a said-first suggestion, to be revaluated). The high temperatures prevailing compel the use of a metallic material for the wings' leaves (cf C2.16d. above, and C11.4. below). In such a case the identified scene proves dangerous; further alarm goes off to firefighting headquarters, and photos of the wider area are taken for localisation of eventual arsonists; command is set off to other drones patrolling elsewhere to converge to the area for more elaborate checking and at the same time the last 15-minute video shooting (which is always stored before being erased, conforming to regulation) is recalled from the signal storage, for the operator to track down an eventual suspect move that had previously eluded attention.

5. Collective:

5a. A number of machines of the present type (designated as subsidiary or daughter drones/machines) can be programmed for and brought to collective operation, in so-called collective flight mode (cf C2.1a. above), where the value of the units operating in team exceeds their collective value as units; the applications described here can only be performed to perfection by these machines, thanks to their expert programming and to the special mechanical/digital capabilities they display; the inconspicuousness of the flying units also helps the applications along.

5b A number of daughter machines exit a mother unit, their base, get in flying formation, and perform work collectively. The base is: —either a building (premises either on the ground or underground), —a vehicle of any size/character, specially equipped additionally to its usual tasks, —a sea vessel (a ship or a submarine in surfacing phase) equipped for this as an annexed task; the base can even be a torpedo, specially equipped for this task, getting close to the target and, prior to executing, releasing underwater a small number of machines, which manoeuver to stabilise themselves (cf C4.3b. above) and to head towards the surface, ultimately to get airborne as cited earlier (C4.31 above),—or a flying unit: an airplane, a helicopter, or even a drone of the present type to spread out a group of daughter drones, smaller ones The latter is the basic idea of this article: a drone deploying and recalling mini-drones, both operating automatically and guided through RC by the operator in headquarters.

5c. The case of subsidiary (or daughter) drones swarming out from a mother_drone is detailed in the following. It bears similarities with the other cases and offers inferences as to the circumstances in implementing them. Drones team-fly on one hand, automatically, keeping constant distances between them, moving in the same direction as their, say, five closest drones, trying not to get left behind and not to get too squashed up, and on the other hand they fly executing a programme, flying in formation while making team manoeuvers, resembling a flock of birds (or a small swarm of bees), 3-dimensional in the air, changing at will (following commands from the operator, or as the programmed flight goes) their flight formation, density (i.e. distances) and aspect of movement, even group-navigating around obstacles, safely. Commands are either automatic for the whole flight, loaded down to each one of the group, —or come from one drone playing the role of a central unit (to be replaced by another drone in case of malfunction), —or originate in the mother drone, or even in the base (in headquarters).

5d. The drones dispose each one their AI unit, sensors for distances and other constants and parameters, antennae and transmission devices, mission-specific equipment, and an external appearance befitting the mission. During their transport in the interior of the mother drone, the drones are prepared so as not to risk from its manoeuvers: safely/automatically tied up, lined-up in rows, with the wings folded up and the electronics switched off so as not to affect the mother drone's ones.

5e. Drones' exit for deployment out of the mother drone is effected in its (horizontal) lower part (68), in the drones warehouse or hatchway:

A The drones warehouse disposes a horizontal, rectangular gate, which has two articulating hinges running along its front side (71) and its rear side (72) respectively, with hinge-safety-pins locking and unlocking on command, to secure the fastening of the gate onto the (horizontal) floor of the drones warehouse, in 3 case-specific modes:

either fastening at both the two sides of the gate, front and rear: the gate being securely closed, this being the normal mode for the gate of the mother drone during flight, or only fastening at the front side: the rear hinge being unlocked, the gate being free to revolve downwards round the front hinge, and the opening facing backward, for the drones' exit from the mother drone, or finally, only fastening at the rear side: the front hinge being unlocked, the gate being free to revolve downwards round the rear hinge, and the opening facing forward, for the drones' retrieval back to the mother drone.

B The gate opens by revolving downwards round its front hinge (73), the opening facing backward, while the mother drone continues flight on its route (80), at moderate speed anyway, since the downward-open gate (70) constitutes a hindrance and generates resistance from the air at the mother drone's underside.

C The drones get untied and automatically draw near the gate's edge (69), and then fall out of the mother drone through the opening (75), taking care to set adequate distances between them, in order for them not to get entangled with one another.

D Each drone on its turn, falling in the air (75), unfolds the 4 wings and performs redressing manoeuvres (76), assisted in this by the 6-axis i.s., as detailed in the foregoing (C3.13b. above); after restoring horizontality and getting into flight formation (77), the "flock" of bird-like drones are ready to operate.

5f. Safety in communicating between them, as well as their protection, are secured by transmitting through narrow beams (optical and others) to and from a central unit, attending to all drones headquarter-wise (the base, the mother drone, a particular drone among them, or a satellite overhead), which unit alternates in accordance with mission's needs or due to technical problems (malfunctions etc.).

5g. Getting back to the mother drone's hatchway (68) is done as follows (in case the drones are not bound to self-destroy on finishing their mission): The flight in formation is cancelled, and the drones enter the mother drone in one of 2 ways:

A Either gradually, one by one:

A1. The above described horizontal, rectangular gate (5e. above) opens by revolving downwards round its rear hinge (72), the opening facing forward this time, in a manner acting as a scoop, while the mother drone continues its flight (80) (with care, though, at low speed, since the aerodynamic consequences of the opening facing forward while speeding can prove disastrous both for the machine's stability and for the innards' safekeeping, in the drones-warehouse).

A2. The group of daughter drones range themselves (69) in parallel longitudinal rows of equal height while flying on the mother drone's route, adequately distanced between them, at the exact anticipated height of the incoming gate (70') (just a little higher than its free leading edge), at a speed lower than the mother drone's one.

A3. Eventually each drone (78) on its turn is met by the (faster moving) gate-"scoop" at the lower part of the mother drone, it folds up its 4 wings as detailed in the foregoing (C4.1e. above) and slips up along the gate's length (79) and into the drones warehouse, where it gets automatically tied down to the floor in the places originally prepared to accept drones, and its motor ceases turning.

B. Instantly, in orderly:

B1. the mother drone heads towards the drones (80) which group together and fly at low speed awaiting their being taken in (69), B2. a net or a specially made scoop (82) unfurls (81) under the underbelly of the mother drone and expands to adequate width, as to embrace a number of drone spaces across, B3. the mother drone enters a course just above the route of the drones (68), B4. flying drones are overrun by faster-flying mother drone, are swept in flying mode, and fall in the net/scoop (83).

B5. drones fold rapidly their wings (84), stop their motors, and are pushed by their momentum up and into the drones warehouse (68), as the net/scoop retracts up, where they are automatically tied down.

5h. A variation on the process of drones-mother drone application is detailed here: a) mother drone nears the area to be surveyed, releases in flight 2 daughter drones, and retreats in the surroundings; the pair manoeuvres high enough not to be identified, interwinding in flight in the way of courting one another, 3D-motion shooting in the way, unobserved; in the end, the mother drone hurries to collect them as though a predator seizes prey, and flies away; or b) the mother drone releases a sole surveying drone (shooting images or doing otherwise as programmed) and at the end collects it back and flies away; or, finally c) the mother drone releases the subsidiary ones in succession in the Penetration application described in the foregoing (3a. above): one by one in flight, close to the places they are each meant to adhere to and work at; at the end, they disengage and fly around, and the mother drone approaches, gets them in, one by one as described previously (5g.A3. above), and flies away.

5i. An important application of the collective flight of drones is the local geopositioning system, designated as local GPS, covering smaller or larger expanses of land, independent of the established ones such as GPS, GLONAS, Iridium, the european one EGNUS and more, but still compatible with at least one of them. The importance of such a positioning system, with local character, unaffectable from high-calibre positioning-system-owners' disposition to restrict_accuracy during unsteady international situations, is obvious; plus, the ability of the drones to remain quite unobservable, non-existent for entities other than the owners/managers of the system. Ownership and/or use of it can be reserved for the administration or for private schemes, depending on local jurisdiction.

5j The machines are carried in group inside a mother drone and released to fly in the area to be GPS-serviced (or they take off from HQ facilities or from a vehicle or a sea vessel, as also stated in the foregoing (5b. above);

they are specially equipped with electronics and programmed for the job;

they are positioned in the air at the determined exchange/relay points of the local network, distributed in compliance with a rectangular-raster system of points, all at the same height (on a horizontal plane);

they are fine-tuned according to calculations/transmissions based on one or more of the established systems cited above, specifically in times of peace;

they either stay in long-time flight thanks to appropriate technologies supplying energy (C5.4a. and 4b. above), or fly consuming electricity or combustibles, and on exhaustion they come down one by one to land while other reserve machines lying in wait take off to replace; but they can also rely on the mother drone (or some other flying entity) flying-patrolling, to draw near in flight and refuel them one by one. The same mother drone can collect back the machines on conclusion of mission or they can disengage and land independently.

5k. A twofold provision is taken care of for flying at a steady point aloft:

Relaying apparatuses are installed in the ground in a rectangular-raster steady-points system, with their respective two-axis co-ordinates certified through the established systems cited above; distanced by five to seven kilometers on the two axes; these apparatuses help the present machines to be installed at the correct points in the air when replacing a landing one of the system, as already stated (5i. above), or when taking off anew after having landed due to bad weather, even all of them together. (In such conditions, no need to use the established systems cited above to certify positions in the air). —The position of each one of the machines is controlled with adequate frequency, around 10/sec (10 sec$^{-1}$), in order not to let them be carried away by winds, and reinstating commands are given automatically or transmitted from the central unit.

5l. Another application in which the machines are disposed in a rectangular raster of points in the air, this time on a vertical plane, is that of constituting a vertical "wall" of anti-aircraft apparatuses, whereby the machines-plane is disposed perpendicular to the course of the incoming threat. One or more machines are at or near the anticipated point(s) where the aircraft motor(s)' route crosses the machines-plane; these gather automatically close to that point/those points; each one disposes a small charge with detonation system setting off from an accelerometer. A machine met speedily by a motor of the incoming aircraft undergoes a huge acceleration which fires off the charge and demolishes the target (but other fire-off ways also exist).

6. Flying in Captivity:

6a. Machines flying in captive mode (cf C3. 3. and 15. above) may be considered as non-aircraft, depending on local jurisdiction. Consequently, flight regulations being in power in these countries are less strict, and a wider range of applications can be performed in the private sector. Depending on regulations, in some cases the tie is not required to endure forces of tension against a strong wind, so a simple fiber suffices, useful to transmit data; data transmission through the tying element safeguards against interferences and makes for indetectable operation.

6b Some cases of flight in captivity are, for instance, when: A. The machine flies in floating mode, or in a steadily circular route for commercial or professional purposes with full control from the ground, e.g. GIS, land-surveying, an airborne meteorological station, a relaying video transmitter. B. the machine escorts a sea vessel (a ship, a surfacing submarine) and deploys aloft, tethered to the vessel and following at a short distance behind, performing surveying work and indetectably transmitting data through the tie, unobservably flying among the habitual multitude of birds overflying vessels; an eventual optical control from afar can not spot it, especially if it describes an elaborately curved course among the birds, automatic or RC-ed; (similarly, drones taking off from car roofs to hover and get a clear view of ground ahead); operation of the motor is discontinued at moments, suspending thermal trait production, taking advantage from the ascending thermal produced astern of the vessel; or the motor is continuously running on and off, just for securing said curved course, since the pulling force through the wire secures forward flight.

6c In case the machine is to escort a surfacing submarine, it takes off from the vessel at the moment of surfacing, from a bespoke hatchway in the upper part of the vessel, opening for release at the moment of surfacing; conversely, the wire reels in, the drone withdraws and retracts to the hatchway, and the opening locks up watertight. The captive drone can be in operation in the air with the submarine either on surface or underneath, lower than at periscope depth, in which case the periscope is out of use and the sole means at hand for surface surveying is the drone: inconspicuously performing better-than-usual work as virtual periscope, an augmented-reality periscope in reality, due to its height of flight, hence the attained (huge) range of surveillance.

C7 Equipment (Articles 1 to 4)

1. Management of Equipment:

1a. The mechanisms and dependencies necessary for functioning of the machine and for performing work are secured in their places through fastening on the inside and attaching on the outside of the body of the machine respectively, and measures are taken against interference between them, be it mechanic, magnetic, or electric.

1b On attaching/removing different elements attention is paid to the centre of gravity of the machine as a whole, to remain practically in the same vertical line at every moment: the place of this centre is rectified and controlled through slightly, appropriately moving the place of one or more elements, or by way of using counterbalancing weights.

concerning the category of tiny drones (C1.4a. above), the equipment includes very few items, mainly means securing inconspicuousness and a small camera.

1c. Several of the elements in the following articles may be either attached to the machine on permanent basis, functioning with it while flying (or not functioning at all, just being transported), or temporarily, just while flying to approach and while in adherence on a place, thereafter to be disengaged from the machine and deposited to the place in order to perform there, self-contained.

1d. The AI unit is sealed up with thermosetting materials (cf C10.2. below) against breach, mechanically ensuring the secrecy of the device.

1e. The following inventory highlights the internal and external items which, including the body, constitute the machine; in no case all of them are present or used at the same time, for the same mission;

2. Inventory of the equipment:

2a. motor, mechanisms transmitting energy, and items necessary for this: motion, stability and the internal functions, as cited in the foregoing chapters, 2b. means for managing energy: photovoltaic cells, battery, condenser, fuel tank, rectenna for wirelessly receiving energy, 2c. means for signalling:

lamp(s) and flash(es) for optical signals, colouring, branding mark, means generating radio signals, straight or coded: for marking-the-presence/identification/asking for permission-of-flight (concerning the class of the flying machine, the flight programme, and asking permission or acknowledging prohibition of overflight, respectively), means generating specific sound sequences for managing animal herds in the wild, means generating laser and/or lidar beams for detection of concentrations in the air (noxious gases and microparticles/dust), means for signal amplification because of distance or of multiple relaying, 2d. means for self-protection, for low observability, and for camouflage, which are detailed in the following chapters on protection and inconspicuousness (C8. and C9. below), 2e. wings and electronics for flight: wings as already detailed (C2. above) with borders, leaves, over-fibers, under-fibers etc., (potentially with piezoelectric leaves and generator), mechanisms for moving wings, wing appendages, bird's-like "beak", for alternating horizontal-vertical modes, for changing distances of wings' support points A, AI unit, software, AI unit-to-actuators robotic unit, wiring to sensors and actuators complete with fuses, 6-axis inertial system, 2f. Detectors of: —position and distancing of key parts of the AI unit and of the machine (by way of attesting non-interference on the machine from a third party), and —adequate bending and opening of sample wing leaves, and their adequate reaching to the underfibers at the end of the up-motion of the wings (by way of attesting non-decrease of elasticity concerning the material of the leaves), and time counters of operation under full light (discarding nights, cloudy times, or in shadows), —sufficiency or depletion of: fuel, electric charge, glue for adhering, water for self-showering/wiping, 2g. Audiovisuals and communications means: cameras (optical, 3D capable, strongly zooming, telecontrollable) and infrared camera (both with stabilised lens), means for data (de)compression, small "black box" for audiovisuals etc. (a box specially made to withstand shocks, fire, water etc.), gyro-stabiliser of the machine for additional video stability, headphone, microphone, screen, mirror with micro-adjusting system, and antennae, radio/video transmission system, system amplifying the transmission at certain distances, 2h. Sensors: compass, inclinometer, chronometer, acidometer of air, magnetometer, air thermometer, infrared telethermometer, anemometer for windshear/for vertical and radial wind, compound volt-ammeter, barometer, and intensitometer for reflected laser or lidar beams, and the six-axis i.s. (inertia system).

2i. sensors functioning underwater: hydrometer (for speed of current), depth gauge, 2j. tracking instruments, measuring tools: GPS or another established positioning system, radar and/or ultrasound means for measuring height of flight, distance of obstacles and detection of form, for avoidance/circumnavigation (e.g. horizontal wires), or for approach/adherence (e.g. corner of building), for measuring distance/speed/course of incoming flying unit (head-on or oblique), for tracking fellow-drones in collective flight mode (distance keeping, formation-flying).

2k (concerning large machines) radiometer, alpha/beta/gamma ray detectors, magneto-telluro-meter, ionisation meter, 2l. Tools for adhering to places/objects: —(for a machine in vertical mode) a horizontal piston and its 2 mechanisms, A) to move it between its 2 positions, upper and lower, and B) to move it backwards and forwards through the body of the machine when at its lower position, with a small recipient for glue on its tip, a heating element for the glue, and a mechanism exerting pressure on a drop of glue to pass backwards through a bored-through needle, a bored-through needle protruding from the lower part of the recipient, with two washers at its tip, a flat and an angled ones, with a mechanism to bring any one of them right on the axis of the needle on demand, with three resistors around them (needle and two washers respectively) for heating each one independently, —another horizontal piston, in the upper part, and the mechanism to move it (and also to move the previous piston, when at its upper position) backwards and forwards through the body of the machine, with a short hook-like fixture at its tip having four reverse oblique needles round its stem, in the form of a quadrilateral pyramid, with a mechanism to move the 4 needles by 135° towards the prolongation of the stem, on the piston's axis, with a peri-piston-stem-wise contact-sensor (cf C4.9d.C. above), with a mechanism to move it, the machine being in horizontal mode, towards coinciding with the vertical line passing through the machine's centre of gravity, 2m elements for supporting the machine: two horizontal legs at the lower part and backwards, three upright telescopic legs to the ground, 2n. Tools for performing work: remote-controlled pair of arms with extensions, e.g.: apprehending parts, screw-driving, winding, cutting parts, launching means for tagging drop/arrow/fired element, gate actuators (for exit/deployment of subsidiary drones), scoop actuators (for their withdrawal), and 2o. sundry others: mechanism for showering sensors and lenses (against collecting dust sediment), warm-blowers and/or wipers on sensors/lenses to remove rain drops (and said showering), captive machine's tie reel with pulling mechanism (actuated both from the machine and from the base), etc.

3. Internally, the AI unit coordinates, works together with, and caters for:

3a. the memory, a cooler, accelerometer and 6-axis I.s. (inertial system), (potentially) the piezoelectrics for the wings' leaves, commanding automatically or by R.C. (remote control) upon the wings, the audiovisuals and the attachments, —positioning system, (de)coder of signals, amplifier of signals (weakened due to multiple relays), signalling the machine's ID, reception/acknowledgement of permission to overfly, detection of and coping with interference from third parties (revocable at will), etc., 3b Self-destruction command to either microcharges' detonators and/or overheating resistors in key parts of both the AI unit and the machine as a whole, in case detectors track down changed positions/distances of said parts, and —(for certain missions) protection to coded degrees from rays and radiation of various categories.

4. Externally, similarly: antennae, beaming devices, photovoltaic cells, the mirror's actuators and micro-adjuster, and actuators for legs, for audiovisuals, for wings: both for flying and for (un)folding, and actuators for adhering elements.

C8 Protection (Articles 1 to 3)

1. In case of a machine with one of the dimensions being large, the external skin of the body has (along the length of this dimension) one or, better, more (successive) discontinuity joints protecting from lightnings.

2. The machine disposes a small explosive charge at a key point, detonating to self-demolition on command as soon as a danger for the secrecy of the unit is detected either automatically or by RC, or rather several charges, smaller ones, at key points of the machine, their detonation command and procedure being as furtive as possible (electronically), —whereas, if required for the mission, the charge detonates and, self-demolition put aside, also destroys any target happening to be at close range (cf C6.4e.B. above). Prior to detonation, electric charge transmitted to plastic or paper-made elements disforms or burns them up, for further ensuring the secrecy of the device.

3. The body of the machine and the attachments are made from non-magnetic material so that it is not trapped when close to magnets or current-carrying wires (cf C4.8d. above). In case a coil is used as electromagnet at the upper rear piston's tip for adhering onto a ferrous material (C4.6c. above), the coil does not have any magnetic effect when not charged with a current.

C9. Inconspicuousness (Articles 1 to 5).

Inconspicuousness, or low observability, is effected by following various methods of flight and using different technologies:

1. The machine flies following a route in low height, or —it flies taking advantage from ascending thermals, giving economy in consumption and avoidance of thermal footprint; thermals are either detected from the machine itself in far infrared, or information comes from another flying unit, from satellite systems, etc.

2. For stealth flight, the external attachments are kept (in non-operating phase) inside port-holes, behind gates of flat design, and the body of the machine has flat external facets, with neat dihedrals between them; it is a passive method. the technology of invisible cloak also helps, an active method, but it consumes electricity (a low consumption, though, thanks to the small-to-tiny size of the machine).

3. For low observability, external appendages with fitting appearance (and possibly motion) procure similarity to a living flying unit: a bird, due to its size; or a super-large insect, because the machine disposes four wings. On large-size machines, short down-like appendages glued at their front end on the perimeter of the wings and undulating free at their rear (or rather real bird's down glued on instead), and longer, feather-like ones fittingly glued on their tip, contribute in this issue; made of material and having a texture such as to present very little resistance to the air while the wings move up and down. Better still, they present a certain delay in their downward-inclination during the wing's up-motion, due to resistance to the air: a passive action; whereas in the down-motion, for a real-life effect, some active (with a mechanism) precedence in the downward-inclination of the tip feathers, at the start of the motion, is welcome. (This inclination holds until a short moment short of the end of the down-motion of the wing, and starts again, passive this time as cited above, with the up-motion of the wing). The mechanism waiting on the long feathers at the tip opens them radially, fanwise, at the last moment of the up-motion, and keeps them so fanned for a short moment at the start of the down-motion, for best effect. On small-size machines, the elasticity of the appendages makes them incline downwards during the up-motion and upwards during the down-motion, and this suffices.

4. A beak-form appendage at the front part of the machine, changing inclination on converting horizontal-to-vertical mode of the machine and vice-versa (C1.2b. above), can carry a camera and move on 2 dimensions. The rear part of this beak, in the form of a head, as well as the whole body of the machine, is covered with down-like appendages, similar to those on the wings (3. above). On the other hand, two of the telescopic upright legs of the machine (C4.2b. above) have the appearance of bird's legs.

5. Finally, keeping distances from installations, buildings, objects, houses and specific objects, as demanded by regulations in various countries, is also positive for inconspicuousness and low observability due the distance.

C10. Software (Articles 1 to 4)

1. Each machine has its own AI unit and several software programmes it works with, mission-specific ones, from the list detailed in the following. A number of them are available in the market, while others are or will be written specifically for functions and missions of the machine. Attention is paid in order to keep the hardware units safe from vibrations and shocks.

2. Solid state units (secure against vibrations1) with sufficient backup are preferable to hard discs for storage and general operation. Small weight-volume is a must; novel units available in the market are preferable to special editions lacking the time to become truly functional and bug-free; e.g., ARM units for hardware and raspberry pi for robotics, for the time being, and new emerging systems, in time. Solid state storage units are secured: coded (cryptographically) and sealed with two layers of different thermo-setting polymers (any one of the two deteriorates upon efforts from a third party to get over this one or the other); if an error occurs in working time, the machine returns automatically to the base and their replacement is provided; and if a third party's intervention is detected, the printed circuits are heated to demolition.

3. For saving on weight, circuits printed on paper or plastic foil, and storage (of data and software, coded) on such, can be used in very small machines instead of the usual circuits and the storage basis described above; bespoke devices for digital procedures on such ultralight circuits-and-storage basis are provided, and its programmed combustion destroys circuits and storage in case a third party's intervention is detected. Alternatively, the machine is let fall onto a water volume (cistern, lake, canal, etc.), submerge and sink down, and the ultralight circuits-and-storage basis deteriorates, being of specific composition for undergoing such an effect.

4. Categories and different items of software are:

4a. Software for functioning of the AI unit:

Operating system.

Measuring the degree of decrease of elasticity of the material of the wings' leaves.

Controlling distances of key parts of the AI unit and of the machine as a whole (in order to attest non-interference on the machine from a third party), and —giving command for self-demolition in case of interference: by overheating through resistors, or through detonating microcharges at these key parts, or just instantly erasing the solid state storage units, "007"-style: by sending a high-voltage charge from the power supply (i.e., from the condenser, instantaneously discharging) into the chip, destroying it and erasing everything. —Making secure compressed backup (in a small "black box") of all the data transmitted and of the information concerning the internal functions of the machine during the last time period prior to erasing it, a period of set duration. —Making use of the proprietary internet cloud for uploading the emergency calls (from flying fire-detecting units or from other cases of emergency) in case the operator cannot simultaneously handle overmuch incoming ones.

4b. Software for communications—Expecting a signal to start operation and to pause motionless. —(De)coding and (de)compression of sent/received signals and data. —Signalling the category of the machine to an oncoming flying unit; asking (by sending further signals) for class identification of the oncomer; and assessing the answering signal in order to proceed accordingly: either evading an eventual collision, or escaping. —Similarly: signalling the category of the machine, and the character of the flight programme standing; asking for permission to overfly or just approach a facility, a sensitive place, or an expanse of land; and the answering signal of either permission, restriction or interdiction, to further proceed as needed or as demanded.

4c. Software for operational commands: —Monitoring the functioning duration of parts of the machine, and the duration of external influences; and alarming as soon as previously set thresholds are exceeded. —Deploying/folding back the photovoltaic cells, and managing the energy received. —Measuring the quantity of dust collected on sensors/lenses, and activating showering thereof and/or warm-air blowing thereon when thresholds are exceeded. —Measuring the quantity of remaining fuel, battery charge, self-showering water, and glue for adherence; and, when there is only little compared to set standards, alarming for decision-making, either by programme or on RC.

4d. Software for commands of flight and manoeuvres: —Managing the moment-before-synchronisation (m.b.s.) effect (C3.2c. above), in which the first moment of the down-motion of a diametrically opposed pair of wings overlaps the last moment of the down-motion of the other wings-pair (to mitigate inertia and decreased lift force at these moments). —Controlling the course of flight, the accelerations and the turns by the use of the six-axis i.s., assisted in this by the gyroscopic stabiliser of the machine. (There is another stabilising system, embedded in every camera lens this one). —Determining start and termination of flight in ascent/descent (for reaching a concrete position in the air), and control of distance from fixed points during floating flight mode, by means optical, ultrasound, and electronic, assisted by GPS. —Detection and measurement of wind gusts ahead, and of winds as such: longitudinal, windshear, vertical. —Detection of ascending thermals ahead in the far infrared, selecting, granting priority to one of them among several existing ahead, approach, and flying a circular route inside the thermal to gain height (passively). —Restoring balance/horizontality in flight, assisted by the 6-axis i.s.: exit from a stall or from a spin, and coping with a sudden windshear gust, or with a blow. —Adopting a low-flight escape following the ground relief, assisted by the GPS (by comparing the watched-over relief with that in storage), and collectively flying either in RC-ed or programmed flight-formation or suite of formations, keeping steady reference to neighboring machines in flight: distance, orientation, azimuth. —Detecting/locating a desired place/object, approaching with controlled deceleration, contacting and cace-specific adhering procedure, as described in the foregoing (C4. above), then folding the wings and putting the motor on pause. —Disengaging procedure from adherence, programmed flight away, and keeping inconspicuousness distances. —Detecting/locating/circumventing an obstacle; in detail: Approach up to a preset distance, following a preset procedure of detour, flight near and around it (at a steady height, or otherwise), and preset resuming-course procedure: either on the initial course (after describing a semi-circular detour around the obstacle), or on a new course, unoccupied after the detour (after describing a quarter-circular detour). —Observance of standing local regulations, stored in the AI unit, updatable at intervals or in proximity of sensitive places: priority of flight for units flying at the same height (taking in account the unit's importance and other factors), TCAS-wise for small units/drones; also (proposed): flight on air lanes either horizontal or parallel to the ground, rotating to the right or to the left (in conformity with regulations-to-be) just as flight height increases, keeping in each lane a fixed orientation/height (either from sea level or from the ground). —Command to subsidiary drones for exit and retrieval, for collective flight; command to open/close gates and to unfold/fold back the retrieval scoop; or executing said commands received from the base. —Executing a watching procedure upon a tagged target-object or vehicle, while flying at a preset distance from it. —Unreeling and reeling back a mission-specific length of a tie (rope, wire, or fibre) for captive flight, commanding from the machine (which only is of importance here). —Flight to converge with the route of another flying unit. —Automatic return to the base (either at a fixed point or moving around) after a mission is terminated (and no signal for return is received) and in case contact with the base is disrupted: either in low flight or at steady height right to base, as programmed.

4e Software for commands and moves in performing work: —Defining up to four points for triangulation and installing as many drones at these, at the four apexes of an imaginary, airborne, regular tetrahedron: approach, floating mode, adherence if there is a fixed object nearby; finally, the four drones being ready to execute "tetr-"(tri-)angulation coordinated by an operator from the base. —Trialling micro-adjustments to optimise the attached mirror's inclination for the optical transmission between the drone behind and the next drone in front, as described in the Penetration article (C6.3e. above); detection of changes, and corrective micro-adjustments; additionally, a radio or video transmission system towards the successive drones on both sides (back and forth) is available, amplified at places as needed, tailored in narrow beam and discontinued at "random" moments (based on a programme) for secrecy. —Commanding the electromechanical unit for robotic moves of the RC-ed pair of external arms and their extensions (catching, turning, launching, etc.). —Managing the basic camera(s) front and/or rear and accompanying microphone, telemicrophone, headphone, screen (along with a second, annexed, larger screen if needed). —Selecting video frames/suites/data, by figure or pattern recognition and sorting, to isolate desired forms/patterns and to transmit to base; storing the selected parts, using the "black box" (4a. above) for this, and deleting the rest in order to save both on transmission time and storage space; —Storing and using gaming software, in-putting the machine's own capabilities. —Using proprietary drone-capable editions of existing technology, e.g. Oculus Rift, for augmented reality-wise presence of a person (other than the operator) in faraway places and in various sceneries (for treating veterans' PTMD, for gaming, etc.). —Generating sounds/detonations for controlled snow avalanches in mountain slopes, and generating optical/laser/lidar beams, measuring the reflected intensities, and computing concentration of noxious substances in the air. —Tagging a target object or vehicle: Placing/implanting/insufflating/launching a trailable signalling device or piece (drop) of material.

C11 Construction (Articles 1 to 4)

1. Parts and accessories are either made of transparent material (unseen/untreceable in flight) by 3D printing or extrusion, from thermosetting polymers, or of duraluminium (non-brittle, of special consistency), with a small cross section; inclusion of high-resistance fibers the length of plastic parts reinforces them (cf C2.8e. above): fibers laid in specific patterns prior to material infusion, interconnected for maximum strength. Alternatively, acidified/carbonated paper (highly porous) is suitable for use in frame parts and serve as a capacitor; and highly compressed paper, structurally sound, can meet specific requirements in flight and in operation. The quality of the materials and the meticulous work to put them together make for a machine inconspicuous in flight, hardships-resistant (rain, heat, vibrations, dust, wind gusts, etc.), and finely able to perform difficult assignments/missions.

2. Parts with a rectilinear form, either plastic or metallic ones, exerting push (sustaining a compressive force) have a cross section suitable to withstand flexion: either cross-form ("+"), angular ("L"), or circular ("o"), but circulars, the best of the three as far as mechanical resistance is concerned, collect humidity and need inspection at times. As for the parts exerting pull (sustaining tension), they are from plastic material or fibre, non-elastic, with a cross section considerably (e.g., three times) greater than the mechanically necessary, for safety. In each eventual bolt-and-nut place, two plastic washers with elasticity are each placed under the bolt head and the nut, to resist vibrations and damage from a fall; and at the circumference of the bolt, an elastic peripheral foil-wise material resists alike.

3. The external skin of the body of the machine has a rectangular (possibly square) cross section, and is made of: —either one-piece compressed polypropylene foam, its thickness being reinforced in places, zones-wise, for supporting elements of equipment from the inside or in the outside, —thin aluminium sheet reinforced at zones with extruded aluminium of angular cross section either through welding at points or through riveting a points, the points zigzagging on double line, —material suitable to function as a condenser, its thickness again reinforced at zones, —or similarly reinforced compressed paper, qualified for yielding the least possible trail to radar and other detecting technologies (Ceramics, equally stealth-qualified, is not a candidate in this list of materials since the machine is prone to fall or to bump horizontally onto places in unsuccessful procedures to approach and adhere to). The materials listed can be mixed at places, so that the body of the machine presents the best possible compound capability: to withstand physical hardships, to perform assignments, and to remain and fly inconspicuously.

4. The leaves of the wings' leaf elements are, as a rule, made of a plastic and transparent material not warping under the heat from solar light.

With time the material fails in plasticity and cracks in lines not regularly parallel to its support line on the wing's border, so being ineffective in repeatedly bending and coming back as the wing moves up and down in succession; the fact is detected (cf C10.4a. and C7.2f. above) and a signal is sent to base for replacement of leaves (procedure of maintenance, C12. below). Exceptionally, the material of the leaves is metallic and the support line of each leaf is a revolving articulation in case of operation in fire detection and surveying (C6.4j. above) as well as in case of operating in a corrosive environment or under intense radiation, as cited in the foregoing (C2.16d. above).

C12 Maintenance (Articles 1 to 4)

1. The plastic material regularly used in the wings' leaves depolymerises and cracks with time under UV solar rays and rain, and fail in resisting pushing-up air during the down-motion of the wings. The fact is detected as cited previously (C11.4. above) and replacement signal is sent to base, but also at fixed time intervals the same decision is made, for the leaves and other expendables, for safety reasons. Criteria for the duration of these intervals for replacement of expendables are:

2. The amount of hours that each machine has operated in full solar light, for the leaves; time in shadow, in overcast conditions, or at night does not count. —The similar time amount under solar rays, and time amount of functioning at work, for sensitive parts of the machine. —Consumption of various materials: fuel, glue, water for self-showering, etc. —Depletion of charge of battery and/or condenser. When criteria are met, with the help of chronometers and adequacy sensors, the machine flies back to base for maintenance.

3. Elements to be replaced in the machines are all the plastics (wings/attachments): —The elements of the wings: the perimeter (the p-borders as a whole), the borders (both the passing-through transversal ones, in one piece each, and the longitudinal ones in pieces), the leaves, the over-fibers, the under-fibers and the legs supporting the latter. —The appendages giving the machine and especially the wings the appearance of a living flyer. —Everything plastic in the inside of the body and the plastic attachments around it.

4. Given both the importance of assignments that this machine is called to perform, and the fact that it flies at a height above people and properties, control of construction and operation takes place at intervals and is compulsory, similar in procedure to that already taking place for the existing drones. Control is done:

In the laboratory: review of the AI unit, tests of resistance of the materials under mechanical stress, and judging the time and the exactness of the responses to commands.

In open space, real flight conditions, evaluation of the reaction to commands for: flight manoeuvres, adherence procedures onto various places, and exactness in the performance of various assignments, chosen both from the above, in the Applications chapter, and others emerging with time and experience.

C13 Regulations (Articles 1 to 8)

1. The present machine is an important step of advance in technology; its ability to take in account (electronically) the laws and regulations standing or newly voted for in each country, concerning the flight of drones in both the public and the private sectors, and the technological ability to abide by them, constitute a reason for its instrumentality and its usefulness to be great and respected.

2. For decades, as soon as a new system or method materialises, new possibilities appear and unforeseen necessities and problems emerge, as well as novel responsibilities; in response to them, there has always been a certain slowness if not a genuine delay in the appearance of new statutes and regulations ministering to them. As already cited (Prior Art, A4. above), for the time being drones are largely used for military purposes, but new designs regularly emerge and new uses and applications come to view; existing models are mostly large and very costly, enriched with high technology, with confidential if not secret systems. Nevertheless, emerging new designs, small ones, with an affordable cost, are suitable (also) for the private sector, with many abilities and over-the-counter technology. One of them, the present machine, the most obvious contender for the time being, displays an overwhelming adequacy for new uses and methods of operation, a low technological profile, and offers furtivity and inconspicuousness in operation. Amateur aeromodellers can easily start flying it, while professionals and public officials may take some time getting used to, but everybody needs regulations not only for the present machine but for all drones new and old. It is the way things are: all of these new designs are still not widely used in the private sector, due to lack of corresponding bills and acts.

3. These new designs offer suitability for various uses, to be categorised as follows: —Public, military purposes: anti-drone use (C6.4e.B. above), etc. —Public, non-military ones: Administration (state, or regional one), Firefighting (C6.4j. above), Education and Training, Police (C6.4f. above), Coast guard, etc. —Large organisations: surveying/excavating firms, the Media, news agencies, etc. —Private professionals: engineers, geologists, advertisers, real estate agents, film directors, photoreporters, environmentalists, land surveyors, cultivators/farmers (using pollinating robo-insects), livestock farmers, mountain rescuers, airliner emergency rescuers (C6.4e.A. above), lawyers, veterans' psychologists (C6.4g. above), etc. —Private non-professionals and amateurs: naturalists, anti-poacher watchers (C6.4h. above), activists, excursionists, photographers, gamers, out-of-schoolers, computer nerds, armchair invalids, familiarisers with new technologies, car drivers (using vanguard robo-flyers), etc.

4. For keeping watch on different purposes and different uses of drones, differing provisions of regulations are needed to come to power. Logically, there must already exist (laws or at least) regulations for the use of drones on military purposes, but due to their character they are quite confidential; for using them in other sectors, there exist none of them, or just a few. What is needed prior to law-making is a database containing: —What is on offer: the different existing models, and a learned prediction of what types are ready to emerge and what the trends are for new models. —What is allowed: uses, procedures, works, conditions, times, places (differing from region to region and from one country to another). —What is prohibited: similarly as above. —What penalties and fines can or will result either from non-observance of or from exceeding the above rules and set limits respectively. Hereafter, several provisions are proposed, only rudiments of which are already in power in some countries (or just a mere idealisation thereof is constantly, and unproductively, debated on in legislative circles). In the previous chapter on Software (C10. above) the software necessary to help abide by such legislation, embedded in the present machine, has been anticipated.

5. Drones, the small unmanned flying machines of various types, are categorised on the base of: —Technical criteria such as their wing-span (the drones of airplane type), the diameter of the rotor (those of helicopter type), the length of the main body (flying machines of the present type), their largest dimension or the volume of the gas they are filled with (the airship-type ones), and other criteria for other drone classes eventually to appear. —The uppermost height in the air to which they are allowed to fly, the maximum altitude which they can attain in flight, their capacity to use night-vision devices, the specifications of their camera(s), their anticipated (and allowed) uses, the possibility to fly in captive mode tied to the ground/to a ground vehicle/to another flying unit, etc. —The net weight of the basic edition of the flying unit ready to fly but without fuel, the gross weight including fuel and equipment, the potential range of equipment, the capacity of their AI unit, etc. The categorised classification is determined after massive construction of the basic flying unit is well under works and after equipment has been furnished; it accompanies the flying unit during its entire life-span, and its set criteria/specifications cannot be changed; in case they do change, it is a new edition of the model, if not an altogether new model to be categorised anew.

6. Some Highlighted Case Laws:

6a. Drones, and every other flying unit not coming under this definition, are bound to abide by restrictions, the strongest concern being safety; an important proposal is to fly, following regulations, in distinct height levels over the ground, separated from one another. Each distinct height level corresponds to a different direction of flight. In low height levels, for every half meter higher level of flight the orientation changes to the right by 10 degrees, which translates to the condition that, for thirty six times this half-meter transition to upper levels, i.e. eighteen meters higher, the clockwise orientation shift becomes 360°, a full circle, and the orientation is again the same as the original (lower) one. In higher levels the height difference for successive 10° shift is set at larger subdivisions, and even larger as the height increases, since larger and more voluminous drones are allowed to fly higher, at greater distances from people and facilities.

6b. It is a matter of an International_Agreement, to define some critical issues: A. The magnitude of the shift in degrees of orientation for each distinct level, e.g. either 10° or 15°, or even 30° and so on, for making easy the electronic control on the part of the flying units themselves. B. The magnitude of the height difference in metres between two successive levels, in different height classes from the ground: it is quite fair (as an example) to set it at half a metre at a height of ten metres, two metres at a height of sixty metres, and ten metres at a height of four hundred metres, if such heights of flight are allowed; even better, this magnitude can be set to change little by little in a roughly direct proportion as the height changes: e.g. half metre at a height of 10 metres, 60 centimetres at a height of 12 m, 75 cm at 15 m, 1 mat 20 m, and so on (just an example) C. The clockwise or anticlockwise definition of orientation shift as the height increases. D. The lowest and the uppermost (flying ceiling) height permitted for each category of drones, and E. Minimum distances permitted from sensitive facilities and areas, from people, from people's massive concentrations (colleges, stadiums, protest marches, funeral processions, prisons, etc.), from high buildings, ships, other flying units, etc.

6c. As an example, given a generally agreed minimum flying height of twelve metres for safety reasons, regarding all flying units coming within the definition of drones, specific minimums higher than or equal to this one can be set for the different categories presented above (based on dimensions, on other specifications, and on utilisation). Also specific distances, and flight lows and ceilings, can be set for safety reasons both on land below commercial airline flight paths and in areas of airliners' approach to airports (an example of sensitive areas).

7. Concerning Sensitive Facilities and Areas:

7a For safety reasons and because of fear of misuse and loss of privacy, restrictions can be in force for several or most categories of drones, either continually in time or at certain times, for approaching and for overflying facilities and areas considered of importance ones, of safety concern, of security status, or for other reasons, excluding: drones used by the police, by firefighters, by the administration, by repairing crews, etc.

7b. Such facilities/areas are comprised in the following: administrative facilities, areas of aviation's concern (airliners' air routes, airports, and landing approach paths), army camps and facilities, aqueducts and water supply reservoirs, banks, bridges, courts, energy production facilities (dams, wind turbines, oil wells on land and offshore, oil refineries, etc.), factories, mines and quarries, ports, penitentiary institutions, plantations (of economic interest, experimental, or GM), railroad stations and trains on the move, research facilities and areas, schools and playgrounds, ships in the open sea and in canals, stadiums and playing fields, steel foundries, zoos, and more.

7c. A signal warning against contravention is sent from the protected facility/area towards the breaching flying unit, automatically intervening onto the flyer's flying commands (with priority over the unit's automatic flight programme or its RC-ed flight), to make it abstain and keep its distances; the signal cannot be valid at more than a certain distance from the protected facility/area. —In case the flyer keeps violating the set limits, a second signal is sent to it, with priority again, resulting in ending its flight as such, to head towards controlled landing and be searched. —In case the flyer does not respond in conformity with the international Agreement, emergency measures are to be taken, always under this Agreement's covering: either demolition or capture aloft, using means and methods warranted by the Agreement.

8. Further Restrictions and Provisions:

8a. Besides sensitives (as above), also people (either alone or in groups), children more specifically, and private facilities (houses, blocks of flats, farms, etc.) deserve being protected by imposing corresponding restrictions: flying close, viewing through infrared, eavesdropping, disconcerting by making noise, throwing objects, and various more.

8b. People, private facilities, and sensitive facilities and areas, all need to be protected by rules covering every category of drones, through setting horizontal and vertical distance limits on approaching them, and time limits on how long staying close to them is admissible, as well as restrictions in noise, optical signals and use of their accessories in what can be considered intrusion of privacy or violation of security, which raises ethical and safety concerns respectively. Onboard location sensing devices help in this issue, and restriction-degree setting is essential as for distances, times and other limits to be observed.

8c. Special attention is given to provisions covering the subject of units overflying forest expanses because of the fear of forest fires.

8d. Several categories of drones users are excluded from the restrictions cited in the above (either at all times or on moments of emergency or work), due to their involvement with security or with matters of public interest, safety etc.: administration, the police, the fire brigade, fire watchers, land surveyors, geologists, etc.

8e. In every case of preparation for a mission in the air, a proceedings programme (assignment, actions and steps, route, adherence to places, work, return) is drawn up, stored in the drone's AI unit, and stays valid until the mission ends: aside from the possibility of being confidential (secret), this programme is available to be communicated to all, whenever it is asked for, through radio transmission.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wing configured for use as a flapping wing of a drone and including a set of longitudinal rods, a set of transversal rods, a plurality of leaf pairs, a set of under-fibers and a set of over-fibers, the longitudinal and transversal rods being coupled cross-wise to create a plurality of open conduit-like passages that in turn form a perimeter of the wing that is substantially oblong in shape, the leaf pairs running lengthwise substantially across the whole span of two corresponding adjacent longitudinal rods and configured to create flaps that flap open and close in opposing directions about corresponding open conduit-like passages, wherein the set of under-fibers and over-fibers are arranged in pairs and run under and over corresponding ones of the conduit-like passages to control the range of travel of associated leaf pairs during down stroke and upstroke flapping, respectively, of the wing.

2. The wing of claim 1, wherein the leaves are transparent.

3. The wing of claim 1, wherein at least a portion of the wing is camouflaged.

4. The wing of claim 1, wherein the leaves are connected via hinges to corresponding hinge points located at opposite ends of the longitudinal rods.

5. The wing of claim 1, wherein the under-fibers and the over-fibers are thin transparent fibers.

6. The wing of claim 1, wherein the wing is substantially flat with curved outer edges.

7. A drone having the wing of claim 1.

8. A wing configured for use as a flapping wing of a drone, the wing comprising:
- a set of longitudinal rods;
- a set of transversal rods coupled to the set of longitudinal rods cross-wise to create a plurality of open conduit-like passages that in turn form a perimeter of the wing that is substantially oblong in shape;
- a plurality of leaf pairs running lengthwise substantially across the whole span of two corresponding adjacent longitudinal rods and configured to create flaps that flap open and close in opposing directions about corresponding open conduit-like passages; and
- networks of under-fibers and over-fibers arranged under and over, respectively, the plurality of leaf pairs to control the range of travel of associated leaf pairs during down stroke and upstroke flapping, respectively, of the wing.

9. The wing of claim 8, wherein the leaves of the plurality of leaf pairs are transparent.

10. The wing of claim 8, wherein at least a portion of the wing is camouflaged.

11. The wing of claim 8, wherein the leaves of the plurality of leaf pairs are connected via hinges to corresponding hinge points located at opposite ends of the longitudinal rods.

12. The wing of claim 8, wherein the under-fibers and the over-fibers are thin transparent fibers.

13. The wing of claim 8, wherein the wing is substantially flat with curved outer edges.

14. A drone having the wing of claim 8.

* * * * *